US012713143B2

(12) United States Patent
Kusakari et al.

(10) Patent No.: US 12,713,143 B2
(45) Date of Patent: Aug. 18, 2026

(54) IMAGING DEVICE AND OPERATING METHOD OF THE IMAGING DEVICE

(71) Applicant: SAMSUNG ELECTRONICS CO., LTD., Suwon-si (KR)

(72) Inventors: Takashi Kusakari, Yokohama (JP); Hidekazu Adachi, Yokohama (JP); Tomoya Yamashita, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 19/039,473

(22) Filed: Jan. 28, 2025

(65) Prior Publication Data

US 2025/0254437 A1 Aug. 7, 2025

(30) Foreign Application Priority Data

Feb. 1, 2024 (JP) ................................ 2024-013886

(51) Int. Cl.
*H04N 23/951* (2023.01)
*H04N 23/68* (2023.01)

(52) U.S. Cl.
CPC ....... *H04N 23/951* (2023.01); *H04N 23/6811* (2023.01); *H04N 23/683* (2023.01)

(58) Field of Classification Search
CPC ............. H04N 23/951; H04N 23/6811; H04N 23/683; H04N 23/73; H04N 23/74
See application file for complete search history.

(56) References Cited

U.S. PATENT DOCUMENTS

| | | | | |
|---|---|---|---|---|
| 6,810,135 | B1 | 10/2004 | Berenz et al. | |
| 6,959,102 | B2 | 10/2005 | Peck | |
| 8,203,614 | B2 | 6/2012 | Fukuda et al. | |
| 8,514,375 | B2 | 8/2013 | Hsu et al. | |
| 9,001,895 | B2 * | 4/2015 | Ohta | G09G 5/00 386/230 |
| 10,404,996 | B1 * | 9/2019 | Huang | H04N 23/743 |
| 11,067,673 | B2 | 7/2021 | Wei | |
| 11,800,134 | B2 | 10/2023 | Schuijers et al. | |
| 11,837,029 | B2 | 12/2023 | Miura et al. | |

(Continued)

FOREIGN PATENT DOCUMENTS

| | | |
|---|---|---|
| CN | 106896370 A | 6/2017 |
| JP | 2009-211597 A | 9/2009 |

(Continued)

*Primary Examiner* — Shahbaz Nazrul
(74) *Attorney, Agent, or Firm* — Sughrue Mion, PLLC

(57) ABSTRACT

An imaging device capture three or more frame images including a turning-on frame image exposed when a light emitter is turned on, a turning-off frame image exposed when the light emitter is turned off, and another one of the turning-on frame image or the turning-off frame image, calculates a motion vector of each pixel from the two of the turning-on frame images or the two of the turning-off frame images, adjusts a length of the motion vector of each pixel according to a time difference between a time at which the turning-on frame image is captured and at time at which the turning-off frame image is captured, generates a virtual frame image by correcting each pixel of the turning-off frame image based on the adjusted motion vector of each pixel, and subtracts the virtual frame image from the turning-on frame image.

20 Claims, 33 Drawing Sheets

(56) References Cited

U.S. PATENT DOCUMENTS

| | | | | |
|---|---|---|---|---|
| 2009/0244317 | A1* | 10/2009 | Makii | H04N 23/76 348/222.1 |
| 2012/0281106 | A1* | 11/2012 | Foster | H04N 23/683 348/222.1 |
| 2013/0181119 | A1 | 7/2013 | Bikumandla et al. | |
| 2018/0096464 | A1* | 4/2018 | Kobayashi | G06T 5/70 |
| 2019/0065880 | A1* | 2/2019 | Loginov | G06F 18/24143 |
| 2022/0360702 | A1 | 11/2022 | Baba et al. | |
| 2025/0363961 | A1* | 11/2025 | Kanda | G09G 3/3426 |

FOREIGN PATENT DOCUMENTS

| | | | |
|---|---|---|---|
| JP | 4842374 | B2 | 12/2011 |
| JP | 2021-51042 | A | 4/2021 |
| JP | 2021-56805 | A | 4/2021 |
| JP | 2022-068055 | A | 5/2022 |
| KR | 10-1763389 | B1 | 7/2017 |
| KR | 10-2141638 | B1 | 8/2020 |

* cited by examiner

FIG. 4

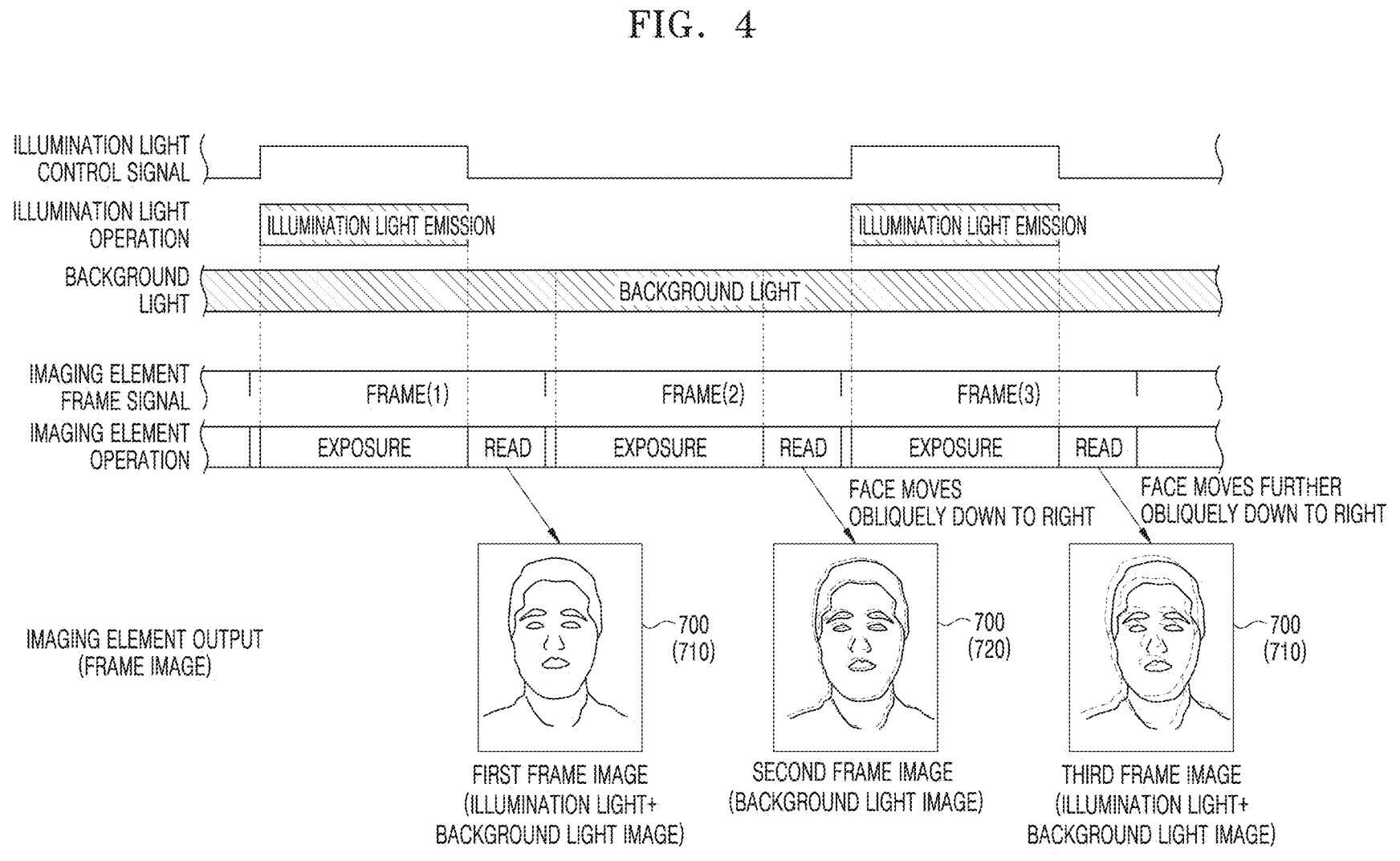

ILLUMINATION LIGHT CONTROL SIGNAL
ILLUMINATION LIGHT OPERATION
ILLUMINATION LIGHT EMISSION
ILLUMINATION LIGHT EMISSION
BACKGROUND LIGHT
BACKGROUND LIGHT
IMAGING ELEMENT FRAME SIGNAL
FRAME(1)
FRAME(2)
FRAME(3)
IMAGING ELEMENT OPERATION
EXPOSURE
READ
EXPOSURE
READ
EXPOSURE
READ
FACE MOVES OBLIQUELY DOWN TO RIGHT
FACE MOVES FURTHER OBLIQUELY DOWN TO RIGHT
IMAGING ELEMENT OUTPUT (FRAME IMAGE)
700 (710)
700 (720)
700 (710)
FIRST FRAME IMAGE (ILLUMINATION LIGHT+ BACKGROUND LIGHT IMAGE)
SECOND FRAME IMAGE (BACKGROUND LIGHT IMAGE)
THIRD FRAME IMAGE (ILLUMINATION LIGHT+ BACKGROUND LIGHT IMAGE)

FIG. 19

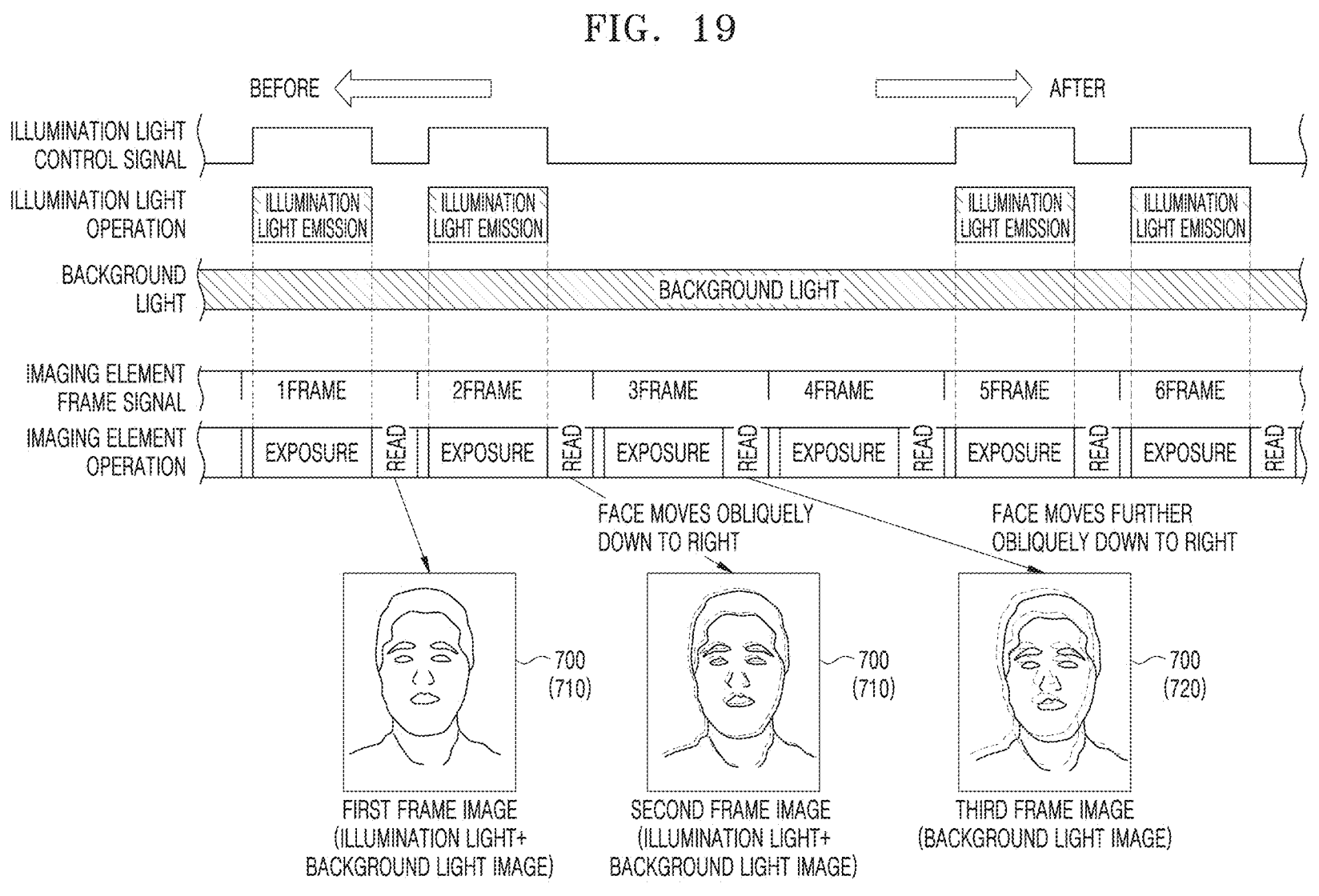

ILLUMINATION LIGHT CONTROL SIGNAL
ILLUMINATION LIGHT OPERATION
BACKGROUND LIGHT
IMAGING ELEMENT FRAME SIGNAL
IMAGING ELEMENT OPERATION

BEFORE
AFTER

ILLUMINATION LIGHT EMISSION
ILLUMINATION LIGHT EMISSION
ILLUMINATION LIGHT EMISSION
ILLUMINATION LIGHT EMISSION

BACKGROUND LIGHT

1FRAME
2FRAME
3FRAME
4FRAME
5FRAME
6FRAME

EXPOSURE READ EXPOSURE READ EXPOSURE READ EXPOSURE READ EXPOSURE READ EXPOSURE READ

FACE MOVES OBLIQUELY DOWN TO RIGHT
FACE MOVES FURTHER OBLIQUELY DOWN TO RIGHT 700 (710)
FIRST FRAME IMAGE (ILLUMINATION LIGHT+ BACKGROUND LIGHT IMAGE)

700 (710)
SECOND FRAME IMAGE (ILLUMINATION LIGHT+ BACKGROUND LIGHT IMAGE)

700 (720)
THIRD FRAME IMAGE (BACKGROUND LIGHT IMAGE)

FIG. 29

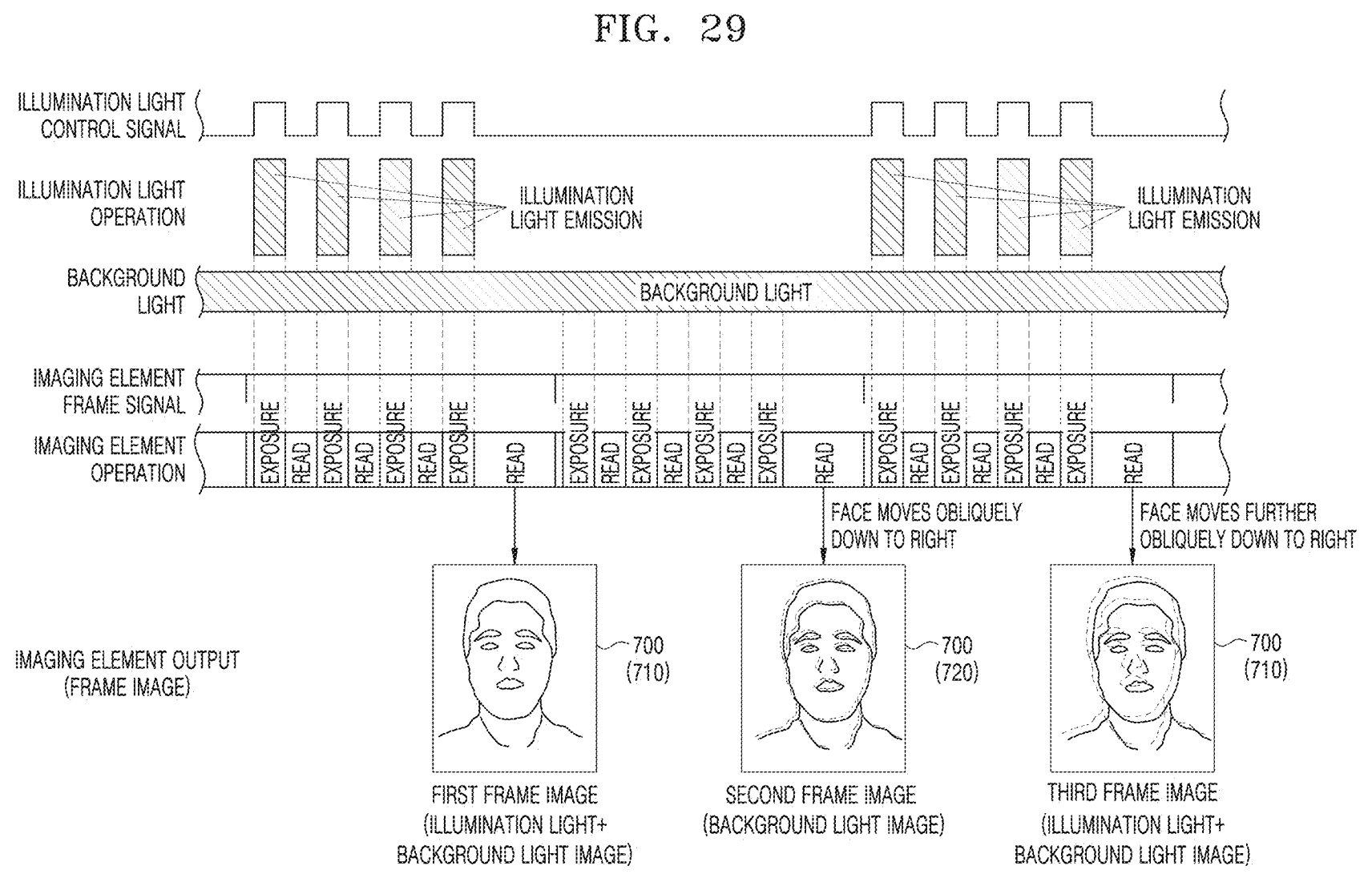

ILLUMINATION LIGHT CONTROL SIGNAL
ILLUMINATION LIGHT OPERATION
ILLUMINATION LIGHT EMISSION
ILLUMINATION LIGHT EMISSION
BACKGROUND LIGHT
BACKGROUND LIGHT
IMAGING ELEMENT FRAME SIGNAL
IMAGING ELEMENT OPERATION
EXPOSURE
READ
FACE MOVES OBLIQUELY DOWN TO RIGHT
FACE MOVES FURTHER OBLIQUELY DOWN TO RIGHT
IMAGING ELEMENT OUTPUT (FRAME IMAGE)
700 (710)
700 (720)
700 (710)
FIRST FRAME IMAGE (ILLUMINATION LIGHT+ BACKGROUND LIGHT IMAGE)
SECOND FRAME IMAGE (BACKGROUND LIGHT IMAGE)
THIRD FRAME IMAGE (ILLUMINATION LIGHT+ BACKGROUND LIGHT IMAGE)

FIG. 32

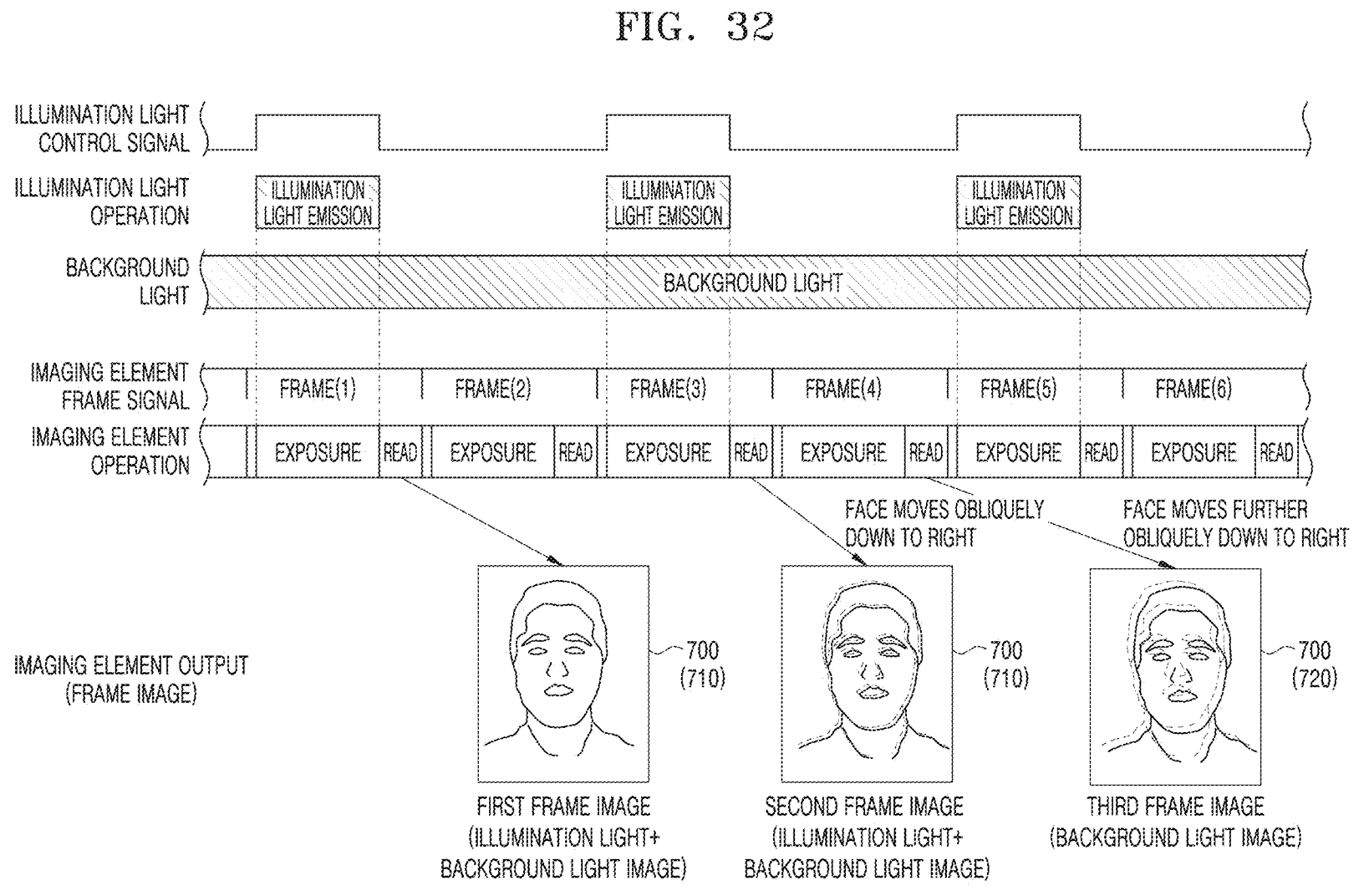

ILLUMINATION LIGHT CONTROL SIGNAL
ILLUMINATION LIGHT OPERATION
BACKGROUND LIGHT
IMAGING ELEMENT FRAME SIGNAL
IMAGING ELEMENT OPERATION
IMAGING ELEMENT OUTPUT (FRAME IMAGE)

ILLUMINATION LIGHT EMISSION
ILLUMINATION LIGHT EMISSION
ILLUMINATION LIGHT EMISSION
BACKGROUND LIGHT

FRAME(1)
FRAME(2)
FRAME(3)
FRAME(4)
FRAME(5)
FRAME(6)

EXPOSURE READ EXPOSURE READ EXPOSURE READ EXPOSURE READ EXPOSURE READ EXPOSURE READ

FACE MOVES OBLIQUELY DOWN TO RIGHT
FACE MOVES FURTHER OBLIQUELY DOWN TO RIGHT 700 (710)
FIRST FRAME IMAGE (ILLUMINATION LIGHT+ BACKGROUND LIGHT IMAGE)

700 (710)
SECOND FRAME IMAGE (ILLUMINATION LIGHT+ BACKGROUND LIGHT IMAGE)

700 (720)
THIRD FRAME IMAGE (BACKGROUND LIGHT IMAGE)

IMAGING DEVICE AND OPERATING METHOD OF THE IMAGING DEVICE

CROSS-REFERENCE TO RELATED APPLICATION

This application is based on and claims priority under 35 U.S.C. § 119 to Japanese Patent Application No. 2024-013886, filed on Feb. 1, 2024, in the Japan Patent Office, the disclosure of which is incorporated by reference herein in its entirety.

BACKGROUND

Devices, apparatuses, and method consistent with the present disclosure relate to an imaging device and an operating method of the imaging device.

An in-cabin driver monitoring system is a system for monitoring the appearance of a driver in a vehicle. In this system, an image is generated under various conditions and, a driver's gaze, etc. are detected, thereby detecting the appearance of the driver, such as drowsy driving.

However, in certain circumstances, artifacts due to differences in the driver's position, etc. may occur in the image and, due to the occurrence of the artifacts, the detection accuracy of the driver's gaze, etc. is reduced.

SUMMARY

It is an aspect to provide an imaging device, an imaging method, and an imaging program configured to obtain a high-resolution captured image without artifacts, in which the influence of background light is removed even when a subject moves in any direction.

According to an aspect of one or more embodiments, there is provided an imaging device comprising an imaging unit configured to capture at least three frame images exposed in synchronization with a turning-on and a turning-off of a light emitter that irradiates light to a subject, the at least three frame images including a turning-on frame image exposed when the light emitter is turned on, a turning-off frame image exposed when the light emitter is turned off, and another one of the turning-on frame image or the turning-off frame image; a motion vector calculator configured to calculate a motion vector of each pixel from the two of the turning-on frame images or the two of the turning-off frame images; a motion vector length adjuster configured to adjust a length of the motion vector of each pixel according to a time difference between a time at which the turning-on frame image is captured and at time at which the turning-off frame image is captured; a frame image corrector configured to generate a virtual frame image by correcting each pixel of the turning-off frame image based on the motion vector of each pixel after the motion vector is adjusted; and an image processor configured to subtract the virtual frame image from the turning-on frame image.

According to another aspect of one or more embodiments, there is provided an operating method of an imaging device, the operating method comprising capturing at least three frame images exposed in synchronization with a turning-on and a turning-off of a light emitter that irradiates light to a subject, the at least three frame images including a turning-on frame image exposed when the light emitter is turned on, a turning-off frame image exposed when the light emitter is turned off, and another one of the turning-on frame image or the turning-off frame image; calculating a motion vector of each pixel from the two of the turning-on frame images or the two of the turning-off frame images; adjusting a length of the motion vector of each pixel according to a time difference between a time at which the turning-on frame image is captured and a time at which the turning-off frame image is captured; correcting each pixel of the turning-off frame image based on the motion vector of each pixel after the length of the motion vector is adjusted to generate a virtual frame image; and subtracting the virtual frame image from the turning-on frame image.

According to yet another aspect of one or more embodiments, there is provided an imaging device comprising a memory storing one or more instructions; and a processor configured to access the memory and execute the one or more instructions stored in the memory to cause the processor to capture at least three frame images by performing exposure in synchronization with a turning-on and a turning-off of a light emitter that irradiates light to a subject, the at least three frame images including a turning-on frame image exposed when the light emitter is turned on, a turning-off frame image exposed when the light emitter is turned off, and another one of the turning-on frame image or the turning-off frame image; calculate a motion vector of each pixel from the two of the turning-on frame images or the two of the turning-off frame images; adjust a length of the motion vector of each pixel according to a time difference between a time at which the turning-on frame image is captured and a time at which the turning-off frame image is captured; correct each pixel of the turning-off frame image based on the motion vector of each pixel after the length of the motion vector is adjusted to generate a virtual frame image; and subtracting the virtual frame image from the turning-on frame image.

BRIEF DESCRIPTION OF THE DRAWINGS

Various embodiments will be more clearly understood from the following detailed description taken in conjunction with the accompanying drawings, in which:

FIG. 4 is a diagram for explaining an example of two frame images used to calculate a motion vector and a turning-off state exposure frame image used for processing, according to an embodiment;

FIG. 19 is a diagram for explaining an example of two turning-on state exposure frame images used to calculate a motion vector and a turning-off state exposure frame image used for processing, according to an embodiment;

FIG. 29 is a diagram for explaining the capturing of a turning-on state exposure frame image by the integration of a signal amount by exposure when a plurality of turning-on operations are performed, and the capturing of a turning-off state exposure frame image by the integration of a signal amount by exposure when a plurality of turning-off operations are performed, according to an embodiment;

FIG. 32 is a diagram illustrating an example in which a first frame image to a third frame image are not continuous, according to an embodiment.

DETAILED DESCRIPTION

Figure 1:
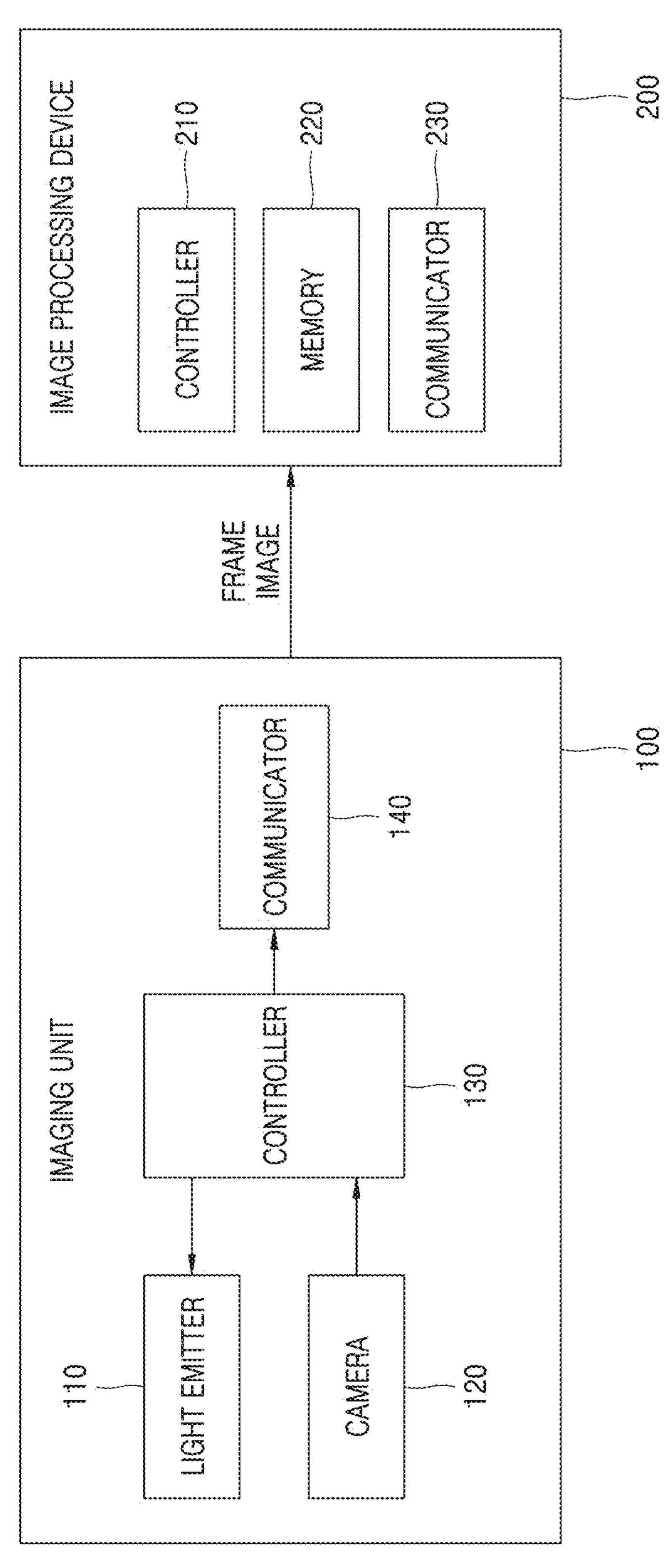
FIG. 1 is a block diagram illustrating a hardware configuration of an imaging device according to an embodiment.

In an in-cabin driver monitoring system, in order to eliminate the influence of background light (external light) on an acquired infrared image, a differential image is generated between an image when an LED that irradiates a shooting area is turned on and an image when the LED is turned off. Then, based on the differential image, the driver's gaze, etc. are detected, thereby detecting the appearance of the driver, such as drowsy driving.

However, as described above, artifacts due to differences in the driver's position, etc. occur in the differential image when the driver or the camera moves. In addition, due to the occurrence of the artifacts, the detection accuracy of the driver's gaze, etc. is reduced.

In some situations, the differential image may be generated by a difference in brightness between a first image captured when the subject is not illuminated and a second image captured when the subject is illuminated. In the differential image, a pixel area composed of pixels having a brightness higher than a certain brightness value is extracted. Based on the extracted pixel area, an amount of movement of the subject between a shooting timing of the first image and the shooting timing of the second image may be estimated. Then, based on the estimated amount of movement, etc., a subject portion in one of the first image and the second image may be moved aside and then a differential image may be generated again. Thus, even when the subject moves somewhat, an appropriate subject image may be obtained, and the authentication system may be improved.

However, because the amount of movement of the subject is estimated from a differential image between an image captured when the subject is illuminated and an image captured when the subject is not illuminated, an accuracy of the estimation of the amount of movement, etc. is limited and a clear image with the influence of background light removed may not be obtained.

Various embodiments described herein address the disadvantages described above. It is thus an aspect to provide an imaging device, an imaging method, and an imaging program configured to obtain a high-resolution captured image without artifacts, in which the influence of background light is removed even when the subject moves in any direction.

Hereinafter, an imaging device and imaging program according to various embodiments will be described in detail based on the drawings. The embodiments are only examples, and various modifications may be made from the embodiments. Hereinafter, the same reference numerals in the drawings refer to the same components, and a size of each component in the drawings is expressed at a different ratio than an actual size of the component for the sake of clarity and convenience of explanation.

Hereinafter, the expression "upper" or "above" includes not only those elements or components that are directly above/below/left/right in contact, but also those elements or components that are above/below/left/right without contact. Terms, such as "first" and "second", are used to describe various components, but are used only for the purpose of distinguishing one component from another. Thus, a "first" element, component, region, layer or section described below could be termed a "second" element, component, region, layer or section, without departing from the spirit and scope of the present disclosure. Such terms do not limit the material or structure of the components to be different.

A component expressed in the singular includes plural components unless the context clearly indicates otherwise. In addition, when a part in a specification is said to "comprise" or "include" a component, this description does not mean that the part excludes other components, but rather that the part may include other components, unless otherwise stated.

In addition, terms, such as "unit" and "module" described in the specification, mean a unit that processes one or more functions or operations, which are implemented by hardware or software, or by a combination of hardware and software.

Hereinafter, various embodiments are described.

Figure 2:
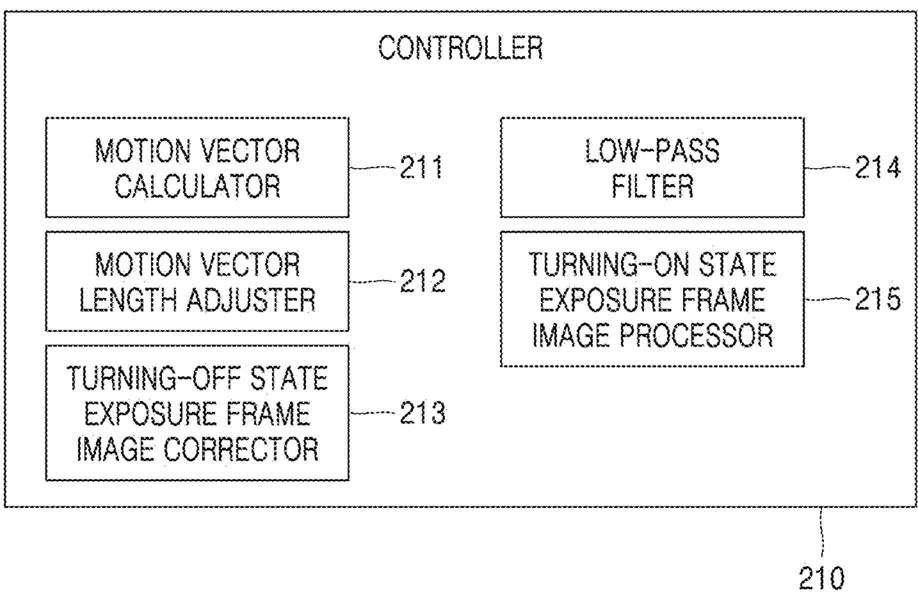
FIG. 2 is a block diagram illustrating a controller of an image processing device according to an embodiment.
Figure 3:
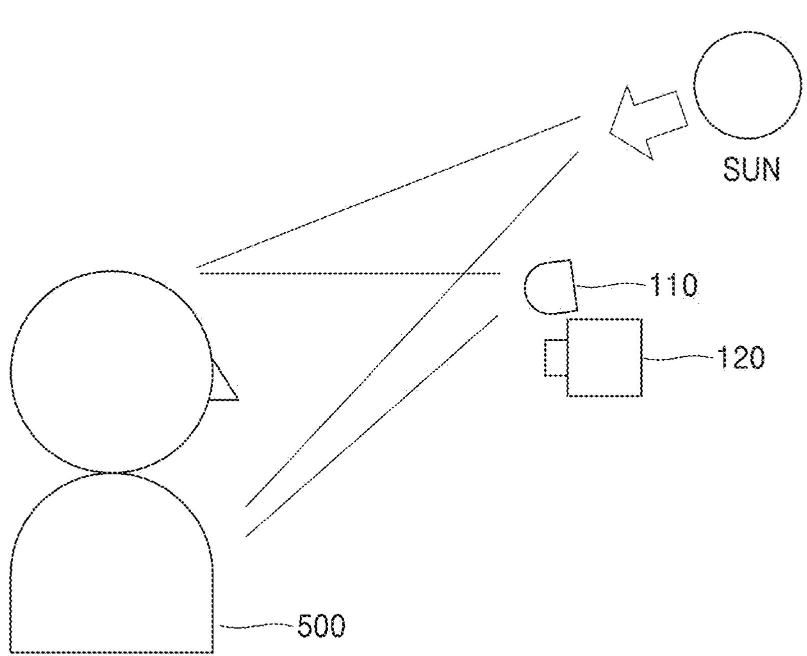
FIG. 3 is a diagram illustrating an example of a positional relationship between a light emitter and a camera of an imaging unit and a subject, according to an embodiment.

FIG. 1 is a block diagram illustrating a hardware configuration of an imaging device 1 according to an embodiment. FIG. 2 is a block diagram illustrating a function of a controller 210 of an image processing device 200 according to an embodiment. FIG. 3 is a diagram illustrating an example of a positional relationship between a light emitter 110 and a camera 120 of an imaging unit 100 and a subject 500, according to an embodiment.

The imaging device 1 may include the imaging unit 100 and the image processing device 200. The imaging unit 100 and the image processing device 200 are connected to each other for communication. The imaging unit 100 may include a light emitter 110, a camera 120, a controller 130, and a communicator 140. The image processing device 200 may include a controller 210, a memory 220, and a communicator 230.

The light emitter 110 irradiates (or, illuminates) light to the subject 500. Specifically, the light emitter 110 is turned on or off according to control by the controller 130 and irradiates light to the subject 500 when turned on. In some embodiments, the light emitter 110 may be configured by, for example, a light-emitting diode (LED) that emits infrared rays. In some embodiments, a wavelength of light emitted by the LED may be 940 nm. The light emitter 110 may include an LED that emits visible light. In some embodiments, the light emitter 110 may be composed of Vicsel.

The camera 120 has an imaging element including a plurality of elements (pixels) and may integrate light detected by the elements and output integrated light as a frame image 700 (see FIG. 4) that is a digital signal. The camera 120 captures an image of the subject 500 as the frame image 700 that is temporally continuous. Specifically, the camera 120 captures an exposure frame image (hereinafter, referred to as a turning-on state exposure frame image) 710 exposed when the light emitter 110 is turned on and an exposure frame image (hereinafter, referred to as a turning-off state exposure frame image) 720 exposed when the light emitter 110 is turned off by performing exposure in synchronization with the turning-on and turning-off of the light emitter 110 according to the control by the controller 130 (see FIG. 5, etc.). The camera 120 may be, for example, an infrared camera. The camera 120 may be a visible light camera.

The controller 130 may be configured by a central processing unit (CPU) and a memory. The controller 130 controls each element constituting the imaging unit 100 and performs various calculation processes. The controller 130 transmits a control signal to the light emitter 110 to turn the light emitter 110 on or off. The controller 130 transmits a control signal to the camera 120 to expose the camera 120 at a certain timing, the camera 120 being synchronized with the control signal for turning the light emitter 110 on or off.

The communicator 140 transmits the frame image 700 to the image processing device 200. The frame image 700 may include the turning-on state exposure frame image 710 and the turning-off state exposure frame image 720.

The controller 210 may be configured by a CPU and a memory. The controller 210 controls each element constituting the image processing device 200 and performs various calculation processes.

As illustrated in FIG. 2, the controller 210 functions as a motion vector calculator 211, a motion vector length adjuster 212, a turning-off state exposure frame image corrector 213, a low-pass filter 214, and a turning-on state exposure frame image processor 215 as the CPU executes a program. The controller 210 may include the motion vector calculator 211, the motion vector length adjuster 212, the turning-off state exposure frame image corrector 213, the low-pass filter 214, and the turning-on state exposure frame image processor 215.

As described below, the controller 210 performs a process (hereinafter, also simply referred to as "processing") of subtracting a turning-off state exposure frame image 720 (a virtual turning-off state exposure frame image 721 described below (see FIG. 5, etc.)), in which the position of each pixel is corrected, from the turning-on state exposure frame image 710. Thus, the controller 210 removes the influence of background light (external light) from the turning-on state exposure frame image 710. The subject 500 may be irradiated with light from the light emitter 110 and external light, such as sunlight (see FIG. 3). The subject 500 may be, for example, a person, but may also be an animal or a moving object.

The motion vector calculator 211 calculates a motion vector 730 (see FIG. 5, etc.) of each pixel from two turning-on state exposure frame images 710 or two turning-off state exposure frame images 720. For example, an optical flow algorithm may be used to calculate the motion vector 730. The motion vector 730 is a vector of which elements include a length and a direction of a line connecting each pixel of a temporally previous frame image 700 to each corresponding pixel of a temporally subsequent frame image 700. There are various methods of calculating the motion vector 730 other than the optical flow algorithm, and any of these methods may be used, and thus, descriptions thereof are omitted for conciseness.

The motion vector length adjuster 212 adjusts the length of the motion vector 730 of each pixel according to a time difference between the turning-on state exposure frame image 710 of a processing target and the turning-off state exposure frame image 720 used for the corresponding processing (the above-described subtraction processing). One of two frame images 700 used to calculate the motion vector 730 may be the turning-on state exposure frame image 710 of the processing target or the turning-off state exposure frame image 720 used for the corresponding processing. In the present embodiment, the two turning-on state exposure frame images 710 are used to calculate the motion vector 730, and one of the two turning-on state exposure frame images 710 is the turning-on state exposure frame image 710 of the processing target. The motion vector length adjuster 212 may adjust the length of the motion vector 730 of each pixel by multiplying, by the length of the motion vector 730, the ratio of the time difference between the turning-on state exposure frame image 710 of the processing target and the turning-off state exposure frame image 720 used for the corresponding processing to the time difference between the two frame images 700 used to calculate the motion vector 730. The time difference between the two frame images 700 is calculated, for example, based on a frame rate of the imaging unit 100.

The turning-off state exposure frame image corrector 213 corrects each pixel of the turning-off state exposure frame image 720 used for the processing, based on the motion vector 731 of each pixel after the length adjustment, thereby calculating a virtual turning-off state exposure frame image 721 that is estimated to be captured when the light emitter 110 is turned off during exposure of the turning-on state exposure frame image 710 of the processing target. Specifically, the turning-off state exposure frame image corrector 213 generates a virtual turning-off state exposure frame image 721 by shifting, by the length of the motion vector 730 after length adjustment, each pixel of the turning-off state exposure frame image 720 used for the processing in a direction along the direction of the corresponding motion vector 730. The direction in which each pixel of the turning-off state exposure frame image 720 used for the processing is shifted is the same direction as or opposite to the corresponding motion vector 730. The direction in which each pixel of the turning-off state exposure frame image 720 used for the processing is shifted varies depending on the temporal positional relationship between the turning-on state exposure frame image 710 of the processing target and the turning-off state exposure frame image 720 used for the processing.

The low-pass filter 214 filters the virtual turning-off state exposure frame image 721, thereby reducing the influence of edge noise due to movement error in shift of each pixel when generating the virtual turning-off state exposure frame image 721. For example, a Gaussian filter, a median filter, or a bilateral filter may be used as the low-pass filter.

The turning-on state exposure frame image processor 215 performs the processing of subtracting the virtual turning-off state exposure frame image 721 from the turning-on state exposure frame image 710 of the processing target.

In an embodiment, the imaging device 1 may include a memory and a processor. The memory may be the memory 220. The processor may be the controller 210. The memory may store one or more instructions. The processor may execute one or more instructions stored in the memory. The processor may perform an imaging method by executing the one or more instructions.

For example, the processor may execute the one or more instructions to capture a turning-on state exposure frame image exposed when a light emitter is turned on and a turning-off state exposure frame image exposed when the light emitter is turned off by performing exposure in synchronization with the turning-on and turning-off of the light emitter that irradiates light to the subject, to calculate a motion vector of each pixel from two turning-on state exposure frame images or two turning-off state exposure frame images, to adjust the length of the motion vector of each pixel according to the time difference between the turning-on state exposure frame image of a processing target and the turning-off state exposure frame image used for processing, to correct each pixel of the turning-off state exposure frame image used for the processing based on the motion vector of each pixel after the length adjustment, thereby calculating a virtual turning-off state exposure frame image that is estimated to be captured when the light emitter is turned off during exposure of the turning-on state exposure frame image of the processing target, and to subtract the calculated virtual turning-off state exposure frame image from the turning-on state exposure frame image of the processing target.

FIG. 4 is a diagram for explaining an example of two frame images 700 used to calculate a motion vector 730 and a turning-off state exposure frame image 720 used for processing, according to an embodiment.

An illumination light control signal is a control signal for the controller 130 to turn the light emitter 110 on or off. An imaging element frame signal is a control signal for the controller 130 to expose the camera 120 and read an image signal from each element (pixel).

A first frame image, a second frame image, and a third frame image are frame images 700 that are sequentially captured in time. In the example of FIG. 4, the first frame image and the third frame image are turning-on state exposure frame images 710 and are frame images 700 captured by illumination light irradiated by the light emitter 110 and background light (including reflected light). The second frame image is a turning-off state exposure frame image 720 and is a frame image 700 captured only by background light (including reflected light) without irradiating illumination light. When the first frame image is the turning-on state exposure frame image 710 of the processing target, the second frame image may be the turning-off state exposure frame image 720 used for the processing, and the first frame image and the third frame image may be two frame images 700 used to calculate the motion vector 730.

Figure 5:
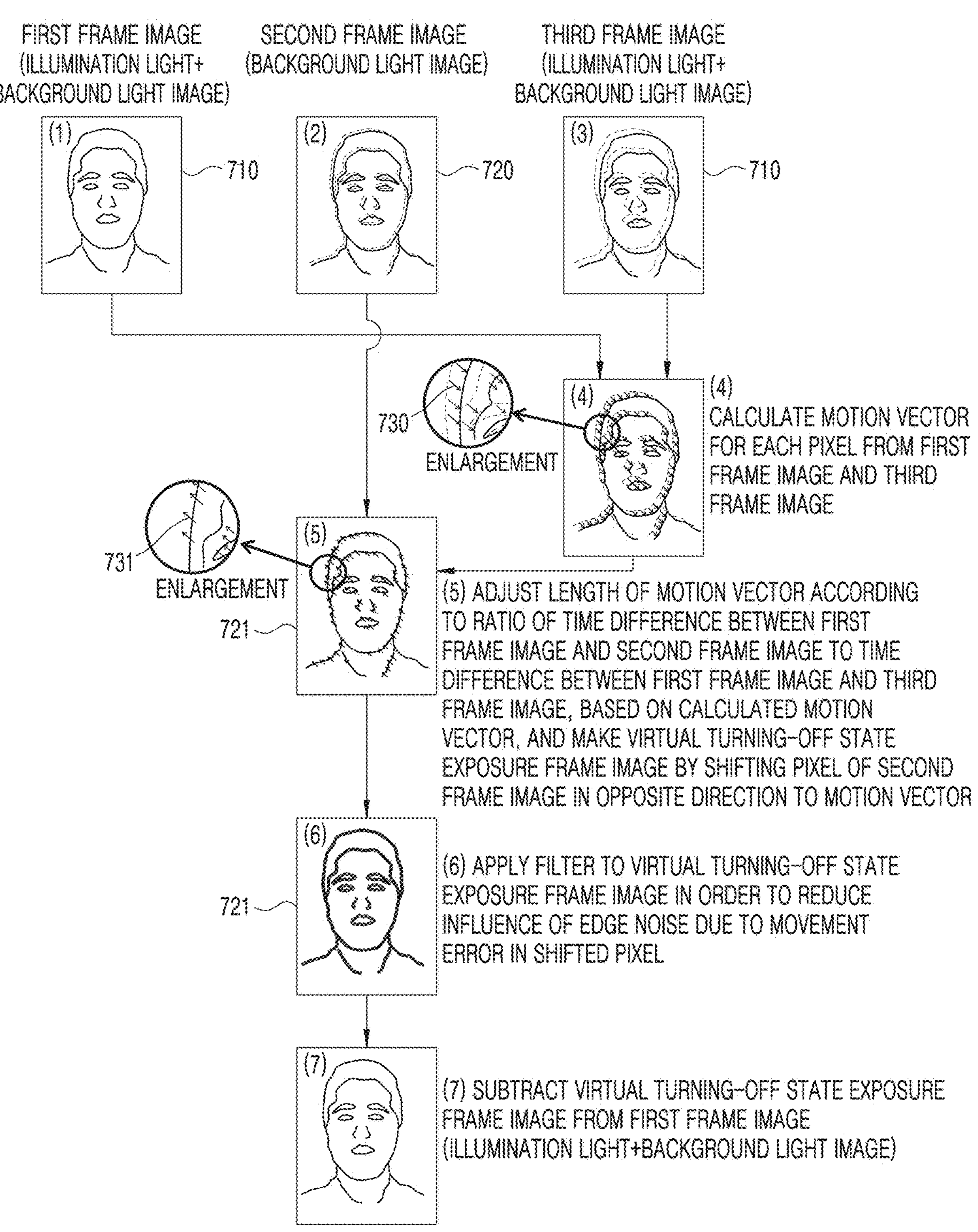
FIG. 5 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 5 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

In an embodiment, the first frame image ((1) of FIG. 5), the second frame image ((2) of FIG. 5), and the third frame image ((3) of FIG. 5) are a turning-on state exposure frame image 710, a turning-off state exposure frame image 720, and a turning-on state exposure frame image 710, respectively. These frame images 700 are captured in the order of the first frame image, the second frame image, and the third frame image. The first frame image, the second frame image, and the third frame image constitute a first turning-on state exposure frame image, a first turning-off state exposure frame image, and a second turning-on state exposure frame image, respectively. The first frame image is the turning-on state exposure frame image 710 of a processing target. The second frame image is the turning-off state exposure frame image 720 used for the processing. The first frame image and the third frame image are two frame images 700 used to calculate the motion vector 730. The second frame image used for the processing is interpolated into the first frame image and the third frame image that are used to calculate the motion vector 730. In FIG. 5, in the diagram of the second frame image ((2) of FIG. 5) and the diagram of the third frame image ((3) of FIG. 5), the outline of the subject 500 in the first frame image ((1) of FIG. 5) is indicated by a broken line for easy explanation.

The motion vector 730 is calculated for each pixel from the first frame image and the third frame image (see (4) of FIG. 5). For example, the motion vector 730 for a given pixel indicates, as a vector, a change of location of the given pixel from the first frame image to the third frame image. The motion vector 730 is indicated by an arrow in (4) of FIG. 5. In (4) of FIG. 5, the motion vector 730 is also shown in an enlarged view surrounded by a circle.

The length of the calculated motion vector 730 is adjusted according to the ratio of the time difference between the first frame image and the second frame image to the time difference between the first frame image and the third frame image.

A virtual turning-off state exposure frame image 721 is calculated (e.g., made or generated) by performing a correction to shift each pixel of the second frame image in the opposite direction to the motion vector 730 by the length of the motion vector 731 after the length adjustment (see (5) of FIG. 5). The shift direction and shift amount of each pixel in the correction are indicated by arrows in (5) of FIG. 5. In (5) of FIG. 5, the motion vector 731 after the length adjustment is also shown in an enlarged view surrounded by a circle.

In order to reduce the influence of edge noise due to a movement error in a shift of each pixel when calculating the virtual turning-off state exposure frame image 721, a filter may be applied to the virtual turning-off state exposure frame image 721 (see (6) of FIG. 5).

A process of subtracting the virtual turning-off state exposure frame image 721 from the first frame image is performed (see (7) of FIG. 5).

Figure 6:
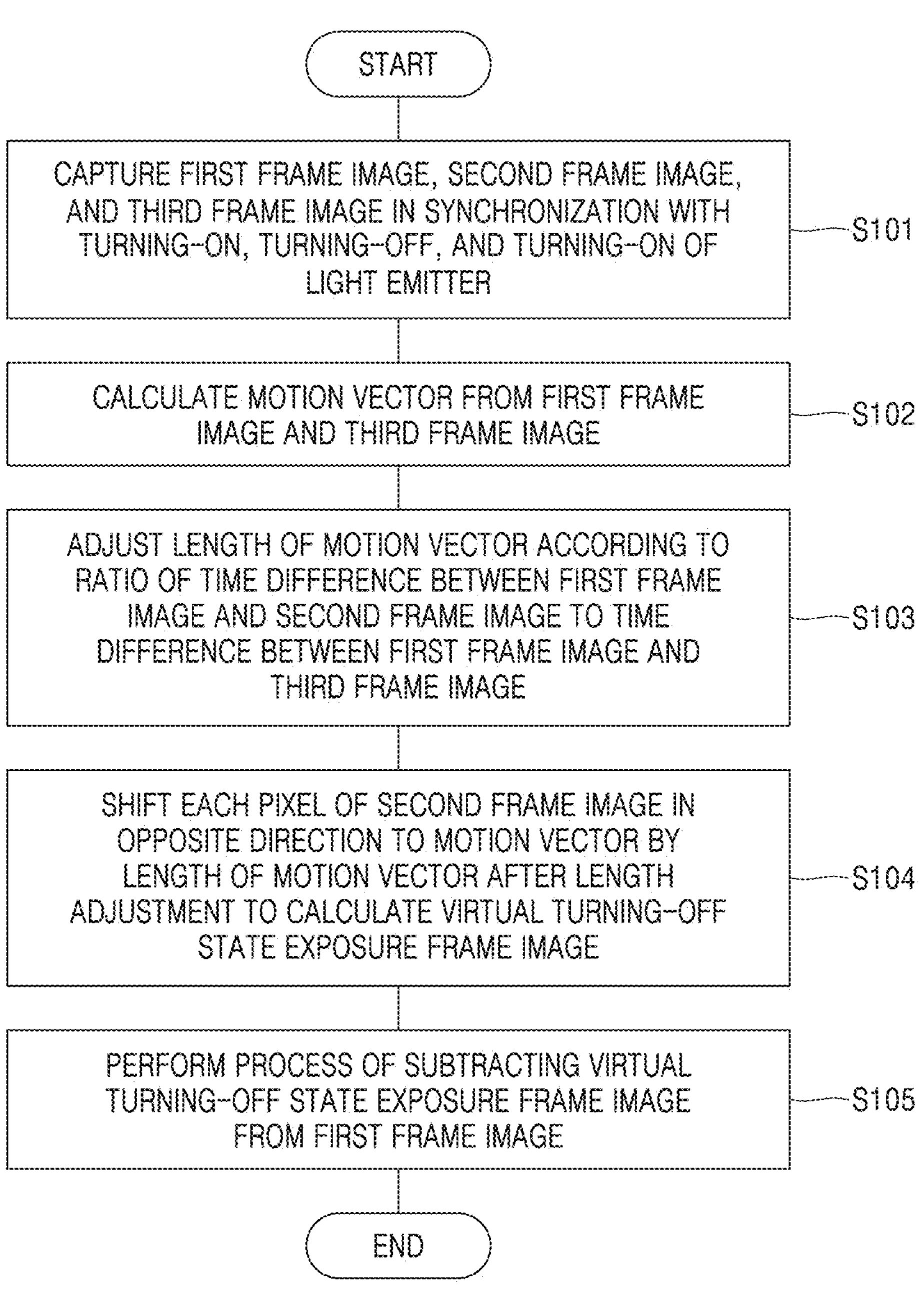
FIG. 6 is a flowchart illustrating an example of operations of the imaging device of FIG. 1, according to an embodiment.

FIG. 6 is a flowchart illustrating an example of operations of the imaging device 1 of FIG. 1, according to an embodiment.

The operations S101-S105 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S101. In some embodiments, the controller 210 may access a second program stored in the memory 220 and execute the second program to cause the controller 210 to perform operations S102-S105.

The controller 130 captures the first frame image, the second frame image, and the third frame image, by the camera 120, in synchronization with the turning-on, turning-off, and turning-on of the light emitter 110 (S101). In an embodiment, the imaging device 1 may generate a first frame image, a second frame image, and a third frame image. The controller 130 transmits the first frame image, the second frame image, and the third frame image to the image processing device 200 through the communicator 140.

The controller 210 calculates a motion vector 730 from the first frame image and the third frame image (S102). For example, in an embodiment, the controller 210 receives the first frame image, the second frame image, and the third frame image through the communicator 230 and calculates the motion vector 730 from the first frame image and the third frame image. In an embodiment, the controller 210 may calculate the motion vector 730 based on the first frame image and the third frame image.

The controller 210 adjusts the length of the motion vector 730 according to the ratio of the time difference between the first frame image and the second frame image to the time difference between the first frame image and the third frame image (S103). In an embodiment, the controller 210 may adjust the length of the motion vector 730 based on a ratio of a first time difference between the first frame image and the second frame image to a second time difference between the first frame image and the third frame image. In an embodiment, the controller 210 may adjust the length of the motion vector 730 based on the first time difference between a time at which the first frame image is captured and a time at which the third frame image is captured and the second time difference between the time at which the first frame image is captured and a time at which the second frame image is captured.

The controller 210 shifts each pixel of the second frame image in the opposite direction to the motion vector 730 by the length of the motion vector 731 after the length adjustment, to calculate (or generate) a virtual turning-off state exposure frame image 721 (S104). In an embodiment, the controller 210 may calculate the virtual turning-off state exposure frame image 721 based on the motion vector 730 and the adjusted length of the motion vector 730. For example, the controller 210 may shift each pixel of the second frame image in the opposite direction to the motion vector 730 to calculate the virtual turning-off state exposure frame image 721. For example, the controller 210 may shift each pixel of the second frame image by the adjusted length of the motion vector 730 to calculate the virtual turning-off state exposure frame image 721.

The controller 210 performs a process of subtracting the virtual turning-off state exposure frame image 721 from the first frame image (S105).

The controller 210 may perform the process of the flowchart illustrated in FIG. 6 by sequentially processing turning-on state exposure frame images 710, which are sequentially received, as turning-on state exposure frame images 710 of a processing target.

According to the embodiment illustrated with respect to FIGS. 1-6, because the turning-off state exposure frame image 720 subtracted from the turning-on state exposure frame image 710 is shifted by a pixel unit, an image without artifacts, in which the influence of background light is removed even when the subject 500 moves in any direction and even when the camera 120 moves, may be obtained.

In the embodiment illustrated with respect to FIGS. 1-6, the length of the motion vector 730 is adjusted for each pixel. However, this embodiment is only an example. In an embodiment, an average length of the motion vector 730 of each pixel is adjusted, and the motion vector 730 of each pixel except for a certain pixel of which the length of the motion vector 730 is less than or equal to a threshold value is uniformly adjusted to the average after the adjustment. In other respects, the embodiment is the same as the embodiment illustrated with respect to FIGS. 1-6, and thus, redundant descriptions are omitted or simplified for conciseness.

The motion vector length adjuster 212 illustrated in FIG. 2 sets a pixel, of which the length of the motion vector 730 is less than or equal to a threshold value, as a certain pixel of which the length of the motion vector 730 is not adjusted. For example, the certain pixel may be a pixel of which the length of the motion vector 730 is less than or equal to the threshold value. The certain pixel may be a pixel of which the length of the motion vector 730 is not adjusted. The certain pixel may be excluded from the adjustment of the length of the motion vector 730.

For example, a first pixel may refer to a pixel of which the length of the motion vector 730 is less than or equal to the threshold value. That is, the first pixel may be the certain pixel. A second pixel may refer to a pixel of which the length of the motion vector 730 is greater than the threshold value. That is, the second pixel may be a pixel other than the certain pixel.

The motion vector length adjuster 212 calculates the average of the motion vector 730 of each pixel. The motion vector length adjuster 212 adjusts an average length of the motion vector 730 according to the time difference between a time at which the turning-on state exposure frame image 710 of the processing target is captured and a time at which the turning-off state exposure frame image 720 used for the processing is captured, and corrects each pixel (for example, the second pixel) other than the certain pixel of the turning-off state exposure frame image 720 used for the processing, based on the average of the motion vector 730 of each pixel after the adjustment. The motion vector length adjuster 212 may correct the second pixel based on the average of the motion vector 730 of each pixel after the adjustment.

The correction of each pixel other than the certain pixel may be performed by generating a vector mask, in which a motion vector 730 having a length less than or equal to a certain threshold value is set to 0 and a motion vector 730 other than the motion vector 730 having the length less than or equal to the certain threshold value is set to 1, and using the vector mask. That is, only for the pixel of '1' in the vector mask, correction may be made based on the average of the motion vector 730 of each pixel after the adjustment. The threshold value may be set to an appropriate value through experiment from a viewpoint of an image quality of the turning-on state exposure frame image 710 after the processing and/or a viewpoint of a reduction of an amount of calculation. For example, the threshold value may be determined in advance.

Figure 7:
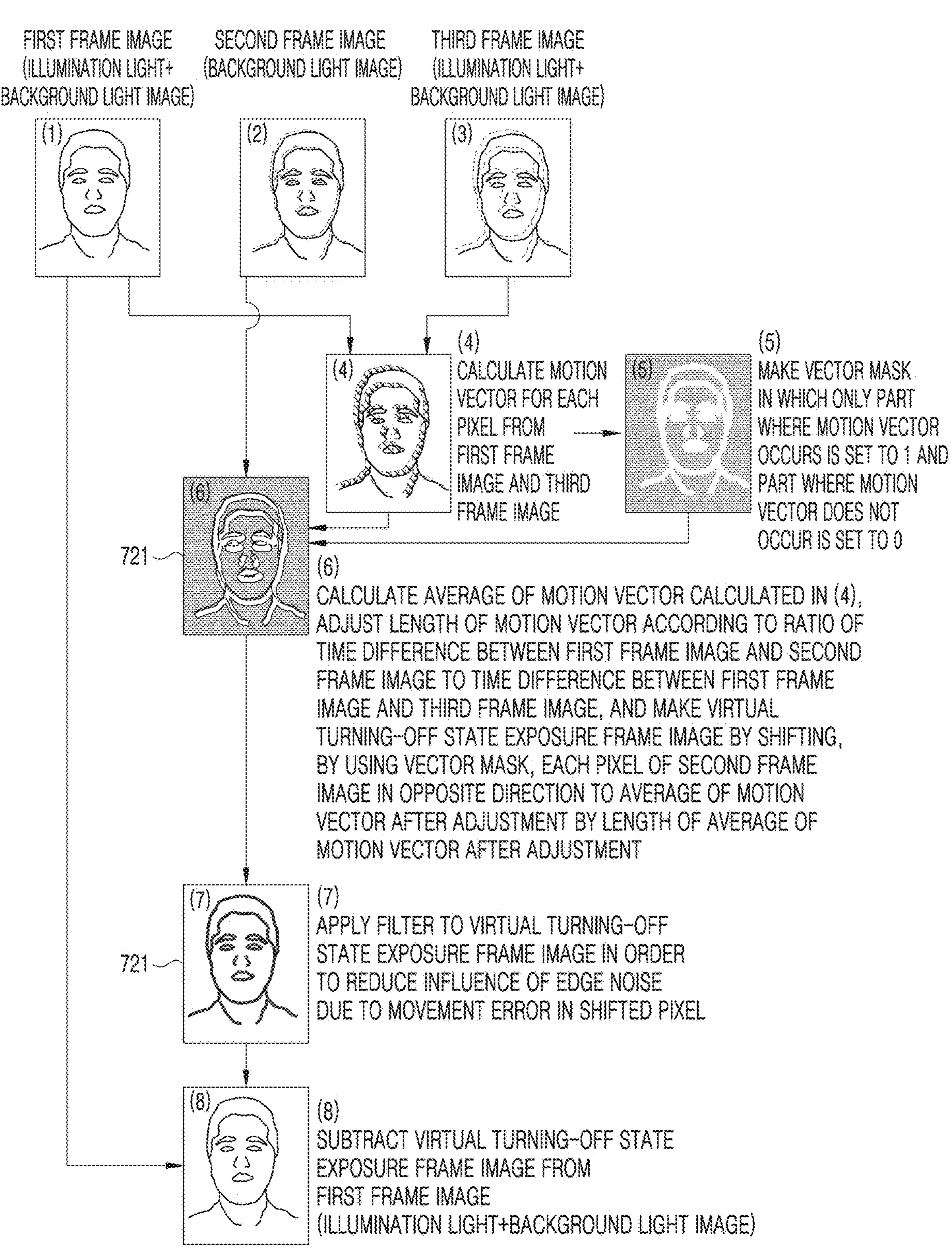
FIG. 7 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 7 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 7), the second frame image ((2) of FIG. 7), and the third frame image ((3) of FIG. 7) are a turning-on state exposure frame image 710, a turning-off state exposure frame image 720, and a turning-on state exposure frame image 710, respectively. These frame images 700 are captured in the order of the first frame image, the second frame image, and the third frame image. The first frame image, the second frame image, and the third frame image constitute a first turning-on state exposure frame image, a first turning-off state exposure frame image, and a second turning-on state exposure frame image, respectively. The first frame image is the turning-on state exposure frame image 710 of a processing target. The second frame image is the turning-off state exposure frame image 720 used for the processing. The first frame image and the third frame image are two frame images 700 used to calculate the motion vector 730. The second frame image used for the processing is interpolated into the first frame image and the third frame image that are used to calculate the motion vector 730. In FIG. 7, in the diagram of the second frame image ((2) of FIG. 7) and the diagram of the third frame image ((3) of FIG. 7), the outline of the subject 500 in the first frame image ((1) of FIG. 7) is indicated by a broken line.

The motion vector 730 is calculated for each pixel from the first frame image and the third frame image (see (4) of FIG. 7). The motion vector 730 is indicated by an arrow in (4) of FIG. 7.

A vector mask, in which a motion vector 730 having a length less than or equal to a threshold value is set to 0 (a black part of the drawing in (5) of FIG. 7) and a motion vector 730 other than the motion vector 730 having the length less than or equal to the threshold value is set to 1 (a white part of the drawing in (5) of FIG. 7), is generated (or made) (see (5) of FIG. 7).

An average of the calculated motion vector 730 is calculated, and the average is adjusted according to the ratio of the first time difference between a time at which the first frame image is captured and a time at which the second frame image is captured to the second time difference between the time at which the first frame image is captured and a time at which the third frame image is captured.

A virtual turning-off state exposure frame image 721 is calculated (e.g., made or generated) by performing, by using the vector mask, a correction to shift each pixel other than a certain pixel of the second frame image in the opposite direction to the average of the motion vector 730 after the adjustment by the length of the average of the motion vector 731 after the adjustment (see (6) of FIG. 7).

In order to reduce the influence of edge noise due to movement error in shift of each pixel when calculating the virtual turning-off state exposure frame image 721, a filter may be applied to the virtual turning-off state exposure frame image 721 (see (7) of FIG. 7). That is, the virtual turning-off state exposure frame image 721 may be filtered with a filter.

A process of subtracting the virtual turning-off state exposure frame image 721 from the first frame image is performed (see (8) of FIG. 7).

Figure 8:
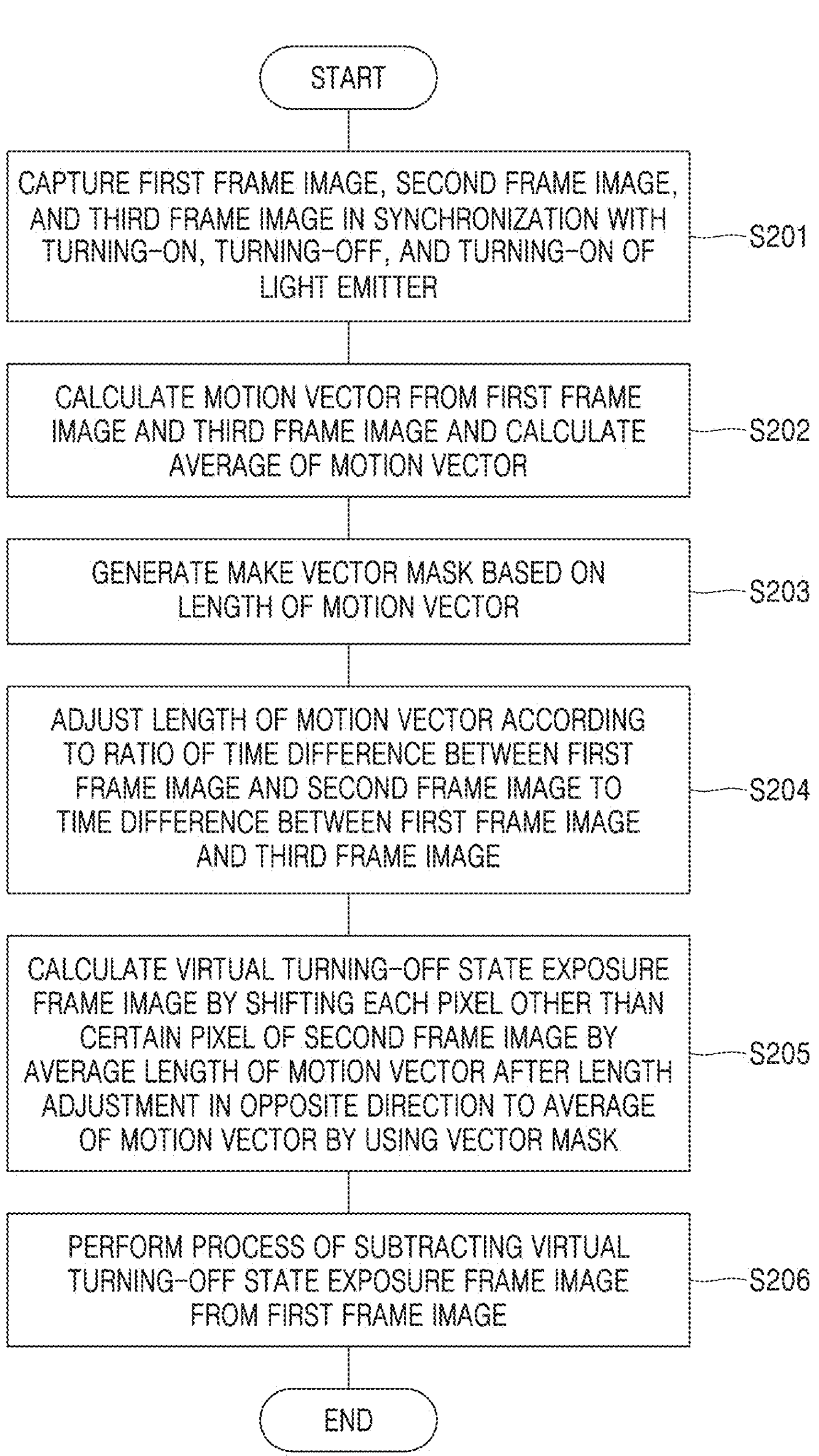
FIG. 8 is a flowchart illustrating an example of operations of the imaging device of FIG. 1, according to an embodiment.

FIG. 8 is a flowchart illustrating an example of operations of the imaging device 1 of FIG. 1, according to an embodiment.

The operations S201 to S206 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S201. In some embodiments, the controller 210 may access a second program stored in the memory 220 and execute the second program to cause the controller 210 to perform operations S202-S206.

The controller 130 captures the first frame image, the second frame image, and the third frame image, by the camera 120, in synchronization with the turning-on, turning-off, and turning-on of the light emitter 110 (S201). The controller 130 transmits a first frame image, a second frame image, and a third frame image to the image processing device 200 through the communicator 140.

The controller 210 calculates a motion vector 730 from the first frame image and the third frame image (S202). For example, the controller 210 receives the first frame image, the second frame image, and the third frame image through the communicator 230 and calculates the motion vector 730 from the first frame image and the third frame image. The controller 210 also calculates the average of the motion vector 730.

The controller 210 generates a vector mask based on the length of the motion vector 730 (S203). For example, the controller 210 generates the vector mask based on the length of the motion vector 730 of each pixel (S203). That is, the controller 210 generates (or makes) a vector mask, in which a motion vector 730 of a certain pixel having a length less than or equal to a threshold value is set to 0 and a motion vector 730 other than the motion vector 730 having the length less than or equal to the threshold value is set to 1.

The controller 210 adjusts an average length of the motion vector 730 according to the ratio of the time difference between a time at which the first frame image is captured and a time at which the second frame image is captured to the time difference between the time at which the first frame image is captured and a time at which the third frame image is captured (S204).

The controller 210 calculates a virtual turning-off state exposure frame image 721 by shifting each pixel other than a certain pixel of the second frame image by the average length of the motion vector 731 after the length adjustment in the opposite direction to the average of the motion vector 730 by using a vector mask (S205).

The controller 210 performs a process of subtracting the virtual turning-off state exposure frame image 721 from the first frame image (S206).

According to the embodiment illustrated in FIGS. 7-8, by uniformly shifting each pixel other than a certain pixel based on the average of the length of the motion vector 730, the amount of calculation used for processing may be effectively reduced.

In the embodiment illustrated with respect to FIGS. 1-6, the motion vector 730 is calculated for all pixels. In an embodiment, a face region 715 (see FIG. 9) is detected from a turning-on state exposure frame image 710 that is used to calculate the motion vector 730, and the motion vector 730 is calculated only for each pixel within the detected face region 715. In other respects, the embodiment is the same as the embodiment illustrated with respect to FIGS. 1-6, and thus, redundant descriptions are omitted or simplified for conciseness.

The motion vector calculator 211 illustrated in FIG. 2 detects the face region 715 from the turning-on state exposure frame image 710 that is used to calculate the motion vector 730. The motion vector calculator 211 calculates the motion vector 730 of each pixel within the detected face region 715.

Figure 9:
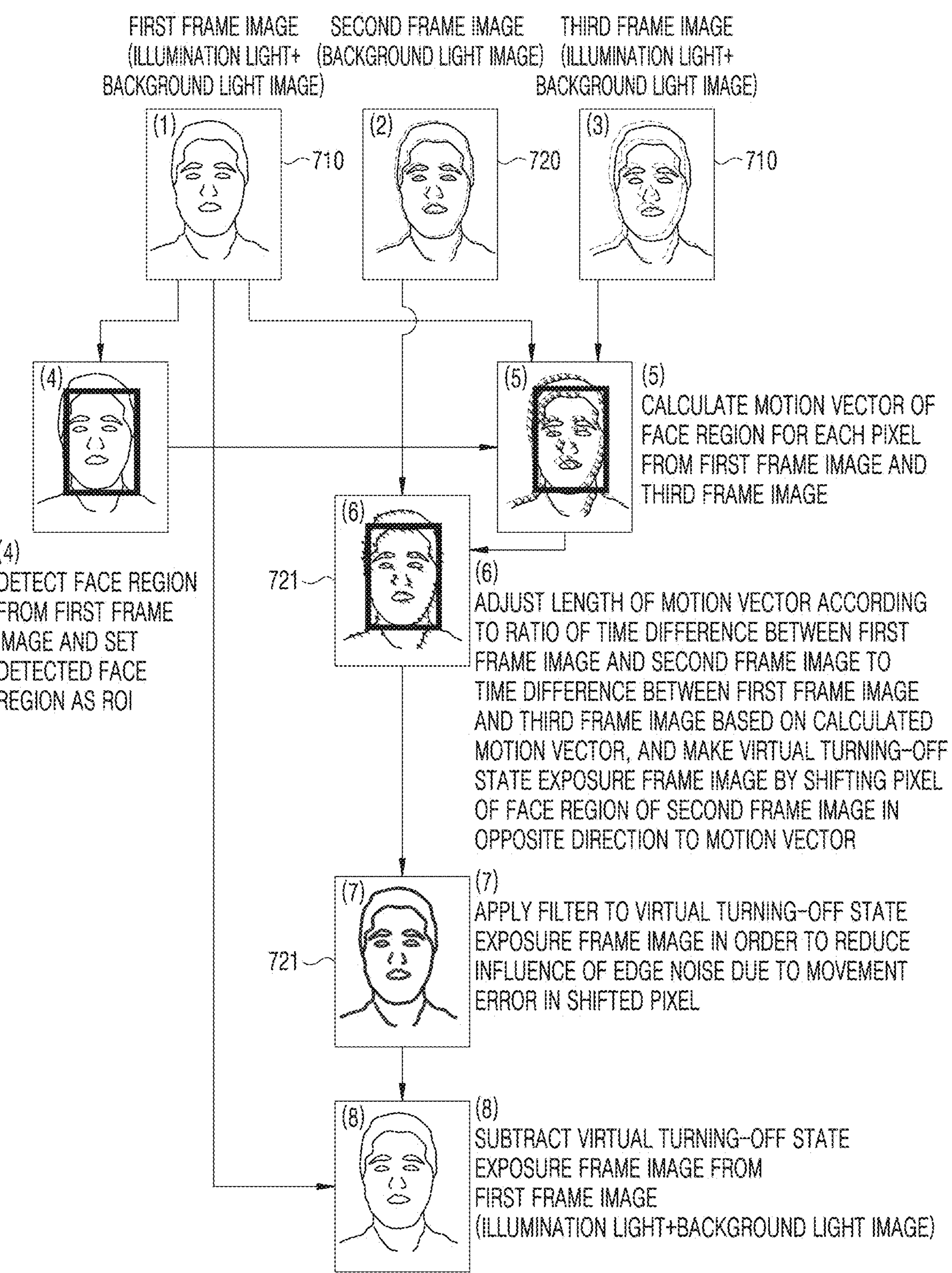
FIG. 9 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 9 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 9), the second frame image ((2) of FIG. 9), and the third frame image ((3) of FIG. 9) are a turning-on state exposure frame image 710, a turning-off state exposure frame image 720, and a turning-on state exposure frame image 710, respectively. These frame images 700 are captured in the order of the first frame image, the second frame image, and the third frame image. The first frame image, the second frame image, and the third frame image constitute a first turning-on state exposure frame image, a first turning-off state exposure frame image, and a second turning-on state exposure frame image, respectively. The first frame image is the turning-on state exposure frame image 710 of a processing target. The second frame image is the turning-off state exposure frame image 720 used for the processing. The first frame image and the third frame image are two frame images 700 used to calculate the motion vector 730. The second frame image used for the processing is interpolated into the first frame image and the third frame image that are used to calculate the motion vector 730. In FIG. 9, in the diagram of the second frame image ((2) of FIG. 9) and the diagram of the third frame image ((3) of FIG. 9), the outline of the subject 500 in the first frame image is indicated by a broken line.

A face region 715, which is a part including the face of the subject 500, is detected from the first frame image and set as a Region of Interest (ROI) (see (4) of FIG. 9). The detection of the face region 715 may be performed using various methods. For example, the face region 715 may be detected using a model of a neural network learned to detect the face region 715 from an image.

The motion vector 730 of the face region 715 is calculated for each pixel from the first frame image and the third frame image (see (5) of FIG. 9). The motion vector 730 is indicated by an arrow in (5) of FIG. 9.

The length of the calculated motion vector 730 is adjusted according to the ratio of the time difference between the first frame image and the second frame image to the time difference between the first frame image and the third frame image.

A virtual turning-off state exposure frame image 721 is calculated (e.g., generated or made) by performing a correction to shift each pixel of the face region 715 of the second frame image in the opposite direction to the motion vector 730 by the length of the motion vector 731 after the length adjustment (see (6) of FIG. 9). The shift direction and shift amount of each pixel in the correction are indicated by arrows in (6) of FIG. 9.

In order to reduce the influence of edge noise due to movement error in shift of each pixel when calculating the virtual turning-off state exposure frame image 721, a filter may be applied to the virtual turning-off state exposure frame image 721 (see (7) of FIG. 9).

A process of subtracting the virtual turning-off state exposure frame image 721 from the first frame image is performed (see (8) of FIG. 9).

Figure 10:
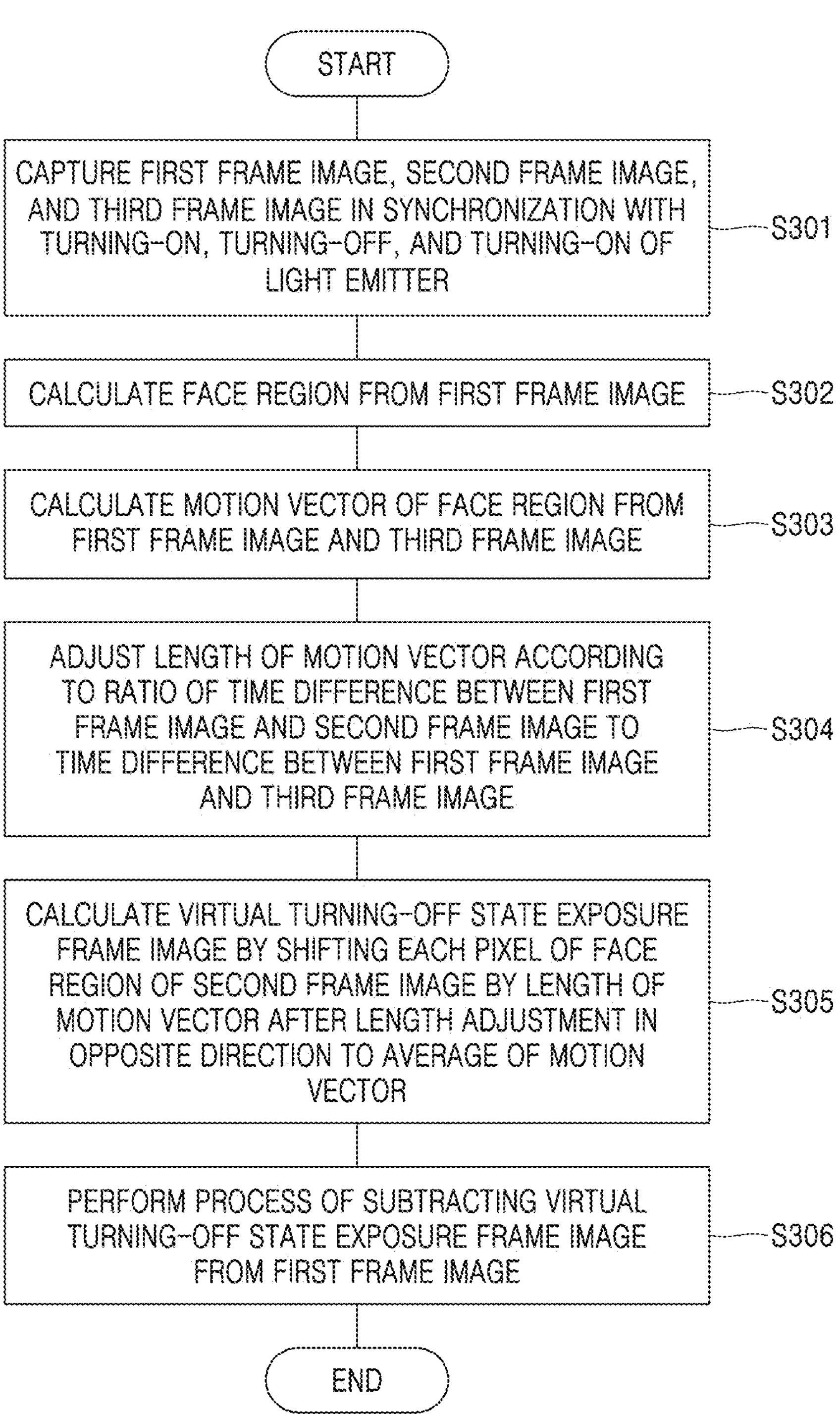
FIG. 10 is a flowchart illustrating an example of operations of the imaging device of FIG. 1, according to an embodiment.

FIG. 10 is a flowchart illustrating an example of operations of the imaging device 1 of FIG. 1, according to some embodiments.

The operations S301 to S306 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S301. In some embodiments, the controller 210 may access a second program stored in the memory 220 and execute the second program to cause the controller 210 to perform operations S302-S306.

The controller 130 captures the first frame image, the second frame image, and the third frame image, by the camera 120, in synchronization with the turning-on, turning-off, and turning-on of the light emitter 110 (S301). The controller 130 transmits the first frame image, the second frame image, and the third frame image to the image processing device 200 through the communicator 140.

The controller 210 calculates the face region 715 in the first frame image (S302). For example, the controller 210 receives the first frame image, the second frame image, and the third frame image through the communicator 230 and calculates the face region 715 in the first frame image. In an embodiment, the controller 210 may detect the face region 715 in the first frame image.

The controller 210 calculates the motion vector 730 of the face region 715 from the first frame image and the third frame image (S303).

The controller 210 adjusts the length of the motion vector 730 according to the ratio of the time difference between a time at which the first frame image is captured and a time at which the second frame image is captured to the time difference between the time at which the first frame image is captured and a time at which the third frame image is captured (S304).

The controller 210 calculates a virtual turning-off state exposure frame image 721 by shifting each pixel of the face region 715 of the second frame image by the length of the motion vector 731 after the length adjustment in the opposite direction to the motion vector 730 (S305). Thus, a virtual turning-off state exposure frame image 721, in which each pixel of the face region 715 of the second frame image, from which the motion vector 730 is calculated, is shifted by the length of the motion vector 731 after the length adjustment in the opposite direction to the motion vector 730, is calculated.

The controller 210 performs a process of subtracting the virtual turning-off state exposure frame image 721 from the first frame image (S306).

According to the embodiment illustrated with respect to FIGS. 9-10, because a target pixel, from which the motion vector 730 is calculated, and a target pixel for shift in calculating the virtual turning-off state exposure frame image 721 are limited to the face region 715, the amount of calculation may be suppressed. In addition, because the turning-off state exposure frame image 720 subtracted from the turning-on state exposure frame image 710 is shifted by pixel unit, an image without artifacts, in which the influence of background light is removed regardless of the direction in which the subject 500 moves, may be obtained.

In the embodiment illustrated with respect to FIGS. 1-6, the virtual turning-off state exposure frame image 721 is filtered using one low-pass filter. In an embodiment, the virtual turning-off state exposure frame image 721 may be filtered using multiple types of low-pass filters, and a process is performed using the virtual turning-off state exposure frame image 721 after the filtering, which has the smallest standard deviation of the difference (or differential) from the virtual turning-off state exposure frame image 721 before the filtering. In other respects, the embodiment is the same as the embodiment illustrated with respect to FIGS. 1-6, and thus, redundant descriptions are omitted or simplified for conciseness.

The low-pass filter 214 of FIG. 2 filters the calculated virtual turning-off state exposure frame image 721 by using multiple types of low-pass filters, thereby generating a plurality of virtual turning-off state exposure frame images 721 after the filtering. For example, a Gaussian filter, a median filter, and/or a bilateral filter may be used as the multiple types of low-pass filters. Low-pass filters with different kernel sizes may be used as the multiple types of low-pass filters.

The turning-on state exposure frame image processor 215 specifies the virtual turning-off state exposure frame image 721 after the filtering, which has the smallest standard deviation of the difference between the calculated virtual turning-off state exposure frame image 721 after the filtering and the virtual turning-off state exposure frame image 721 before the filtering. The turning-on state exposure frame image processor 215 performs processing to subtract a certain virtual turning-off state exposure frame image 721 from the turning-on state exposure frame image 710 of a processing target.

Figure 11:
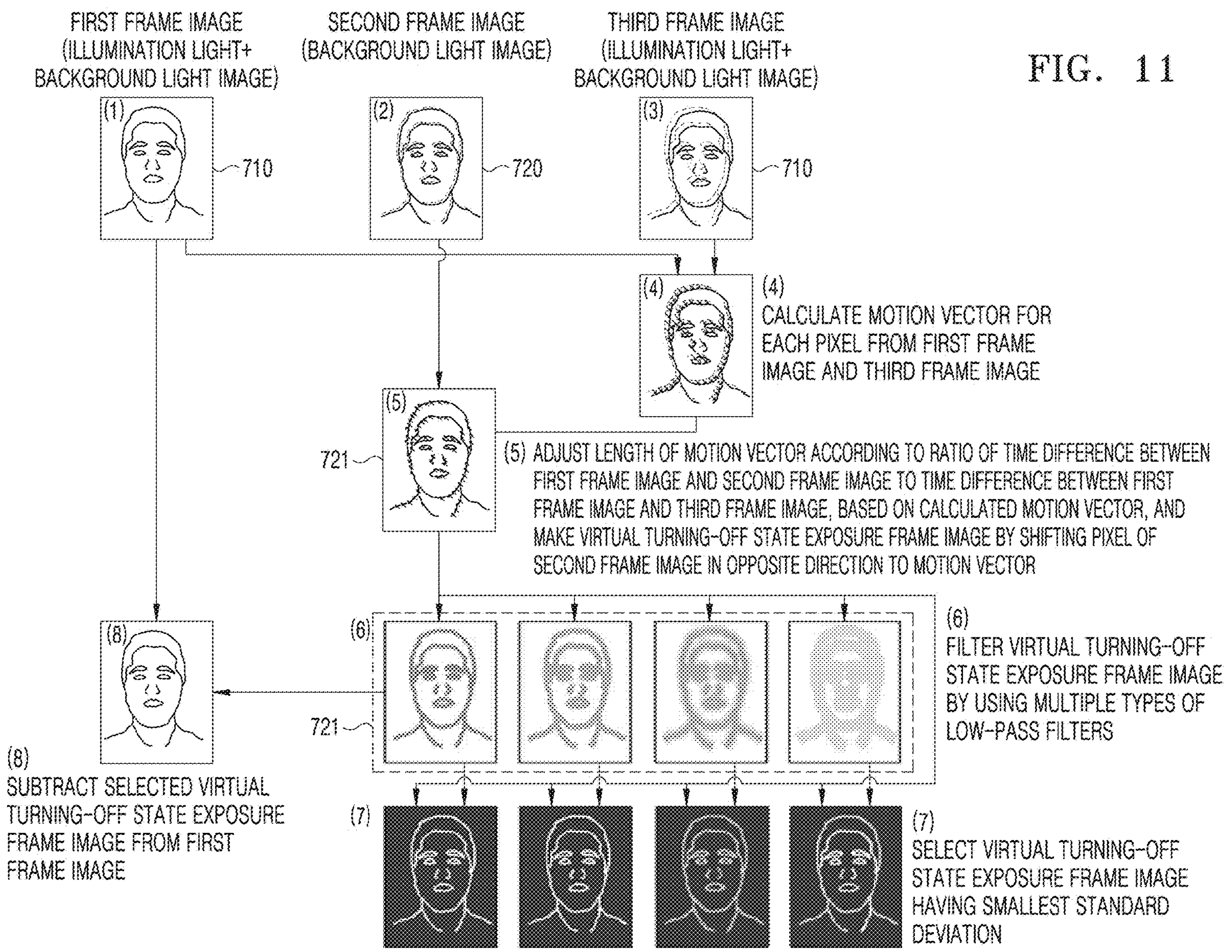
FIG. 11 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 11 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 11), the second frame image ((2) of FIG. 11), and the third frame image ((3) of FIG. 11) are a turning-on state exposure frame image 710, a turning-off state exposure frame image 720, and a turning-on state exposure frame image 710, respectively. These frame images 700 are captured in the order of the first frame image, the second frame image, and the third frame image. The first frame image, the second frame image, and the third frame image constitute a first turning-on state exposure frame image, a first turning-off state exposure frame image, and a second turning-on state exposure frame image, respectively. The first frame image is the turning-on state exposure frame image 710 of a processing target. The second frame image is the turning-off state exposure frame image 720 used for the processing. The first frame image and the third frame image are two frame images 700 used to calculate the motion vector 730. The second frame image used for the processing is interpolated into the first frame image and the third frame image that are used to calculate the motion vector 730. In FIG. 11, in the diagram of the second frame image ((2) of FIG. 11) and the diagram of the third frame image ((3) of FIG. 11), the outline of the subject 500 in the first frame image ((1) in FIG. 11) is indicated by a broken line.

The motion vector 730 is calculated for each pixel from the first frame image and the third frame image (see (4) of FIG. 11). The motion vector 730 is indicated by an arrow in (4) of FIG. 11.

The length of the calculated motion vector 730 is adjusted according to the ratio of the time difference between a time at which the first frame image is captured and a time at which the second frame image is captured to the time difference between the time at which the first frame image is captured and a time at which the third frame image is captured.

A virtual turning-off state exposure frame image 721 is calculated (e.g., generated or made) by performing a correction to shift each pixel of the second frame image in the opposite direction to the motion vector 730 by the length of the motion vector 731 after the length adjustment (see (5) of FIG. 5). The shift direction and shift amount of each pixel in the correction are indicated by arrows in (5) of FIG. 11.

By filtering the virtual turning-off state exposure frame image 721 by using multiple types of low-pass filters, a virtual turning-off state exposure frame image 721 after the filtering is calculated (see (6) of FIG. 11).

The standard deviation of the difference between the virtual turning-off state exposure frame image 721 before the filtering and the virtual turning-off state exposure frame image 721 after the filtering is calculated, and a virtual turning-off state exposure frame image 721 having the smallest calculated standard deviation is selected as a virtual turning-off state exposure frame image 721 used for the processing (see (7) of FIG. 11).

A process of subtracting the selected virtual turning-off state exposure frame image 721 from the first frame image is performed (see (8) of FIG. 11).

Figure 12:
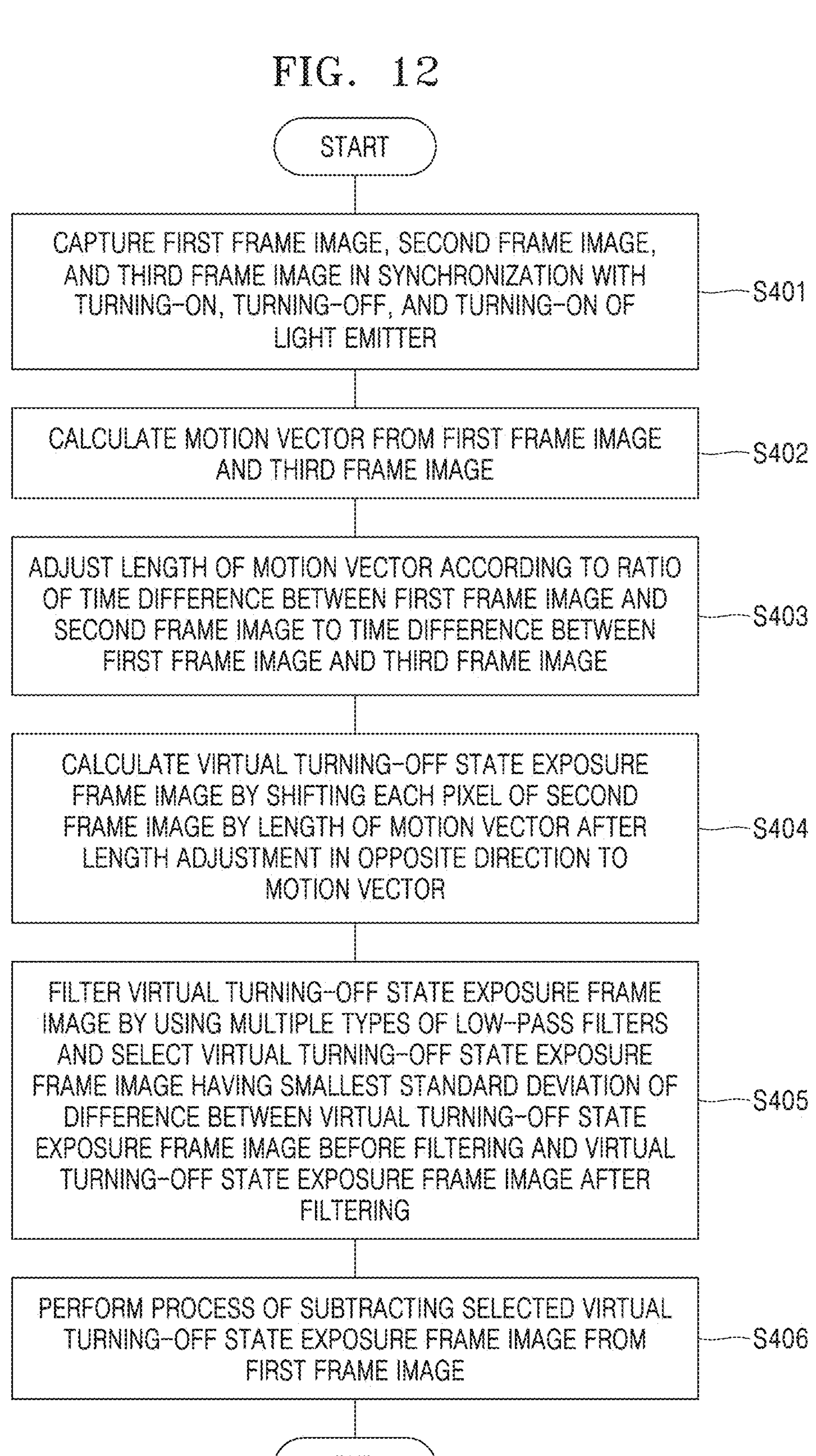
FIG. 12 is a flowchart illustrating an example of operations of the imaging device of FIG. 1, according to an embodiment.

FIG. 12 is a flowchart illustrating an example of operations of the imaging device 1 of FIG. 1, according to an embodiment.

The operations S401-S406 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S401. In some embodiments, the controller 210 may access a second program stored in the memory 220 and execute the second program to cause the controller 210 to perform operations S402-S406.

Because operations S401 to S404 are the same as operations S101 to S104 of FIG. 6, descriptions thereof are omitted for conciseness.

The controller 210 filters the calculated virtual turning-off state exposure frame image 721 by using a plurality of low-pass filters and calculates the difference between the virtual turning-off state exposure frame image 721 before the filtering and the virtual turning-off state exposure frame image 721 after the filtering. The controller 210 selects a virtual turning-off state exposure frame image 721 having the smallest standard deviation of a corresponding differential (or difference) as a virtual turning-off state exposure frame image 721 used for the processing (S405).

For example, the controller 210 may filter the virtual turning-off state exposure frame image 721 by using a plurality of low-pass filters. The controller 210 may obtain (or generate) a plurality of filtered virtual turning-off state exposure frame images 721. The controller 210 may calculate the difference between the virtual turning-off state exposure frame image 721 before the filtering and the virtual turning-off state exposure frame image 721 after the filtering with respect to the plurality of filtered virtual turning-off state exposure frame images 721. The controller 210 may select a virtual turning-off state exposure frame image 721 having the smallest standard deviation of the difference between the virtual turning-off state exposure frame image 721 before the filtering and the virtual turning-off state exposure frame image 721 after the filtering from among the plurality of filtered virtual turning-off state exposure frame images 721. That is, the controller 210 may select a virtual turning-off state exposure frame image 721 having the smallest standard deviation of the difference from among the plurality of filtered virtual turning-off state exposure frame images 721.

The controller 210 performs a process of subtracting the selected virtual turning-off state exposure frame image 721 from the first frame image (S406).

According to the embodiment illustrated with respect to FIGS. 11-12, by performing the processing by using a virtual turning-off state exposure frame image 721 in which optimal filtering has been performed, edge noise due to the shift amount error of a pixel in the calculation of the virtual turning-off state exposure frame image 721 may be further reduced.

In the embodiment illustrated with respect to FIGS. 1-6, among two turning-on state exposure frame images 710 used to calculate the motion vector 730, a turning-on state exposure frame image 710 captured first is determined as a processing target. In an embodiment, among two turning-on state exposure frame images 710 used to calculate the motion vector 730, a turning-on state exposure frame image 710 captured later may be determined as a processing target. In other respects, the embodiment is the same as the embodiment illustrated with respect to FIGS. 1-6, and thus, redundant descriptions are omitted or simplified for conciseness.

Figure 13:
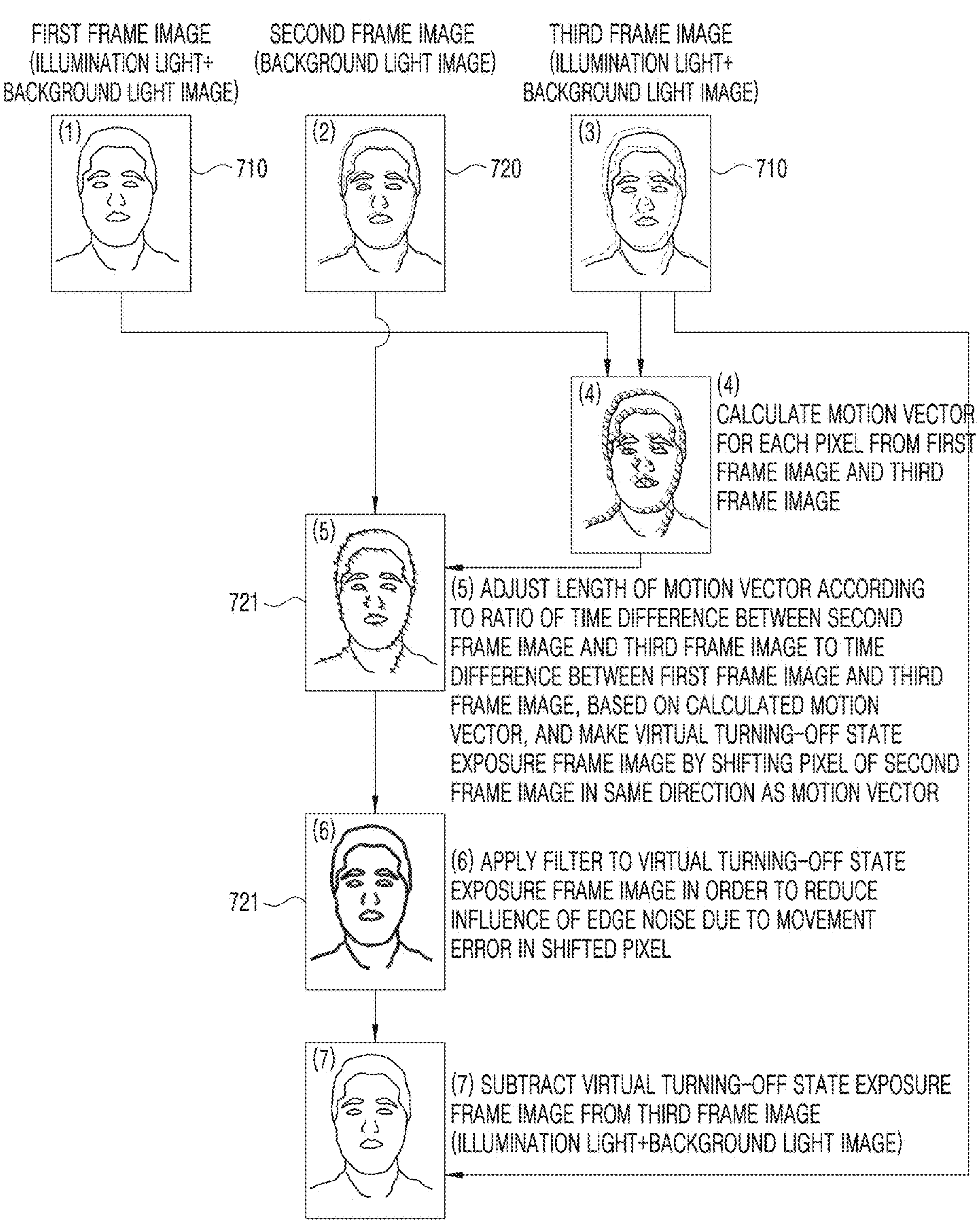
FIG. 13 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 13 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 13), the second frame image ((2) of FIG. 13), and the third frame image ((3) of FIG. 13) are a turning-on state exposure frame image 710, a turning-off state exposure frame image 720, and a turning-on state exposure frame image 710, respectively. These frame images 700 are captured in the order of the first frame image, the second frame image, and the third frame image. The first frame image, the second frame image, and the third frame image constitute a first turning-on state exposure frame image, a first turning-off state exposure frame image, and a second turning-on state exposure frame image, respectively. The third frame image is the turning-on state exposure frame image 710 of a processing target. The second frame image is the turning-off state exposure frame image 720 used for the processing. The first frame image and the third frame image are two frame images 700 used to calculate the motion vector 730. The second frame image used for the processing is interpolated into the first frame image and the third frame image that are used to calculate the motion vector 730. In FIG. 13, in the diagram of the second frame image ((2) of FIG. 13) and the diagram of the third frame image ((3) of FIG. 13), the outline of the subject 500 in the first frame image ((1) of FIG. 13) is indicated by a broken line.

The motion vector 730 is calculated for each pixel from the first frame image and the third frame image (see (4) of FIG. 13). The motion vector 730 is indicated by an arrow in (4) of FIG. 13.

The length of the calculated motion vector 730 is adjusted according to the ratio of the time difference between the second frame image and the third frame image to the time difference between the first frame image and the third frame image.

A virtual turning-off state exposure frame image 721 is calculated by performing a correction to shift each pixel of the second frame image in the same direction as the motion vector 730 by the length of the motion vector 731 after the length adjustment (see (5) of FIG. 13). The shift direction and shift amount of each pixel in the correction are indicated by arrows in the diagram of (5) of FIG. 13.

In order to reduce the influence of edge noise due to movement error in shift of each pixel when calculating the virtual turning-off state exposure frame image 721, a filter may be applied to the virtual turning-off state exposure frame image 721 (see (6) of FIG. 13).

A process of subtracting the virtual turning-off state exposure frame image 721 from the third frame image is performed (see (7) of FIG. 13).

Figure 14:
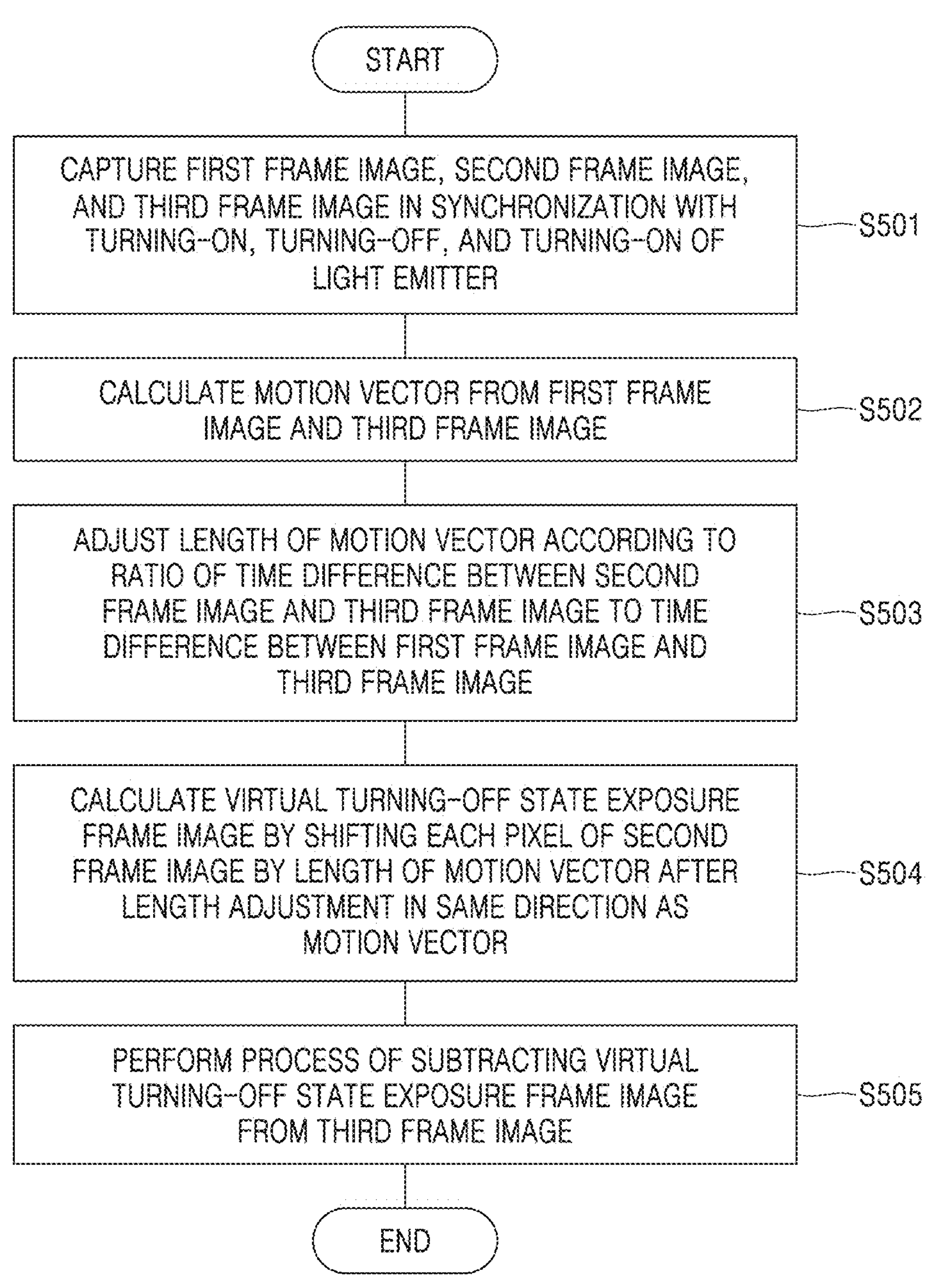
FIG. 14 is a flowchart illustrating an example of operations of the imaging device of FIG. 1, according to an embodiment.

FIG. 14 is a flowchart illustrating an example of operations of the imaging device 1 of FIG. 1, according to an embodiment.

The operations S501 to S506 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S501. In some embodiments, the controller 210 may access a second program stored in the memory 220 and execute the second program to cause the controller 210 to perform operations S502-S506.

The controller 130 captures the first frame image, the second frame image, and the third frame image, by the camera 120, in synchronization with the turning-on, turning-off, and turning-on of the light emitter 110 (S501). The controller 130 transmits the first frame image, the second frame image, and the third frame image to the image processing device 200 through the communicator 140.

The controller 210 calculates the motion vector 730 from the first frame image and the third frame image (S302). For example, the controller 210 receives the first frame image, the second frame image, and the third frame image through the communicator 230 and calculates the motion vector 730 from the first frame image and the third frame image.

The controller 210 adjusts the length of the motion vector (730) according to the ratio of the time difference between the second frame image and the third frame image to the time difference between the first frame image and the third frame image (S503).

The controller 210 shifts each pixel of the second frame image in the same direction as the motion vector 730 by the length of the motion vector 731 after the length adjustment and calculates a virtual turning-off state exposure frame image 721 (S504).

The controller 210 performs a process of subtracting the virtual turning-off state exposure frame image 721 from the third frame image (S505).

According to the embodiment illustrated with respect to FIGS. 13-14, because the turning-off state exposure frame image 720 subtracted from the turning-on state exposure frame image 710 is shifted by pixel unit, an image without artifacts, in which the influence of background light is removed even when the subject 500 moves in any direction and even when the camera 120 moves, may be obtained. In addition, in the embodiment illustrated with respect to FIGS. 13-14, in the generation of the virtual turning-off state exposure frame image 721, each pixel of the turning-off state exposure frame image 720 is shifted in order to advance a turning-off state exposure frame image 720 captured first to a time point of exposure of a turning-on state exposure frame image 710 captured later. The embodiment illustrated with respect to FIGS. 13-14 may be suitably employed in a case where the turning-on state exposure frame image 710 of a processing target is captured later than the turning-off state exposure frame image 720 used for processing and the capturing times of the two images 710 and 720 are relatively similar to each other. In the embodiment illustrated with respect to FIGS. 1-6, in the generation of the virtual turning-off state exposure frame image 721, each pixel of the turning-off state exposure frame image 720 is shifted in order to return a turning-off state exposure frame image 720 captured later to a time point of exposure of a turning-on state exposure frame image 710 captured first. The embodiment illustrated with respect to FIGS. 1-6 may be suitably employed in a case where the turning-on state exposure frame image 710 of a processing target is captured earlier than the turning-off state exposure frame image 720 used for processing and the capturing times of the two images 710 and 720 are relatively similar to each other.

In the embodiment illustrated with respect to FIGS. 1-6, two turning-on state exposure frame images 710 are used to calculate the motion vector 730. In an embodiment, two turning-off state exposure frame images 720 are used to calculate the motion vector 730. In other respects, the embodiment is the same as the embodiment illustrated with respect to FIGS. 1-6, and thus, redundant descriptions are omitted or simplified for conciseness.

Figure 15:
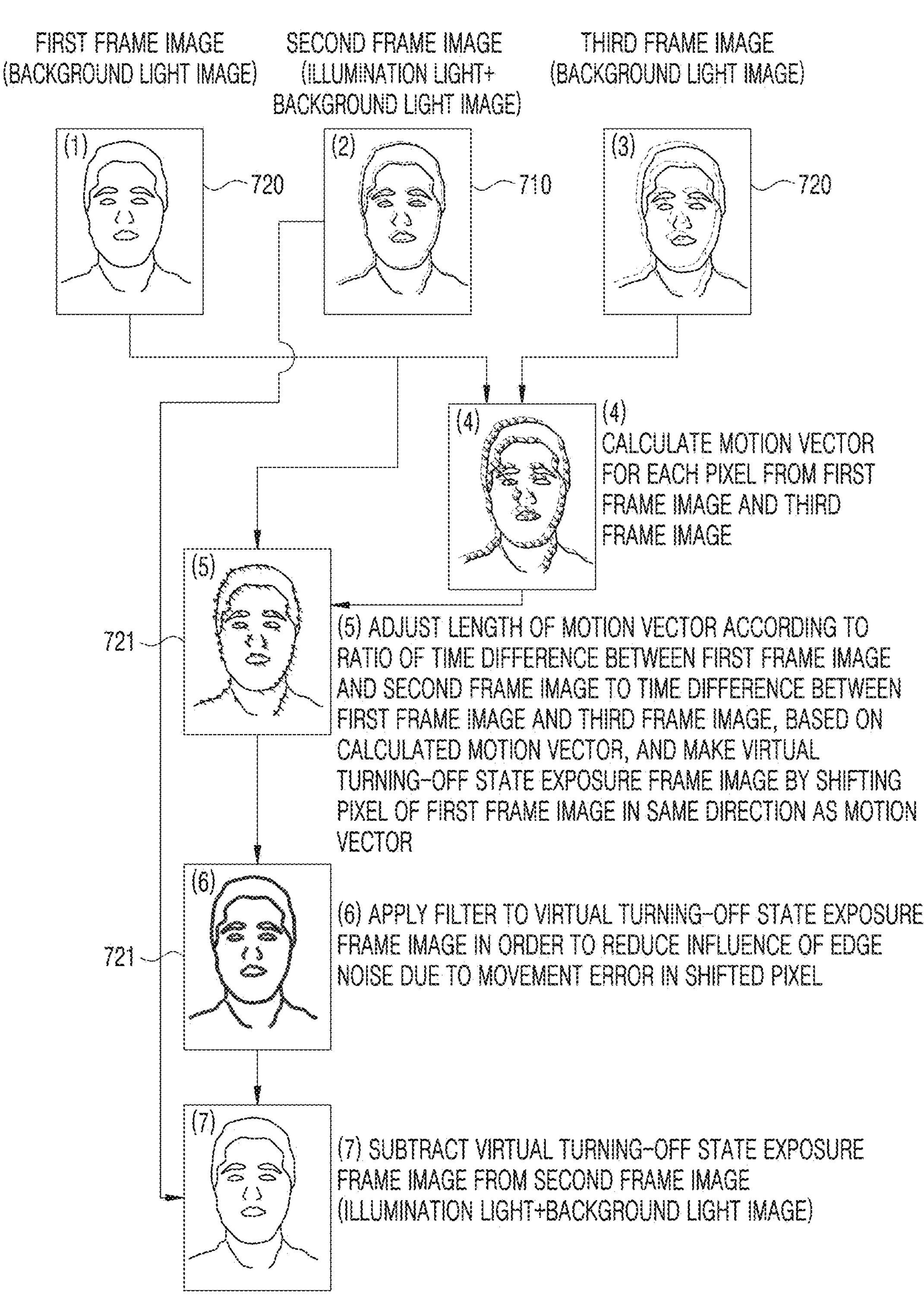
FIG. 15 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 15 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 15), the second frame image ((2) of FIG. 15), and the third frame image ((3) of FIG. 13) are a turning-off state exposure frame image 720, a turning-on state exposure frame image 710, and a turning-off state exposure frame image 720, respectively. These frame images 700 are captured in the order of the first frame image, the second frame image, and the third frame image. The first frame image, the second frame image, and the third frame image constitute a first turning-off state exposure frame image, a first turning-on state exposure frame image, and a second turning-off state exposure frame image, respectively. The second frame image is the turning-on state exposure frame image 710 of a processing target. The first frame image is the turning-off state exposure frame image 720 used for the processing. The first frame image and the third frame image are two frame images 700 used to calculate a motion vector 730. The second frame image, which is a processing target, is interpolated into the first frame image and the third frame image that are used to calculate the motion vector 730. In FIG. 15, in the second frame image ((2) of FIG. 15) and the third frame image ((3)

of FIG. 15), the outline of the subject 500 in the first frame image ((1) of FIG. 15) is indicated by a broken line.

The motion vector 730 is calculated for each pixel from the first frame image and the third frame image (see (4) of FIG. 15). The motion vector 730 is indicated by an arrow in (4) of FIG. 15.

The length of the calculated motion vector 730 is adjusted according to the ratio of the time difference between a time at which the first frame image is captured and a time at which the second frame image is captured to the time difference between the time at which the first frame image is captured and a time at which the third frame image is captured.

A virtual turning-off state exposure frame image 721 is calculated by performing a correction to shift each pixel of the first frame image in the same direction as the motion vector 730 by the length of the motion vector 731 after the length adjustment (see (5) of FIG. 15). The shift direction and shift amount of each pixel in the correction are indicated by arrows in the diagram of (5) of FIG. 15.

In order to reduce the influence of edge noise due to movement error in shift of each pixel when calculating the virtual turning-off state exposure frame image 721, a filter may be applied to the virtual turning-off state exposure frame image 721 (see (6) of FIG. 15).

A process of subtracting the virtual turning-off state exposure frame image 721 from the second frame image is performed (see (7) of FIG. 15).

Figure 16:
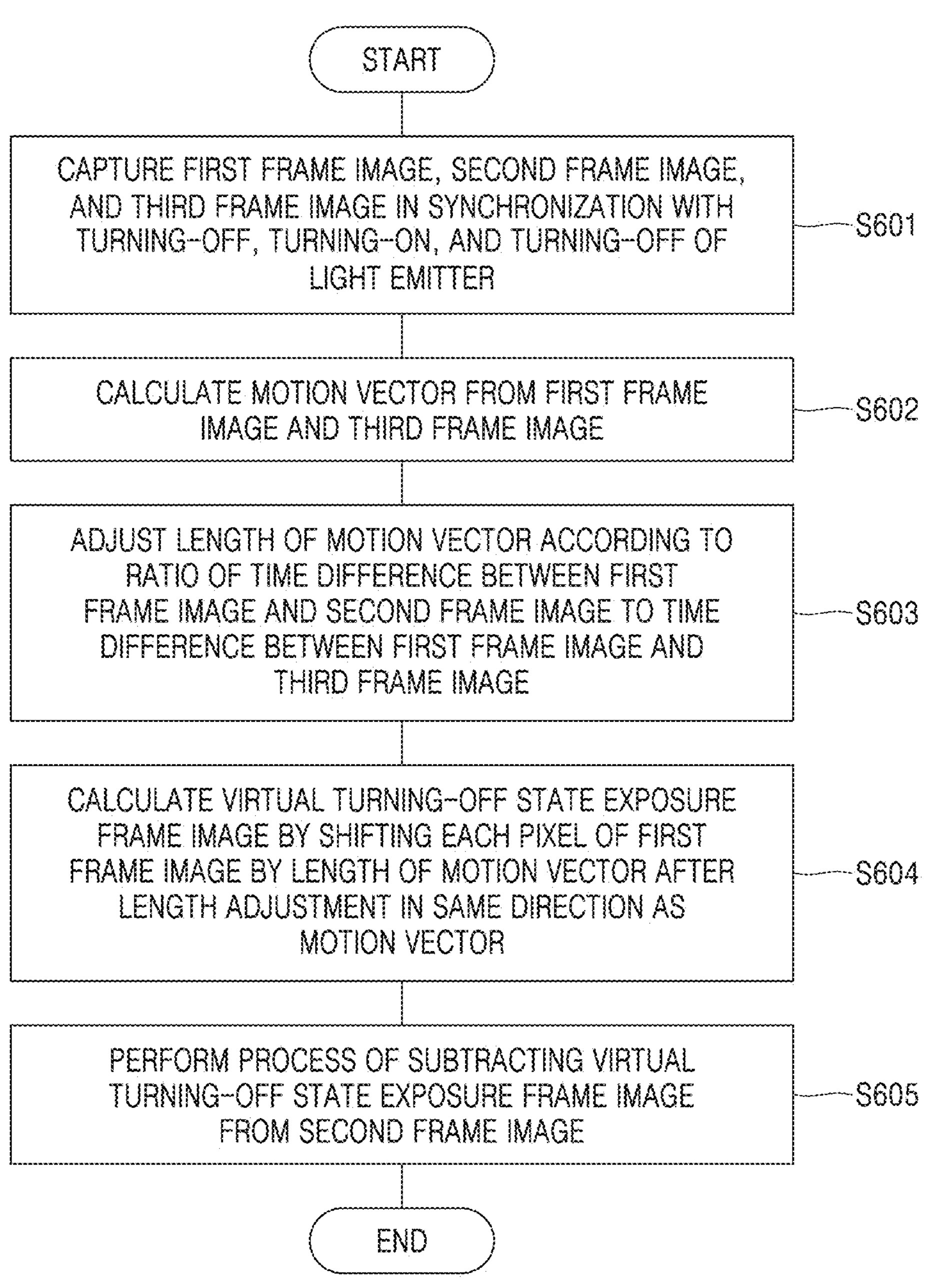
FIG. 16 is a flowchart illustrating an example of operations of the imaging device of FIG. 1, according to an embodiment.

FIG. 16 is a flowchart illustrating an example of operations of the imaging device 1 of FIG. 1, according to an embodiment.

The operations S601-S605 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S601. In some embodiments, the controller 210 may access a second program stored in the memory 220 and execute the second program to cause the controller 210 to perform operations S602-S605.

The controller 130 captures the first frame image, the second frame image, and the third frame image, by the camera 120, in synchronization with the turning-off, turning-on, and turning-off of the light emitter 110 (S601). For example, the first frame image may refer to the first turning-off state exposure frame image. The second frame image may refer to the first turning-on state exposure frame image. The third frame image may refer to the second turning-off state exposure frame image. The controller 130 transmits a first frame image, a second frame image, and a third frame image to the image processing device 200 through the communicator 140.

The controller 210 calculates a motion vector 730 from the first frame image and the third frame image (S602). For example, the controller 210 receives the first frame image, the second frame image, and the third frame image through the communicator 230 and calculates a motion vector 730 from the first frame image and the third frame image.

The controller 210 adjusts the length of the motion vector 730 according to the ratio of the time difference between a time at which the first frame image is captured and a time at which the second frame image is captured to the time difference between the time at which the first frame image is captured and a time at which the third frame image is captured (S603).

The controller 210 shifts each pixel of the first frame image in the same direction as the motion vector 730 by the length of the motion vector 731 after the length adjustment and calculates a virtual turning-off state exposure frame image 721 (S604).

The controller 210 performs a process of subtracting the virtual turning-off state exposure frame image 721 from the second frame image (S605).

According to the embodiment illustrated in FIGS. 15-16, when the background light is strong and the turning-on state exposure frame image 710 is close to the saturation level of the camera 120, and thus, it is difficult to obtain the contrast difference of the characteristic amount of the turning-on state exposure frame image 710, the precision of the motion vector 730 may be improved by calculating the motion vector 730 using two turning-off state exposure frame images 720.

In the embodiment illustrated with respect to FIGS. 15-16, a virtual turning-off state exposure frame image 721 is generated by shifting each pixel of the turning-off state exposure frame image 720 captured first from among two turning-off state exposure frame images 720 used to calculate the motion vector 730. For example, the turning-off state exposure frame image 720 captured first may be a turning-off state exposure frame image 720 used for processing. In an embodiment, each pixel of the turning-off state exposure frame image 720 captured later is shifted to generate a virtual turning-off state exposure frame image 721. For example, the turning-off state exposure frame image 720 captured later may be a turning-off state exposure frame image 720 used for processing. In other respects, the embodiment is the same as the embodiment illustrated with respect to FIGS. 15-16, and thus, redundant descriptions are omitted or simplified for conciseness.

Figure 17:
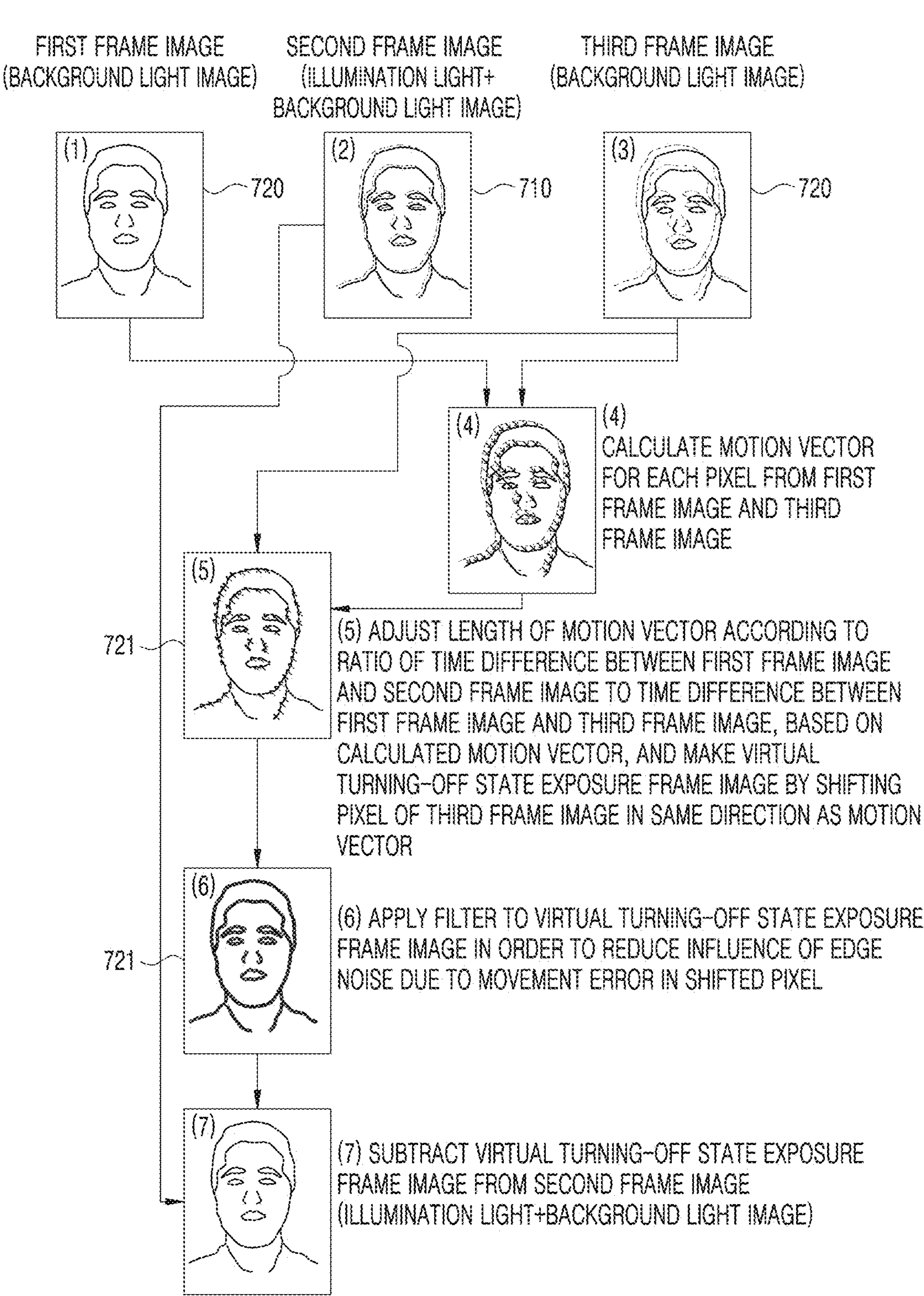
FIG. 17 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 17 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 17), the second frame image ((2) of FIG. 17), and the third frame image ((3) of FIG. 17) are a turning-off state exposure frame image 720, a turning-on state exposure frame image 710, and a turning-off state exposure frame image 720, respectively. These frame images 700 are captured in the order of the first frame image, the second frame image, and the third frame image. The first frame image, the second frame image, and the third frame image constitute a first turning-off state exposure frame image, a first turning-on state exposure frame image, and a second turning-off state exposure frame image, respectively. The second frame image is the turning-on state exposure frame image 710 of a processing target. The third frame image is the turning-off state exposure frame image 720 used for the processing. The first frame image and the third frame image are two frame images 700 used to calculate a motion vector 730. The second frame image, which is a processing target, is interpolated into the first frame image and the third frame image that are used to calculate the motion vector 730. In FIG. 17, in the second frame image ((2) of FIG. 17) and the third frame image ((3) of FIG. 17), the outline of the subject 500 in the first frame image ((1) of FIG. 17) is indicated by a broken line.

The motion vector 730 is calculated for each pixel from the first frame image and the third frame image (see (4) of FIG. 17). The motion vector 730 is indicated by an arrow in (4) of FIG. 17.

The length of the calculated motion vector 730 is adjusted according to the ratio of the time difference between a time at which the second frame image is captured and a time at which the third frame image is captured to the time difference between a time at which the first frame image is captured and the time at which the third frame image is captured.

A virtual turning-off state exposure frame image 721 is calculated by performing a correction to shift each pixel of the third frame image in the opposite direction to the motion vector 730 by the length of the motion vector 731 after the length adjustment (see (5) of FIG. 17). The shift direction and shift amount of each pixel in the correction are indicated by arrows in the diagram of (5) of FIG. 17.

In order to reduce the influence of edge noise due to movement error in shift of each pixel when calculating the virtual turning-off state exposure frame image 721, a filter may be applied to the virtual turning-off state exposure frame image 721 (see (6) of FIG. 17).

A process of subtracting the virtual turning-off state exposure frame image 721 from the second frame image is performed (see (7) of FIG. 17).

Figure 18:
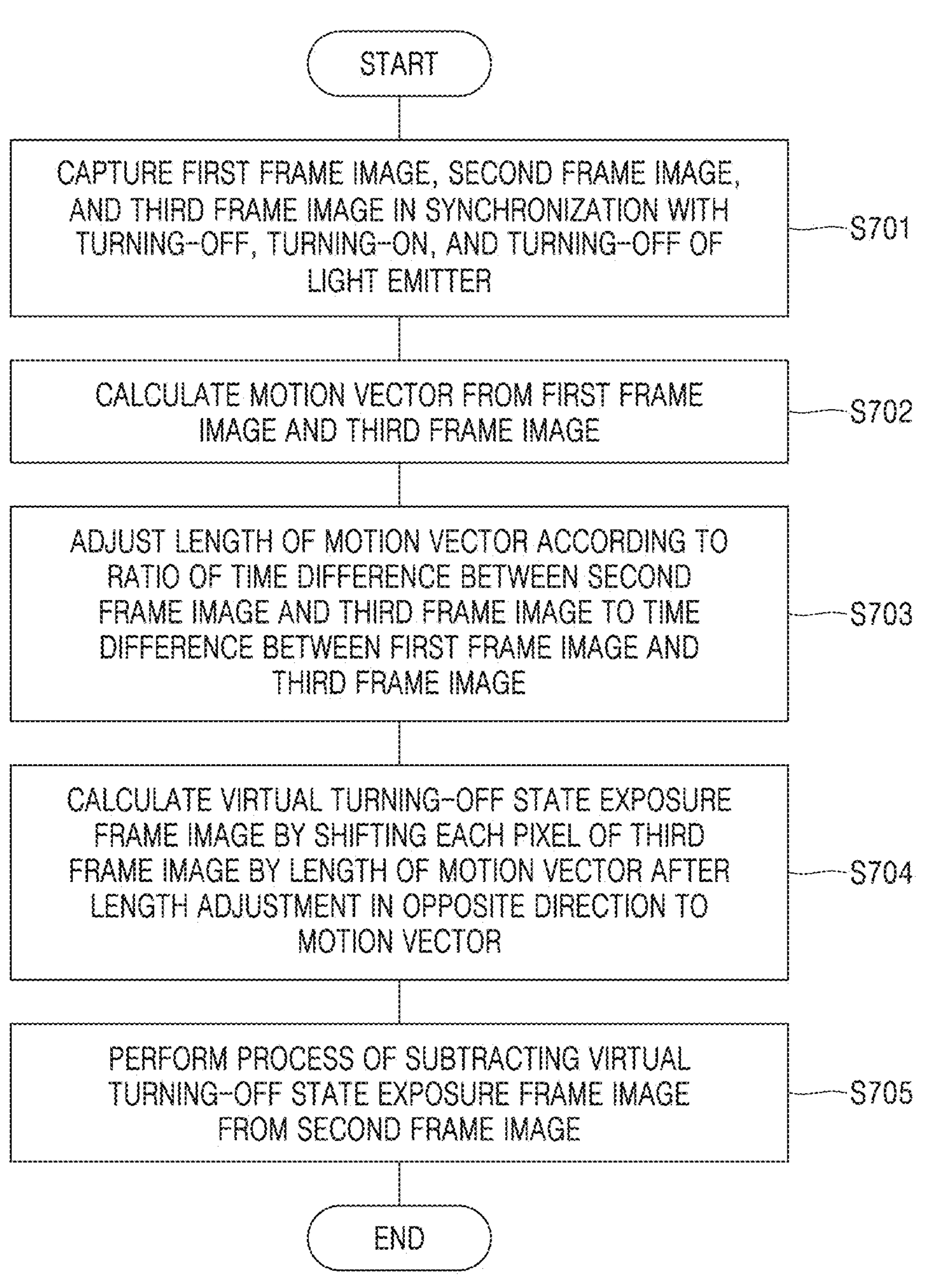
FIG. 18 is a flowchart illustrating an example of operations of the imaging device of FIG. 1, according to an embodiment.

FIG. 18 is a flowchart illustrating an example of operations of the imaging device 1 of FIG. 1, according to an embodiment.

The operations S701 to S705 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S701. In some embodiments, the controller 210 may access a second program stored in the memory 220 and execute the second program to cause the controller 210 to perform operations S702-S705.

The controller 130 captures the first frame image, the second frame image, and the third frame image, by the camera 120, in synchronization with the turning-off, turning-on, and turning-off of the light emitter 110 (S701). For example, the first frame image may refer to the first turning-off state exposure frame image. The second frame image may refer to the first turning-on state exposure frame image. The third frame image may refer to the second turning-off state exposure frame image. The controller 130 transmits a first frame image, a second frame image, and a third frame image to the image processing device 200 through the communicator 140.

The controller 210 calculates a motion vector 730 from the first frame image and the third frame image (S702). For example, the controller 210 receives the first frame image, the second frame image, and the third frame image through the communicator 230 and calculates a motion vector 730 from the first frame image and the third frame image.

The controller 210 adjusts the length of the motion vector 730 according to the ratio of the time difference between a time at which the second frame image is captured and a time at which the third frame image is captured to the time difference between a time at which the first frame image is captured and the time at which the third frame image is captured (S703).

The controller 210 shifts each pixel of the third frame image in the opposite direction to the motion vector 730 by the length of the motion vector 731 after the length adjustment and calculates a virtual turning-off state exposure frame image 721 (S704).

The controller 210 performs a process of subtracting the virtual turning-off state exposure frame image 721 from the second frame image (S705).

According to the embodiment illustrated with respect to FIGS. 17-18, in the generation of the virtual turning-off state exposure frame image 721, each pixel of the turning-off state exposure frame image 720 is shifted in order to return a turning-off state exposure frame image 720 captured later to a time point of exposure of a turning-on state exposure frame image 710 captured first. The embodiment illustrated with respect to FIGS. 17-18 can be suitably employed in a case where the turning-on state exposure frame image 710 of a processing target is captured earlier than the turning-off state exposure frame image 720 used for processing and the capturing times of the two images 710 and 720 are relatively similar to each other.

In the embodiment illustrated with respect to FIGS. 15-16, in the generation of the virtual turning-off state exposure frame image 721, each pixel of the turning-off state exposure frame image 720 is shifted in order to advance a turning-off state exposure frame image 720 captured first to a time point of exposure of a turning-on state exposure frame image 710 captured later. The embodiment illustrated with respect to FIGS. 15-16 can be suitably employed in a case where the turning-on state exposure frame image 710 of a processing target is captured later than the turning-off state exposure frame image 720 used for processing and the capturing times of the two images 710 and 720 are relatively similar to each other. Both the embodiment illustrated with respect to FIGS. 15-16 and the embodiment illustrated with respect to FIGS. 17-18 may be flexibly employed depending on a capture situation or a capture control method.

In the embodiment illustrated with respect to FIGS. 1-6, frame images are captured in the order of a turning-on state exposure frame image 710, a turning-off state exposure frame image 720, and a turning-on state exposure frame image 710, and a virtual turning-off state exposure frame image 721 is generated by shifting each pixel of a turning-off state exposure frame image 720 interpolated into two turning-on state exposure frame images 710 used to calculate the moving vector 730. In an embodiment, frame images are captured in the order of a turning-on state exposure frame image 710, a turning-on state exposure frame image 710, and a turning-off state exposure frame image 720, and a virtual turning-off state exposure frame image 721 is generated by shifting each pixel of a turning-off state exposure frame image 720 extrapolated to two turning-on state exposure frame images 710 used to calculate the moving vector 730. In other respects, the embodiment is the same as the embodiment illustrated with respect to FIGS. 1-6, and thus, redundant descriptions are omitted or simplified for conciseness.

FIG. 19 is a diagram for explaining an example of two turning-on state exposure frame images 710 used to calculate a motion vector 730 and a turning-off state exposure frame image 720 used for processing, according to an embodiment.

An illumination control signal is a control signal for the controller 130 to turn the light emitter 110 on or off. An imaging element frame signal is a control signal for the controller 130 to expose the camera 120 and read an image signal from each element (pixel). In the present embodiment, after two turning-on state exposure frame images 710 are sequentially captured, two turning-off state exposure frame images 720 may be sequentially captured.

The first frame image, the second frame image, and the third frame image are frame images 700 that are sequentially captured in time. In FIG. 19, the first frame image and the second frame image are turning-on state exposure frame images 710. The third frame image is a turning-off state exposure frame image 720 The second frame image may be a turning-on state exposure frame images 710 of a processing target, the third frame image may be a turning-off state exposure frame image used for processing, and the first frame image and the second frame image may be two frame images 700 used to calculate the motion vector 730.

Figure 20:
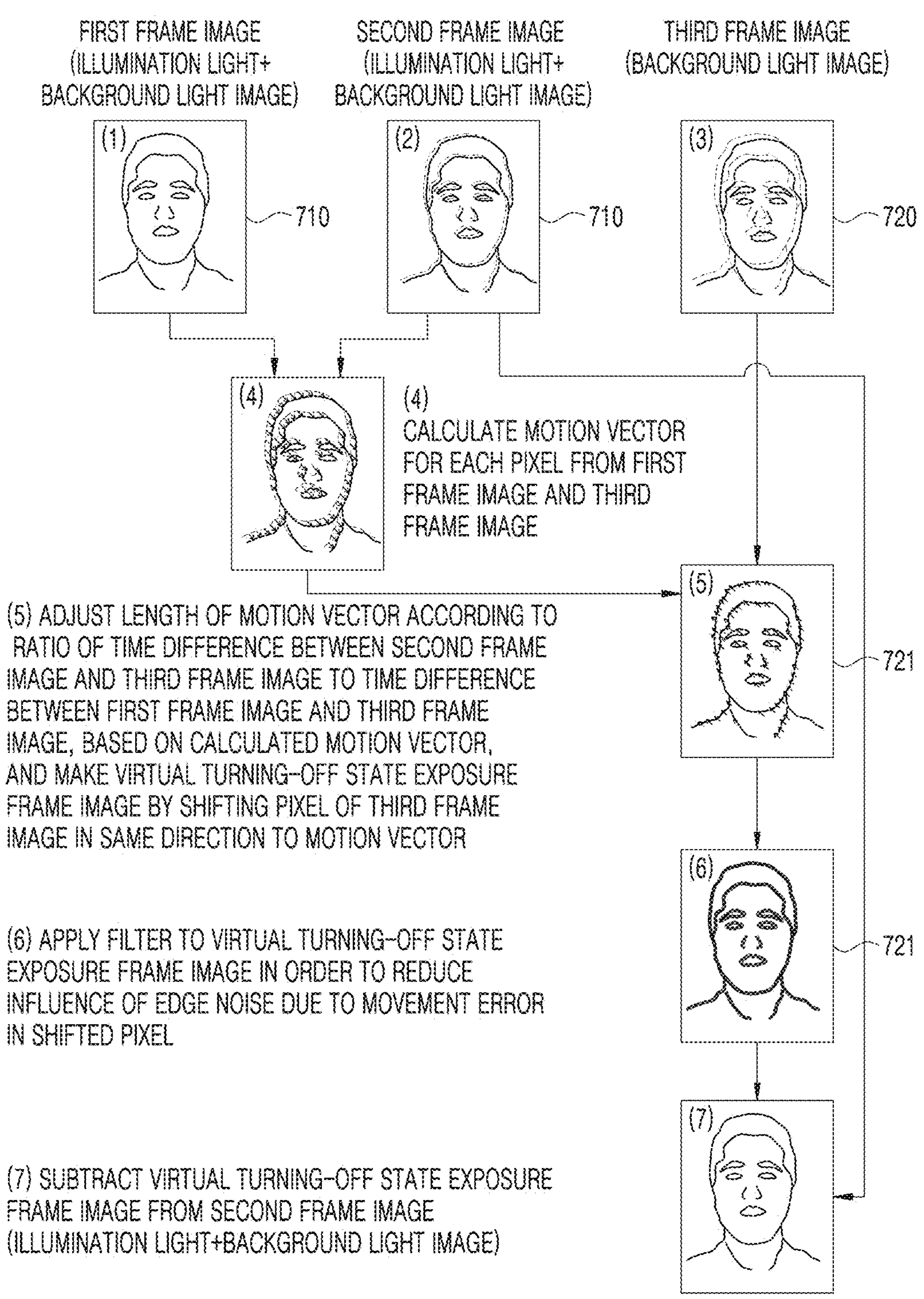
FIG. 20 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 20 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 20), the second frame image ((2) of FIG. 20), and the third frame image ((3) of FIG. 20) are a turning-on state exposure frame image 710, a turning-on state exposure frame image 710, and a turning-off state exposure frame image 720, respectively. These frame images 700 are captured in the order of the first frame image, the second frame image, and the third frame image. The first frame image, the second frame image, and the third frame image constitute a first turning-on state exposure frame image, a second turning-on state exposure frame image, and a first turning-off state exposure frame image, respectively. The second frame image is the turning-on state exposure frame image 710 of a processing target. The third frame image is the turning-off state exposure frame image 720 used for the processing. The first frame image and the second frame image are two frame images 700 used to calculate a motion vector 730. The third frame image used for processing is extrapolated to the first frame image and the second frame image that are used to calculate the motion vector 730. In FIG. 20, in the second frame image ((2) of FIG. 20) and the third frame image ((3) of FIG. 20), the outline of the subject 500 in the first frame image ((1) of FIG. 20) is indicated by a broken line.

The motion vector 730 is calculated for each pixel from the first frame image and the second frame image (see (4) of FIG. 20). The motion vector 730 is indicated by an arrow in (4) of FIG. 20.

The length of the calculated motion vector 730 is adjusted according to the ratio of the time difference between a time at which the second frame image is captured and a time at which the third frame image is captured to the time difference between a time at which the first frame image is captured and the time at which the third frame image is captured.

A virtual turning-off state exposure frame image 721 is calculated (or made) by performing a correction to shift each pixel of the third frame image in the opposite direction to the motion vector 730 by the length of the motion vector 731 after the length adjustment (see (5) of FIG. 20). The shift direction and shift amount of each pixel in the correction are indicated by arrows in the diagram of (5) of FIG. 20.

In order to reduce the influence of edge noise due to movement error in shift of each pixel when calculating the virtual turning-off state exposure frame image 721, a filter may be applied to the virtual turning-off state exposure frame image 721 (see (6) of FIG. 20).

A process of subtracting the virtual turning-off state exposure frame image 721 from the second frame image is performed (see (7) of FIG. 20).

Figure 21:
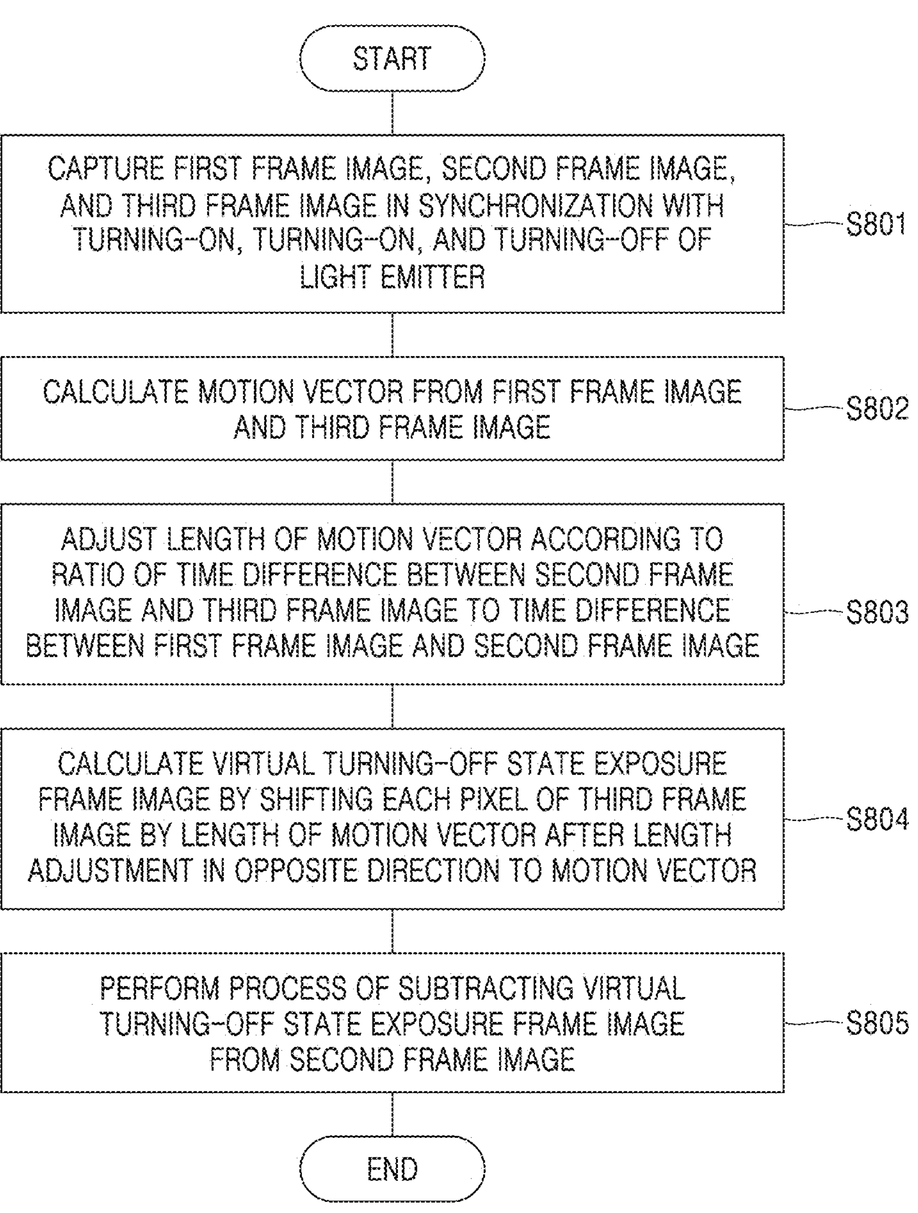
FIG. 21 is a flowchart illustrating an example of operations of the imaging device of FIG. 1, according to an embodiment.

FIG. 21 is a flowchart illustrating an example of operations of the imaging device 1 of FIG. 1, according to an embodiment.

The operations S801 to S805 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S801. In some embodiments, the controller 210 may access a second program stored in the memory 220 and execute the second program to cause the controller 210 to perform operations S802-S805.

The controller 130 captures the first frame image, the second frame image, and the third frame image, by the camera 120, in synchronization with the turning-on, turning-on, and turning-off of the light emitter 110 (S801). For example, the first frame image may refer to the first turning-on state exposure frame image. The second frame image may refer to the second turning-on state exposure frame image. The third frame image may refer to the first turning-off state exposure frame image. The controller 130 transmits a first frame image, a second frame image, and a third frame image to the image processing device 200 through the communicator 140.

The controller 210 calculates a motion vector 730 from the first frame image and the second frame image (S802). For example, the controller 210 receives the first frame image, the second frame image, and the third frame image through the communicator 230 and calculates a motion vector 730 from the first frame image and the second frame image.

The controller 210 adjusts the length of the motion vector 730 according to the ratio of the time difference between a time at which the second frame image is captured and a time at which the third frame image is captured to the time difference between a time at which the first frame image is captured and the time at which the second frame image is captured (S803).

The controller 210 shifts each pixel of the third frame image in the opposite direction to the motion vector 730 by the length of the motion vector 731 after the length adjustment and calculates a virtual turning-off state exposure frame image 721 (S804).

The controller 210 performs a process of subtracting the virtual turning-off state exposure frame image 721 from the second frame image (S805).

According to the embodiment illustrated with respect to FIGS. 19-21, as two exposures in which the turning-on of the light emitter 110 is continuous and two exposures in which the turning-off of the light emitter 110 is continuous are alternately repeated, even when the turning-off state exposure frame image 720 is not captured during the capturing of two turning-on state exposure frame images 710, the virtual turning-off state exposure frame image 721 may be appropriately calculated.

In the embodiment illustrated with respect to FIGS. 19-21, frame images are captured in the order of a turning-on state exposure frame image 710, a turning-on state exposure frame image 710, and a turning-off state exposure frame image 720, and a virtual turning-off state exposure frame image 721 is generated by shifting, in the opposite direction to the motion vector 730, each pixel of a turning-off state exposure frame image 720 extrapolated to two turning-on state exposure frame images 710 used to calculate the moving vector 730. In an embodiment, frame images are captured in the order of a turning-off state exposure frame image 720, a turning-on state exposure frame image 710, and a turning-on state exposure frame image 710, and a virtual turning-off state exposure frame image 721 is generated by shifting, in the same direction as the motion vector 730, each pixel of a turning-off state exposure frame image 720 extrapolated to two turning-on state exposure frame images 710 used to calculate the moving vector 730. In other respects, the embodiment is the same as the embodiment illustrated with respect to FIGS. 19-21, and thus, redundant descriptions are omitted or simplified for conciseness.

Figure 22:
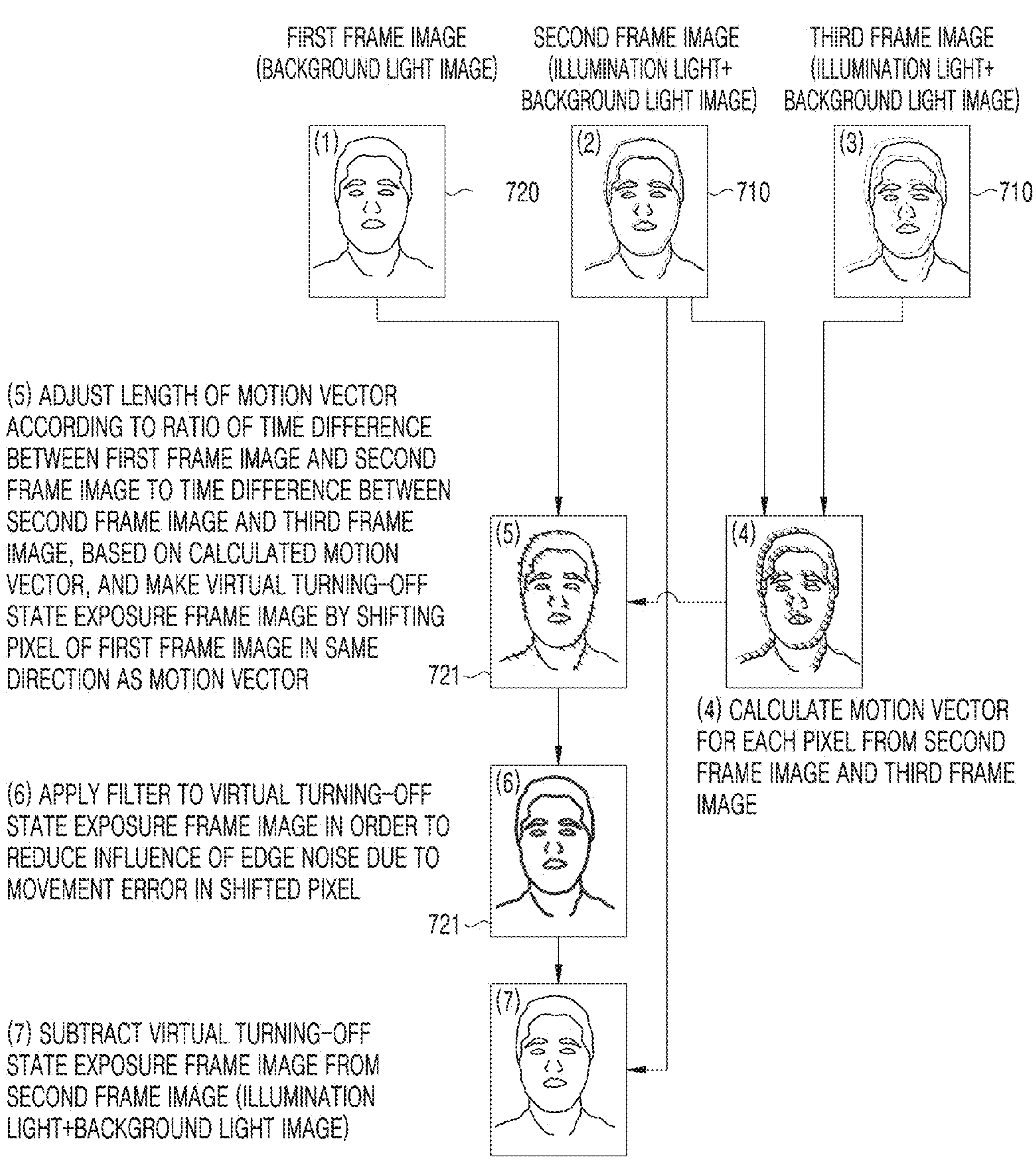
FIG. 22 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 22 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 22), the second frame image ((2) of FIG. 22), and the third frame image ((3) of FIG. 22) are a turning-off state exposure frame image 720, a turning-on state exposure frame image 710, and a turning-on state exposure frame image 710, respectively. These frame images 700 are captured in the order of the first frame image, the second frame image, and the third frame image. The first frame image, the second frame image, and the third frame image constitute a first turning-off state exposure frame image, a first turning-on state exposure frame image, and a second turning-on state exposure frame image, respectively. The second frame image is the turning-on state exposure frame image 710 of a processing target. The first frame image is the turning-off state exposure frame image 720 used for the processing. The second frame image and the third frame image are two frame images 700 used to calculate a motion vector 730. The first frame image used for processing is extrapolated to the second frame image and the third frame image that are used to calculate the motion vector 730. In FIG. 22, in the second frame image ((2) of FIG. 22) and the third frame image ((3) of FIG. 22), the outline of the subject 500 in the first frame image ((1) of FIG. 22) is indicated by a broken line.

The motion vector 730 is calculated for each pixel from the second frame image and the third frame image (see (4) of FIG. 22). The motion vector 730 is indicated by an arrow in (4) of FIG. 22.

The length of the calculated motion vector 730 is adjusted according to the ratio of the time difference between a time at which the first frame image is captured and a time at which the second frame image is captured to the time difference between the time at which the second frame image is captured and a time at which the third frame image is captured.

A virtual turning-off state exposure frame image 721 is calculated (or made) by performing a correction to shift each pixel of the first frame image in the same direction as the motion vector 730 by the length of the motion vector 731 after the length adjustment (see (5) of FIG. 22). The shift direction and shift amount of each pixel in the correction are indicated by arrows in the diagram of (5) of FIG. 22.

In order to reduce the influence of edge noise due to movement error in shift of each pixel when calculating the virtual turning-off state exposure frame image 721, a filter may be applied to the virtual turning-off state exposure frame image 721 (see (6) of FIG. 22).

A process of subtracting the virtual turning-off state exposure frame image 721 from the second frame image is performed (see (7) of FIG. 22).

Figure 23:
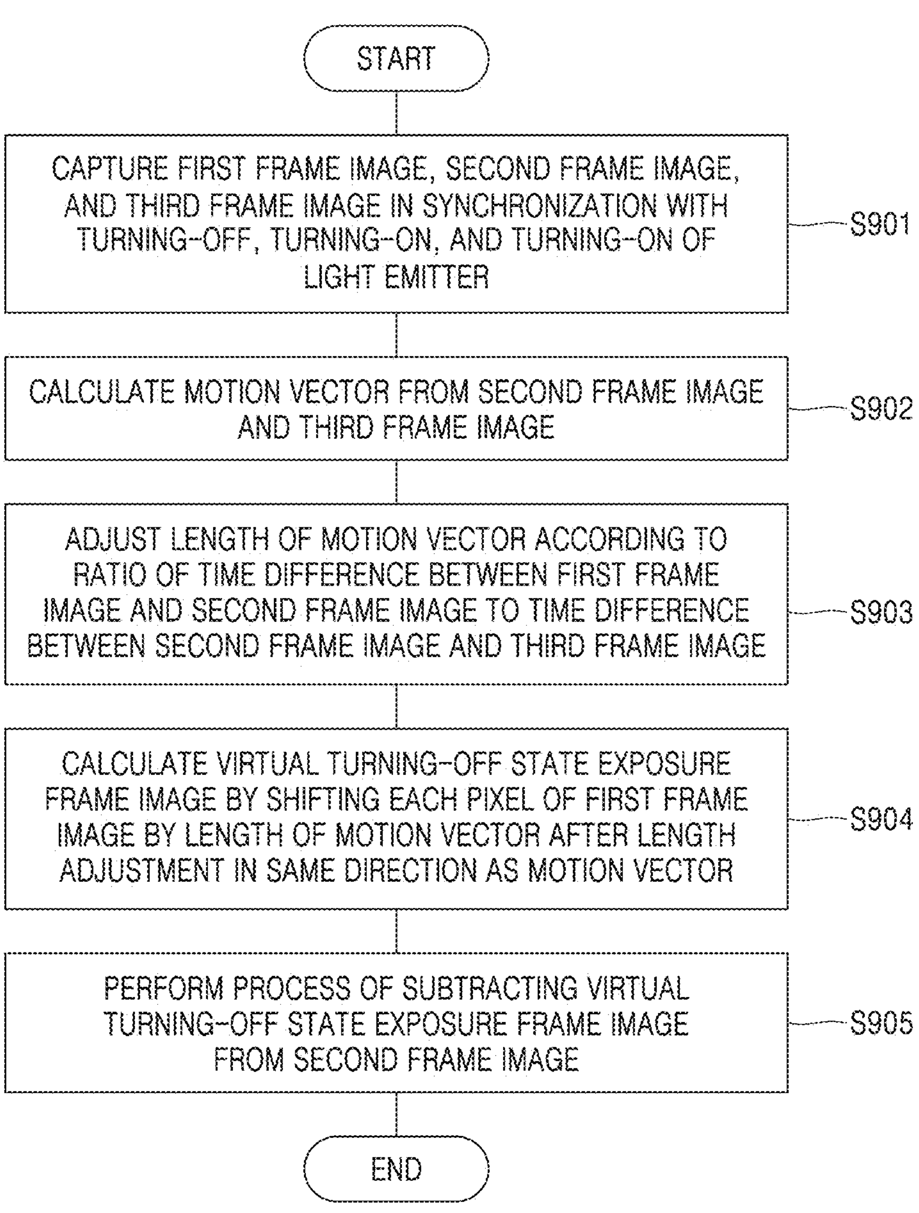
FIG. 23 is a flowchart illustrating an example of operations of the imaging device of FIG. 1, according to an embodiment.

FIG. 23 is a flowchart illustrating an example of operations of the imaging device 1 of FIG. 1, according to an embodiment.

The operations S901 to S905 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S901. In some embodiments, the controller 210 may access a second program stored in the memory 220 and execute the second program to cause the controller 210 to perform operations S902-S905.

The controller 130 captures the first frame image, the second frame image, and the third frame image, by the camera 120, in synchronization with the turning-off, turning-on, and turning-on of the light emitter 110 (S901). For example, the first frame image may refer to the first turning-off state exposure frame image. The second frame image may refer to the first turning-on state exposure frame image. The third frame image may refer to the second turning-on state exposure frame image. The controller 130 transmits a first frame image, a second frame image, and a third frame image to the image processing device 200 through the communicator 140.

The controller 210 calculates a motion vector 730 from the second frame image and the third frame image (S902). For example, the controller 210 receives the first frame image, the second frame image, and the third frame image through the communicator 230 and calculates a motion vector 730 from the second frame image and the third frame image.

The controller 210 adjusts the length of the motion vector 730 according to the ratio of the time difference between a time at which the first frame image is captured and a time at which the second frame image is captured to the time difference between the time at which the second frame image is captured and a time at which the third frame image is captured (S903).

The controller 210 shifts each pixel of the first frame image in the same direction as the motion vector 730 by the length of the motion vector 731 after the length adjustment and calculates a virtual turning-off state exposure frame image 721 (S904).

The controller 210 performs a process of subtracting the virtual turning-off state exposure frame image 721 from the second frame image (S905).

According to the embodiment illustrated with respect to FIGS. 22-23, as in the embodiment illustrated with respect to FIGS. 19-21, as two exposures in which the turning-on of the light emitter 110 is continuous and two exposures in which the turning-off of the light emitter 110 is continuous are alternately repeated, even when the turning-off state exposure frame image 720 is not captured during the capturing of two turning-on state exposure frame images 710, the virtual turning-off state exposure frame image 721 may be appropriately calculated. In addition, the processing method may be optimized by selecting the embodiment illustrated with respect to FIGS. 22-23 or the embodiment illustrated with respect to FIGS. 19-21 based on the movement trajectory of the subject 500.

In the embodiment illustrated with respect to FIGS. 19-21, frame images are captured in the order of a turning-on state exposure frame image 710, a turning-on state exposure frame image 710, and a turning-off state exposure frame image 720, and a virtual turning-off state exposure frame image 721 is generated by shifting, in the opposite direction to the motion vector 730, each pixel of a turning-off state exposure frame image 720 extrapolated to two turning-on state exposure frame images 710 used to calculate the moving vector 730. In an embodiment, frame images are captured in the order of a turning-off state exposure frame image 720, a turning-off state exposure frame image 720, and a turning-on state exposure frame image 710, and a virtual turning-off state exposure frame image 721 is generated by shifting, in the same direction as the motion vector 730, each pixel of a turning-off state exposure frame image 720 used to process a turning-on state exposure frame image 710 extrapolated to two turning-off state exposure frame images 720 used to calculate the motion vector 730. In other respects, the embodiment is the same as the embodiment illustrated with respect to FIGS. 19-21, and thus, redundant descriptions are omitted or simplified for conciseness.

Figure 24:
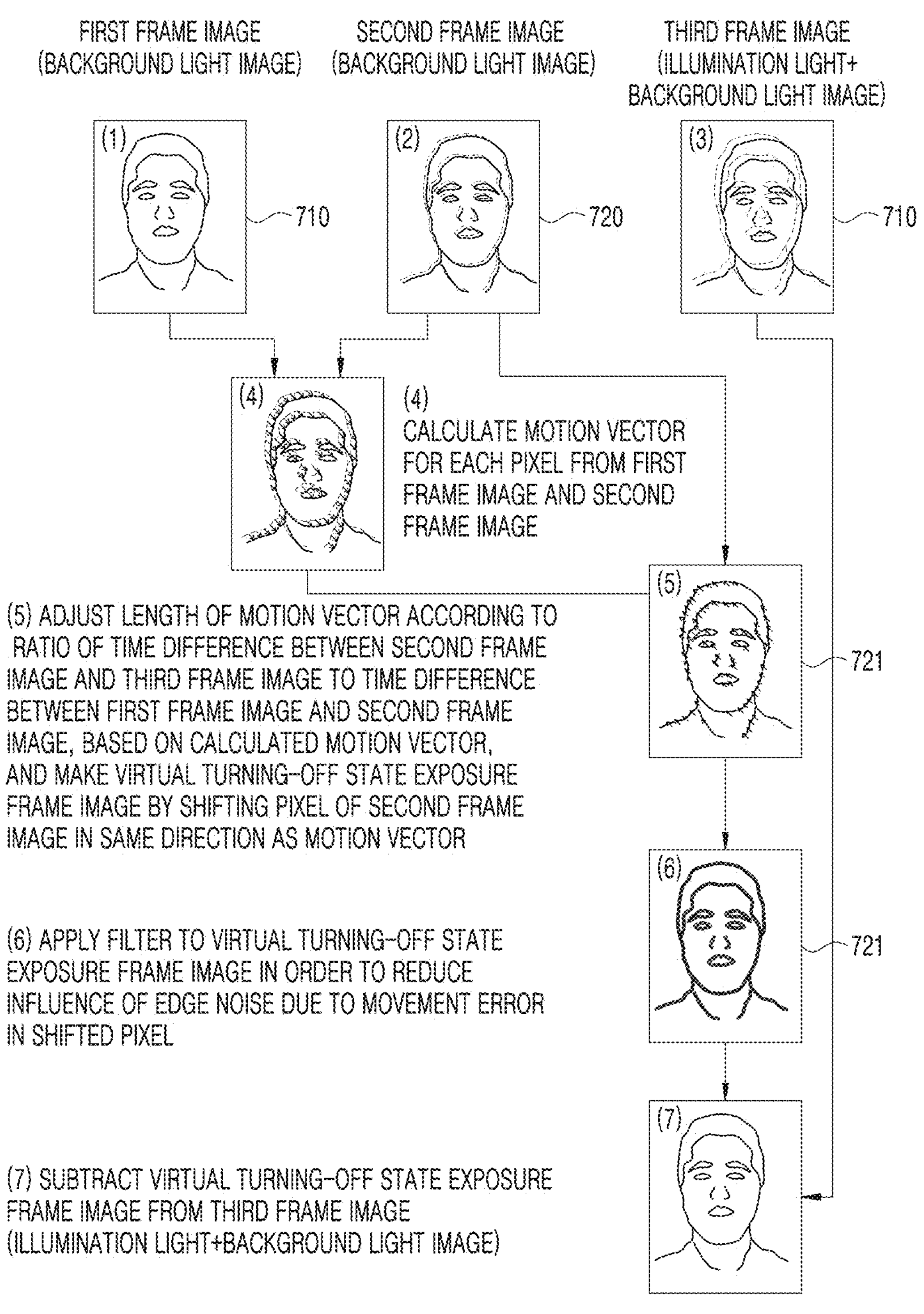
FIG. 24 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 24 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 24), the second frame image ((2) of FIG. 24), and the third frame image ((3) of FIG. 24) are a turning-off state exposure frame image 720, a turning-off state exposure frame image 720, and a turning-on state exposure frame image 710, respectively. These frame images 700 are captured in the order of the first frame image, the second frame image, and the third frame image. The first frame image, the second frame image, and the third frame image constitute a first turning-off state exposure frame image, a second turning-off state exposure frame image, and a first turning-on state exposure frame image, respectively. The third frame image is the turning-on state exposure frame image 710 of a processing target. The second frame image is the turning-off state exposure frame image 720 used for the processing. The first frame image and the second frame image are two frame images 700 used to calculate a motion vector 730. The third frame image that is a processing target is extrapolated to the first frame image and the second frame image that are used to calculate the motion vector 730. In FIG. 24, in the second frame image ((2) of FIG. 24) and the third frame image ((3) of FIG. 24), the outline of the subject 500 in the first frame image ((1) of FIG. 24) is indicated by a broken line.

The motion vector 730 is calculated for each pixel from the first frame image and the second frame image (see (4) of FIG. 24). The motion vector 730 is indicated by an arrow in (4) of FIG. 24.

The length of the calculated motion vector 730 is adjusted according to the ratio of the time difference between a time at which the second frame image is captured and a time at which the third frame image is captured to the time difference between a time at which the first frame image is captured and the time at which the second frame image is captured.

A virtual turning-off state exposure frame image 721 is calculated by performing a correction to shift each pixel of the second frame image in the same direction as the motion vector 730 by the length of the motion vector 731 after the length adjustment (see (5) of FIG. 24). The shift direction and shift amount of each pixel in the correction are indicated by arrows in the diagram of (5) of FIG. 24.

In order to reduce the influence of edge noise due to movement error in shift of each pixel when calculating the virtual turning-off state exposure frame image 721, a filter may be applied to the virtual turning-off state exposure frame image 721 (see (6) of FIG. 24).

A process of subtracting the virtual turning-off state exposure frame image 721 from the third frame image is performed (see (7) of FIG. 24).

Figure 25:
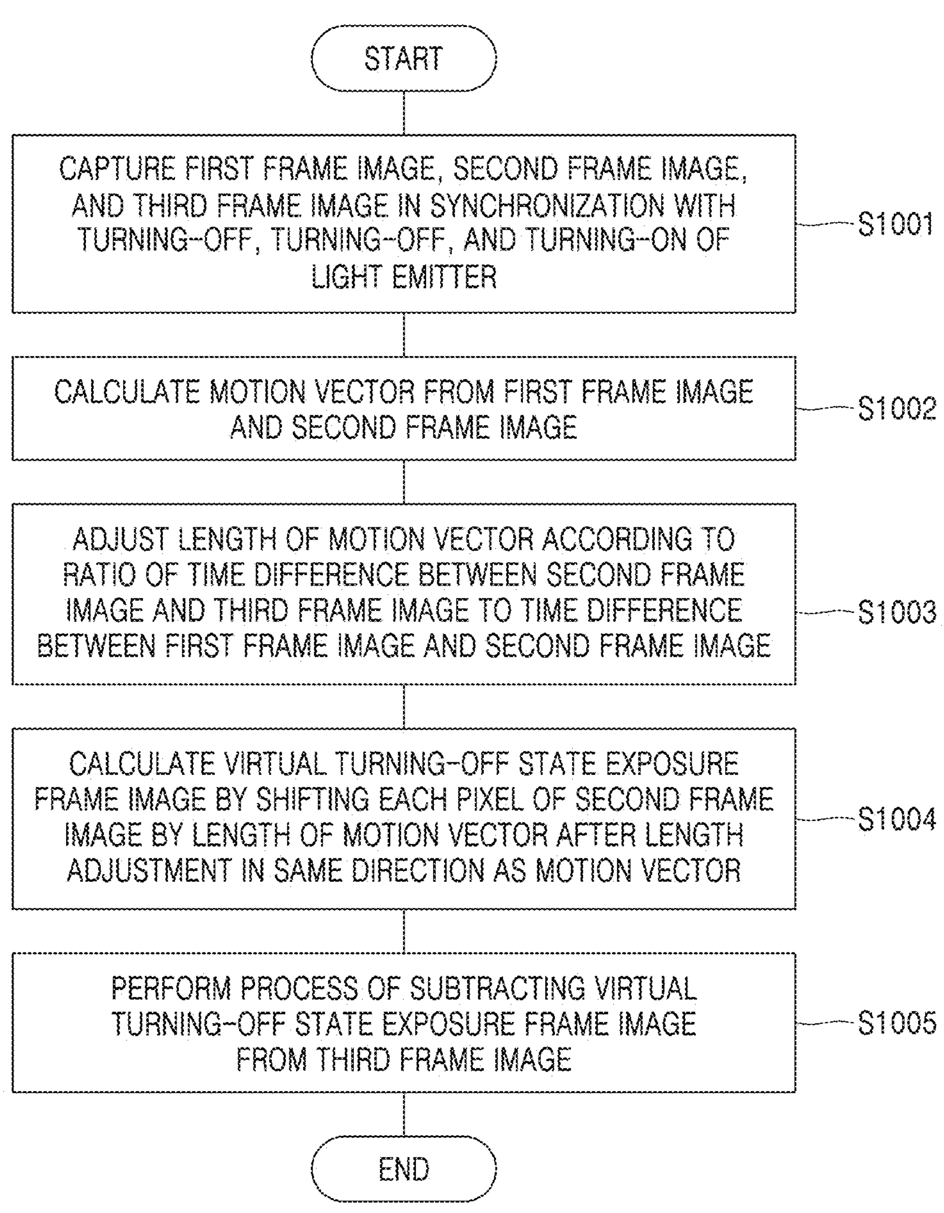
FIG. 25 is a flowchart illustrating an example of operations of the imaging device of FIG. 1, according to an embodiment.

FIG. 25 is a flowchart illustrating an example of operations of the imaging device 1 of FIG. 1, according to an embodiment.

The operations S1001 to S1005 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S1001. In some embodiments, the controller 210 may access a second program stored in the memory 220 and execute the second program to cause the controller 210 to perform operations S1002-S1005.

The controller 130 captures the first frame image, the second frame image, and the third frame image, by the camera 120, in synchronization with the turning-off, turning-off, and turning-on of the light emitter 110 (S1001). For example, the first frame image may refer to the first turning-off state exposure frame image. The second frame image may refer to the second turning-off state exposure frame image. The third frame image may refer to the first turning-on state exposure frame image. The controller 130 transmits a first frame image, a second frame image, and a third frame image to the image processing device 200 through the communicator 140.

The controller 210 calculates a motion vector 730 from the first frame image and the second frame image (S1002). For example, the controller 210 receives the first frame image, the second frame image, and the third frame image through the communicator 230 and calculates a motion vector 730 from the first frame image and the second frame image.

The controller 210 adjusts the length of the motion vector 730 according to the ratio of the time difference between a time at which the second frame image is captured and a time at which the third frame image is captured to the time difference between a time at which the first frame image is captured and the time at which the second frame image is captured (S1003).

The controller 210 shifts each pixel of the second frame image in the same direction as the motion vector 730 by the length of the motion vector 731 after the length adjustment and calculates a virtual turning-off state exposure frame image 721 (S1004).

The controller 210 performs a process of subtracting the virtual turning-off state exposure frame image 721 from the third frame image (S1005).

According to the embodiment illustrated with respect to FIGS. 24-25, even when a plurality of exposures, in which the turning-on of the light emitter 110 is continuous, and a plurality of exposures, in which the turning-off of the light-emitter 110 is continuous, are alternately repeated, the background light is strong, and the turning-on state exposure frame image 710 is close to the saturation level of the camera 120, making it difficult to obtain a contrast difference in the characteristic amount of the turning-on state exposure frame image 710, the precision of the motion vector 730 may be improved by calculating the motion vector 730 using two turning-off state exposure frame images 720.

In the embodiment illustrated with respect to FIGS. 24-25, frame images are captured in the order of a turning-off state exposure frame image 720, a turning-off state exposure frame image 720, and a turning-on state exposure frame image 710, and a virtual turning-off state exposure frame image 721 is generated by shifting, in the same direction as the motion vector 730, each pixel of a turning-off state exposure frame image 720 used to process a turning-on state exposure frame image 710 extrapolated to two turning-off state exposure frame images 720 used to calculate the motion vector 730. In an embodiment, frame images are captured in the order of a turning-on state exposure frame image 710, a turning-off state exposure frame image 720, and a turning-off state exposure frame image 720, and a virtual turning-off state exposure frame image 721 is generated by shifting, in the opposite direction to the motion vector 730, each pixel of a turning-off state exposure frame image 720 used to process a turning-on state exposure frame image 710 extrapolated to two turning-off state exposure frame images 720 used to calculate the motion vector 730. In other respects, the embodiment is the same as the embodiment illustrated with respect to FIGS. 24-25, and thus, redundant descriptions are omitted or simplified for conciseness.

Figure 26:
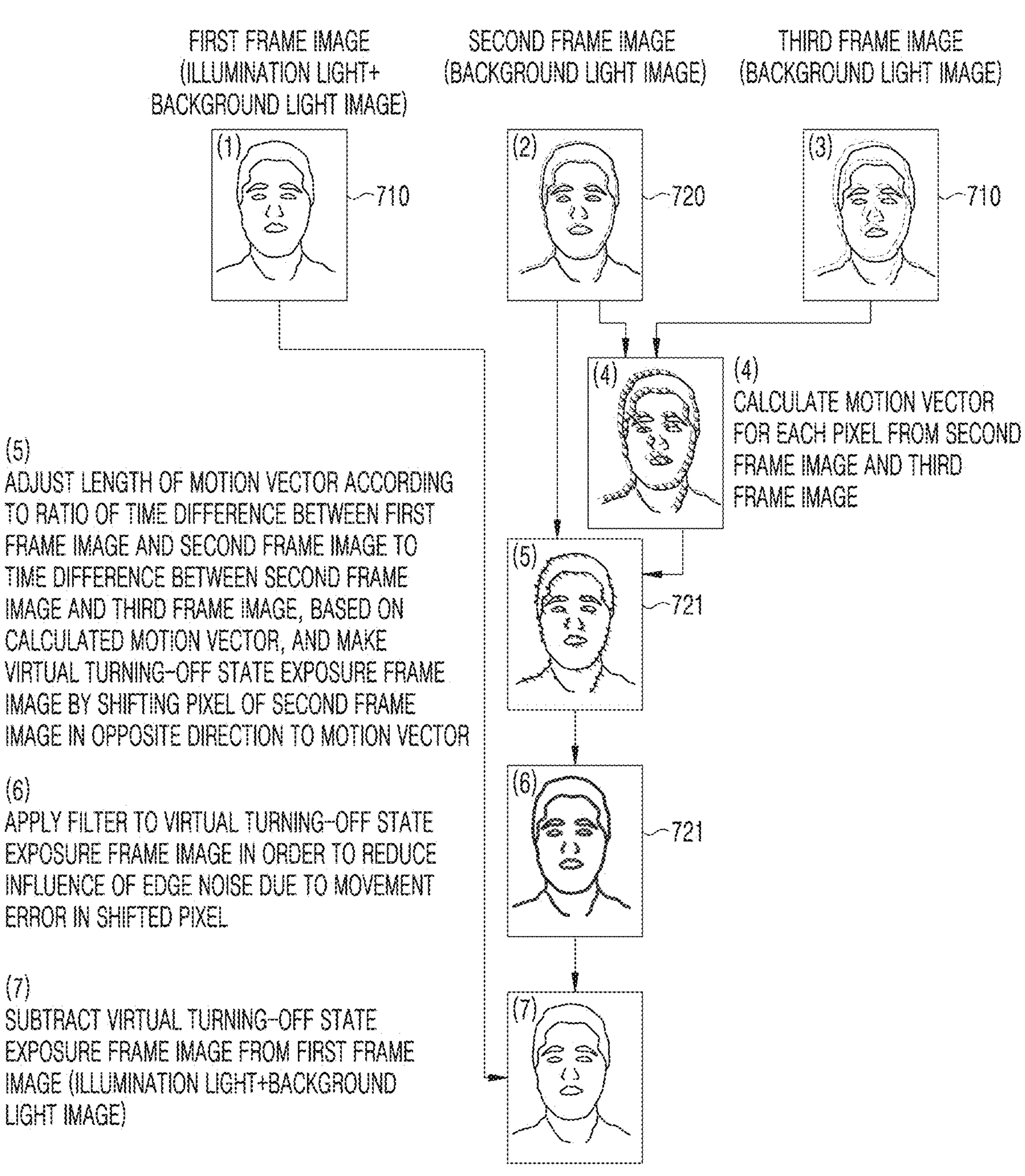
FIG. 26 is a diagram for explaining an example of calculating a motion vector, adjusting the length of the motion vector, calculating a virtual turning-off state exposure frame image, and subtracting the virtual turning-off state exposure frame image from a turning-on state exposure frame image, according to an embodiment.

FIG. 26 is a diagram for explaining an example of calculating a motion vector 730, adjusting the length of the motion vector 730, calculating a virtual turning-off state exposure frame image 721, and subtracting the virtual turning-off state exposure frame image 721 from a turning-on state exposure frame image 710, according to an embodiment.

The first frame image ((1) of FIG. 26), the second frame image ((2) of FIG. 26), and the third frame image ((3) of FIG. 26) are a turning-on state exposure frame image 710, a turning-off state exposure frame image 720, and a turning-off state exposure frame image 720, respectively. These frame images 700 are captured in the order of the first frame image, the second frame image, and the third frame image. The first frame image, the second frame image, and the third frame image constitute a first turning-on state exposure frame image, a first turning-off state exposure frame image, and a second turning-off state exposure frame image, respectively. The first frame image is the turning-on state exposure frame image 710 of a processing target. The second frame image is the turning-off state exposure frame image 720 used for the processing. The second frame image and the third frame image are two frame images 700 used to calculate a motion vector 730. The first frame image that is a processing target is extrapolated to the second frame image and the third frame image that are used to calculate the motion vector 730. In FIG. 26, in the second frame image ((2) of FIG. 26) and the third frame image ((3) of FIG. 26), the outline of the subject 500 in the first frame image ((1) of FIG. 26) is indicated by a broken line.

The motion vector 730 is calculated for each pixel from the second frame image and the third frame image (see (4) of FIG. 26). The motion vector 730 is indicated by an arrow in (4) of FIG. 26.

The length of the calculated motion vector 730 is adjusted according to the ratio of the time difference between a time at which the first frame image is captured and a time at which the second frame image is captured to the time difference between the time at which the second frame image is captured and a time at which the third frame image is captured.

A virtual turning-off state exposure frame image 721 is calculated (or made) by performing a correction to shift each pixel of the second frame image in the opposite direction to the motion vector 730 by the length of the motion vector 731 after the length adjustment (see (5) of FIG. 26). The shift direction and shift amount of each pixel in the correction are indicated by arrows in the diagram of (5) of FIG. 26.

In order to reduce the influence of edge noise due to movement error in shift of each pixel when calculating the virtual turning-off state exposure frame image 721, a filter may be applied to the virtual turning-off state exposure frame image 721 (see (6) of FIG. 26).

A process of subtracting the virtual turning-off state exposure frame image 721 from the third frame image is performed (see (7) of FIG. 26).

Figure 27:
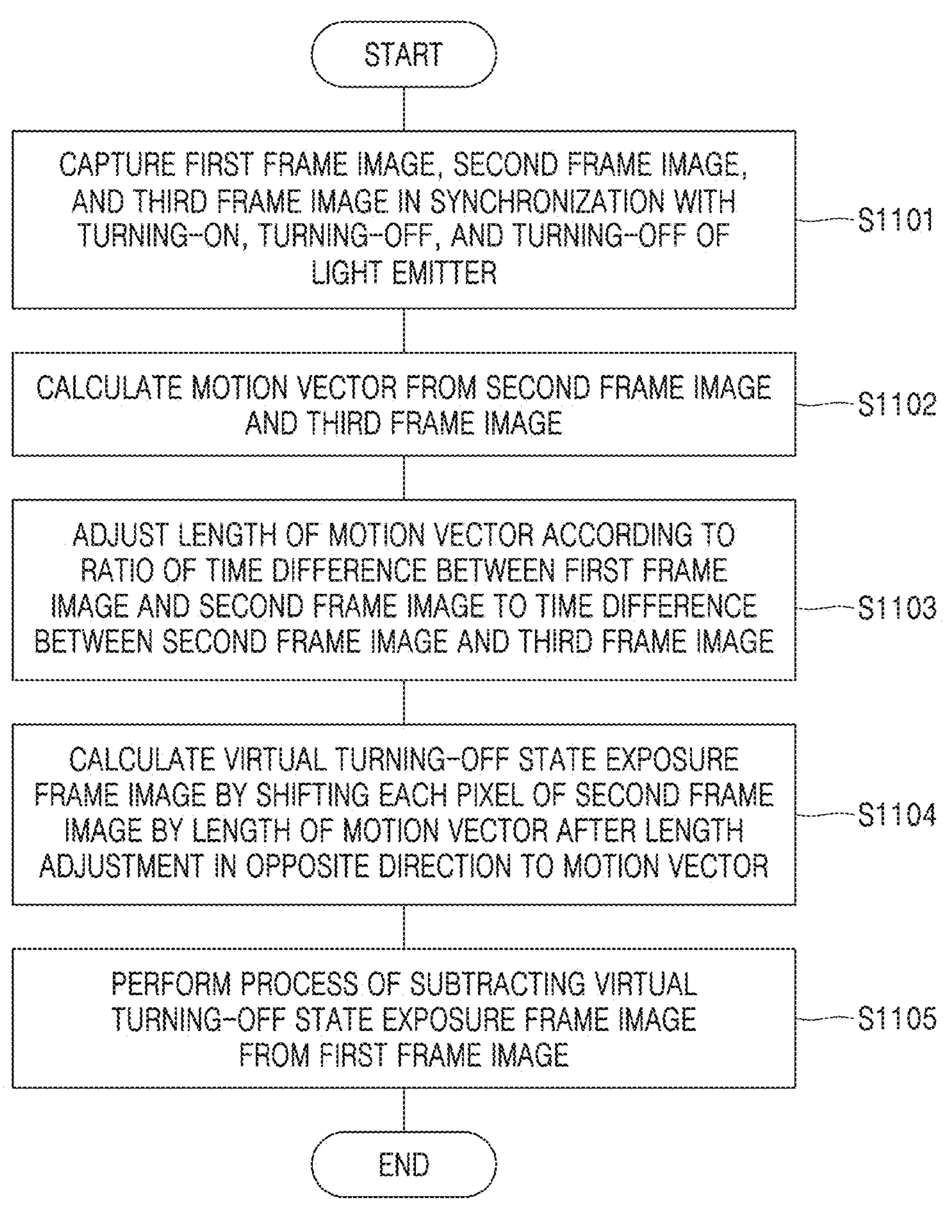
FIG. 27 is a flowchart illustrating an example of operations of the imaging device of FIG. 1, according to an embodiment.

FIG. 27 is a flowchart illustrating an example of operations of the imaging device 1 of FIG. 1, according to an embodiment.

The operations S1101 to S1105 of the flowchart may be executed, according to a program, by the cooperative operation of the controller 130 of the imaging unit 100 and the controller 210 of the image processing device 200. In some embodiments, the controller 130 may access a first program stored in a memory of the controller 130 or stored in the memory 220, and execute the first program to cause the controller 130 to perform operation S1101. In some embodiments, the controller 210 may access a second program stored in the memory 220 and execute the second program to cause the controller 210 to perform operations S1102-S1105.

The controller 130 captures the first frame image, the second frame image, and the third frame image, by the camera 120, in synchronization with the turning-on, turning-off, and turning-off of the light emitter 110 (S1101). For example, the first frame image may refer to the first turning-on state exposure frame image. The second frame image may refer to the first turning-off state exposure frame image. The third frame image may refer to the second turning-off state exposure frame image. The controller 130 transmits a first frame image, a second frame image, and a third frame image to the image processing device 200 through the communicator 140.

The controller 210 calculates a motion vector 730 from the second frame image and the third frame image (S1102). For example, the controller 210 receives the first frame image, the second frame image, and the third frame image through the communicator 230 and calculates a motion vector 730 from the second frame image and the third frame image.

The controller 210 adjusts the length of the motion vector 730 according to the ratio of the time difference between a time at which the first frame image is captured and a time at which the second frame image is captured to the time difference between the time at which the second frame image is captured and a time at which the third frame image is captured (S1103).

The controller 210 shifts each pixel of the second frame image in the opposite direction to the motion vector 730 by the length of the motion vector 731 after the length adjustment and calculates a virtual turning-off state exposure frame image 721 (S1104).

The controller 210 performs a process of subtracting the virtual turning-off state exposure frame image 721 from the first frame image (S1105).

According to the embodiment illustrated with respect to FIGS. 26-27, as in the embodiment illustrated with respect to FIGS. 24-25, even when a plurality of exposures, in which the turning-on of the light emitter 110 is continuous, and a plurality of exposures, in which the turning-off of the light-emitter 110 is continuous, are alternately repeated, the background light is strong, and the turning-on state exposure frame image 710 is close to the saturation level of the camera 120, making it difficult to obtain a contrast difference in the characteristic amount of the turning-on state exposure frame image 710, the precision of the motion vector 730 may be improved by calculating the motion vector 730 using two turning-off state exposure frame images 720. In addition, the processing method can be optimized by selecting the embodiment illustrated with respect to FIGS. 24-25 or the embodiment illustrated with respect to FIGS. 26-27 based on the movement trajectory of the subject (500).

In the embodiment illustrated with respect to FIGS. 1-6, each frame image (each of the first to third frame images) is captured by one exposure. In an embodiment, each frame image 700 (each of the first to third frame images) is captured by adding a plurality of frame images captured by a plurality of exposures to generate one frame image 700. In other respects, the embodiment is the same as the embodiment illustrated with respect to FIGS. 1-6, and thus, redundant descriptions are omitted or simplified for conciseness.

Figure 28:
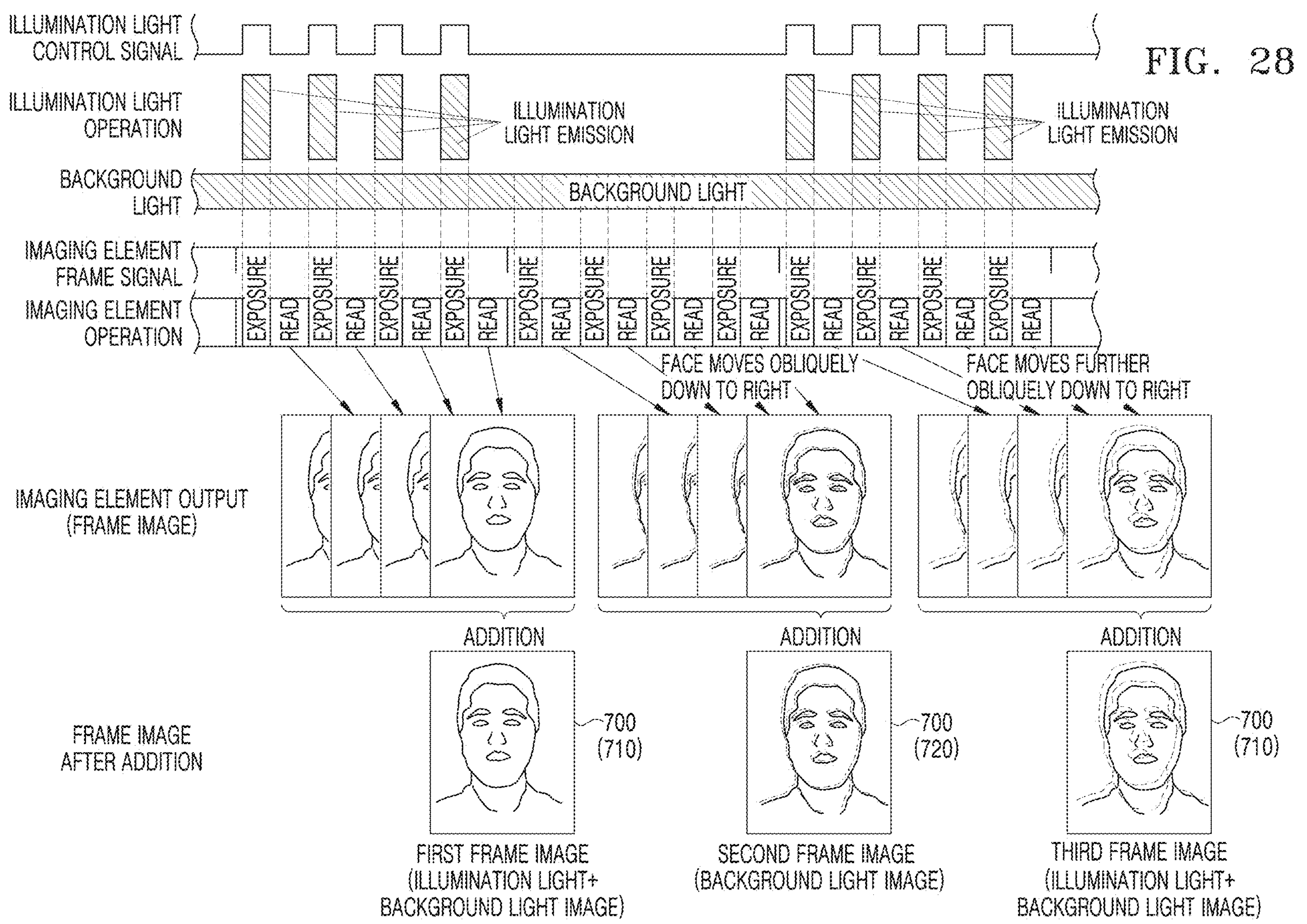
FIG. 28 is a diagram for explaining the capturing of a plurality of frame images by a plurality of exposures and the capturing of a turning-on state exposure frame image and a turning-off state exposure frame image by the addition of the plurality of frame images, according to an embodiment.

FIG. 28 is a diagram for explaining the capturing of a plurality of frame images by a plurality of exposures and the capturing of a turning-on state exposure frame image 710 and a turning-off state exposure frame image 720 by the addition of the plurality of frame images, according to an embodiment.

The camera 120 captures a turning-on state exposure frame image 710 by adding digital signals of a plurality of frame images 700 captured by continuously multiple times performing the turning-on of the light emitter 110 and exposure synchronized with the turning-on of the light emitter 110. The camera 120 captures a turning-off state exposure frame image 720 by adding digital signals of a plurality of frame images 700 captured by continuously multiple times performing the turning-off of the light emitter 110 and exposure synchronized with the turning-off of light emitter 110. That is, the camera 120 captures a first frame image as a post-addition frame image 700 by adding a plurality of frame images captured by exposure synchronized with the turning-on of the light emitter 110. Next, the camera 120 captures a second frame image as a post-addition frame image 700 by adding a plurality of frame images captured by exposure synchronized with the turning-off of the light emitter 110. Next, the camera 120 captures a third frame image as a post-addition frame image 700 by adding a plurality of frame images captured by exposure synchronized with the turning-on of the light emitter 110.

In the embodiment illustrated with respect to FIG. 28, the time of the exposure time is set to a relatively short time that does not cause pixel saturation of an imaging element. The time of the exposure may be appropriately set by experiment from the viewpoint of avoiding the pixel saturation of the imaging element.

The addition of the plurality of frame images 700 described above is performed outside the image element. The addition may be performed by the camera 120 having a CPU or the like, may be performed by the controller 130 of the imaging unit 100, or may be performed by the controller 210 of the image processing device 200.

According to the embodiment illustrated with respect to FIG. 28, even when the background light is relatively strong, a turning-on state exposure frame image 710 and a turning-off state exposure frame image 720 that are not pixel-saturated may be captured.

In the embodiment illustrated with respect to FIG. 28, each frame image 700 (each of the first to third frame images) is captured by adding a plurality of frame images captured by a plurality of exposures to generate one frame image 700. In an embodiment, each frame image 700 (each of the first to third frame images) is captured by continuously multiple times performing the accumulation of a signal amount for each pixel by exposure and the integration of an accumulated signal amount to generate one frame image. In other respects, the embodiment is the same as the embodiment illustrated with respect to FIG. 28, and thus, redundant descriptions are omitted or simplified for conciseness.

FIG. 29 is a diagram for explaining the capturing of a turning-on state exposure frame image 710 by the integration of a signal amount by exposure when a plurality of turning-on operations are performed, and the capturing of a turning-off state exposure frame image 720 by the integration of a signal amount by exposure when a plurality of turning-off operations are performed, according to an embodiment.

The camera 120 captures a turning-on state exposure frame image 710 by continuously multiple times performing the turning-on of the light emitter 110, the accumulation of a signal amount for each pixel by exposure synchronized with the turning-on of the light emitter 110, and the integration of an accumulated signal amount. The camera 120 captures a turning-off state exposure frame image 720 by continuously multiple times performing the turning-off of the light emitter 110, the accumulation of a signal amount for each pixel by exposure synchronized with the turning-off of the light emitter 110, and the integration of an accumulated signal amount. That is, the camera 120 captures a first frame image by integrating a signal amount accumulated by a plurality of exposures synchronized with the turning-on of the light emitter 110. Next, the camera 120 captures a second frame image by integrating a signal amount accumulated by a plurality of exposures synchronized with the turning-off of the light emitter 110. Next, the camera 120 captures a third frame image by integrating a signal amount accumulated by a plurality of exposures synchronized with the turning-on of the light emitter 110.

The above-described integration of the signal amount may be performed by accumulating the charge of the signal amount generated by the plurality of exposures in each of a plurality of capacitors and analogically adding charge amounts accumulated in each capacitor. The addition of the signal amount may be performed in the imaging element.

According to the embodiment illustrated with respect to FIG. 29, even when the background light is relatively strong, a turning-on state exposure frame image 710 and a turning-off state exposure frame image 720 that are not pixel-saturated may be captured.

Figure 30:
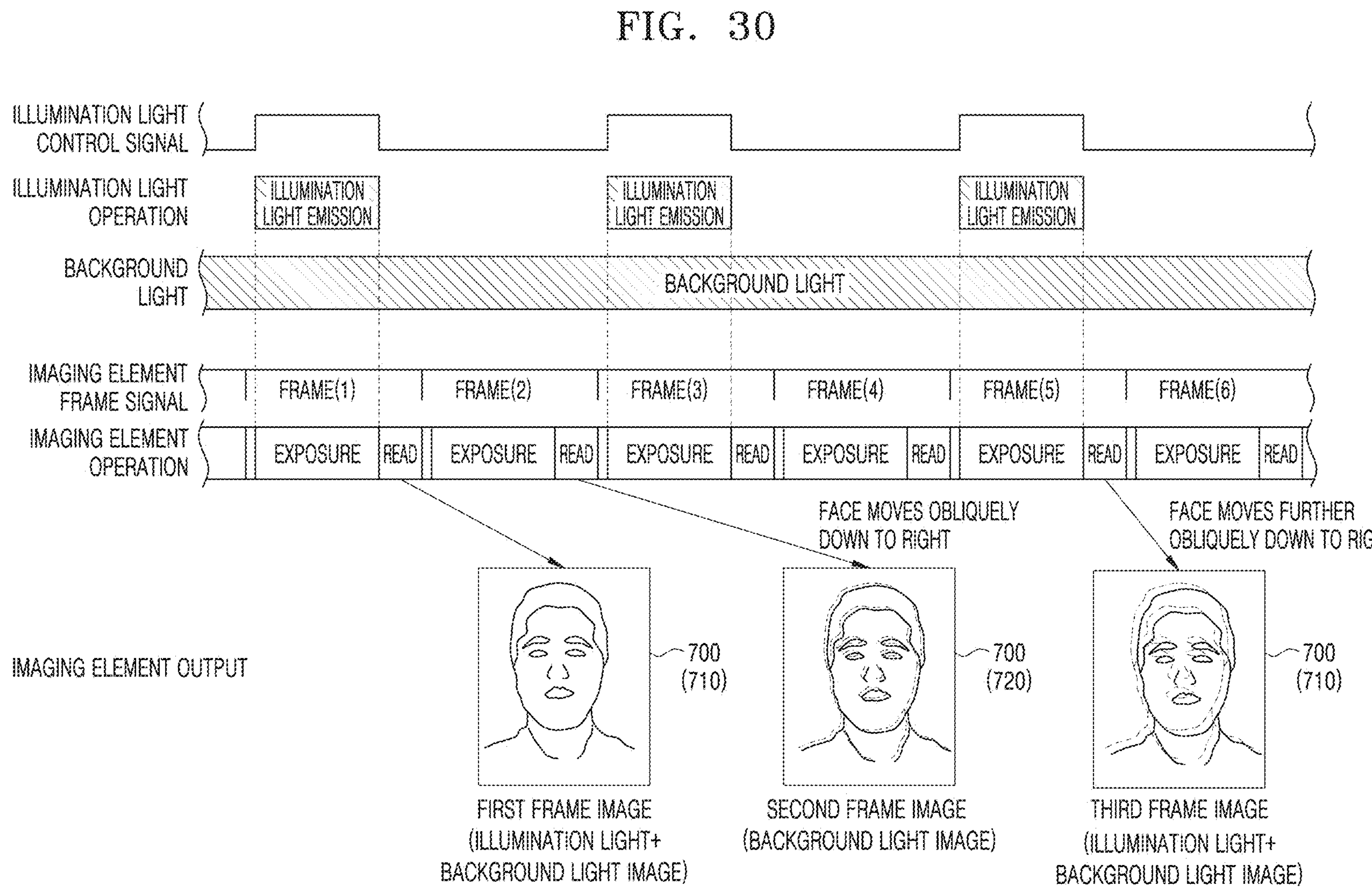
FIG. 30 is a diagram illustrating an example in which a first frame image to a third frame image are not continuous, according to an embodiment.

FIG. 30 is a diagram illustrating an example of a case where a first frame image to a third frame image are not continuous, according to an embodiment.

In the embodiment illustrated with respect to FIGS. 1-6, the first frame image to the third frame image are continuous. In an embodiment, the first frame image to the third frame image may not be continuous.

In the embodiment illustrated in FIG. 30, a frame (1) of FIG. 30 and a frame (2) of FIG. 30, which are continuous, are respectively referred to as the first frame image and the second frame image. A frame (5) of FIG. 30 is referred to as the third frame image. In this way, in the case where the first frame image to the third frame image are not continuous, a turning-off state exposure frame image 720, which is used for processing, may be referred to as the frame (2) of FIG. 30 close to the frame (1) of FIG. 30 that is a turning-on state exposure frame image 710 of a processing target.

The embodiment illustrated with respect to FIG. 30 may be applied to the embodiments illustrated with respect to FIGS. 1-12.

In the case where the embodiment illustrated with respect to FIG. 30 is applied to the embodiment illustrated with respect to FIGS. 13-14, a frame (4) of FIG. 30 close to the frame (5) of FIG. 30, which is a processing target, may be referred to as the second frame image that is a turning-off state exposure frame image 720 used for processing. The embodiment illustrated with respect to FIG. 30 may be equally applied to the embodiments illustrated with respect to FIGS. 15-18.

Figure 31:
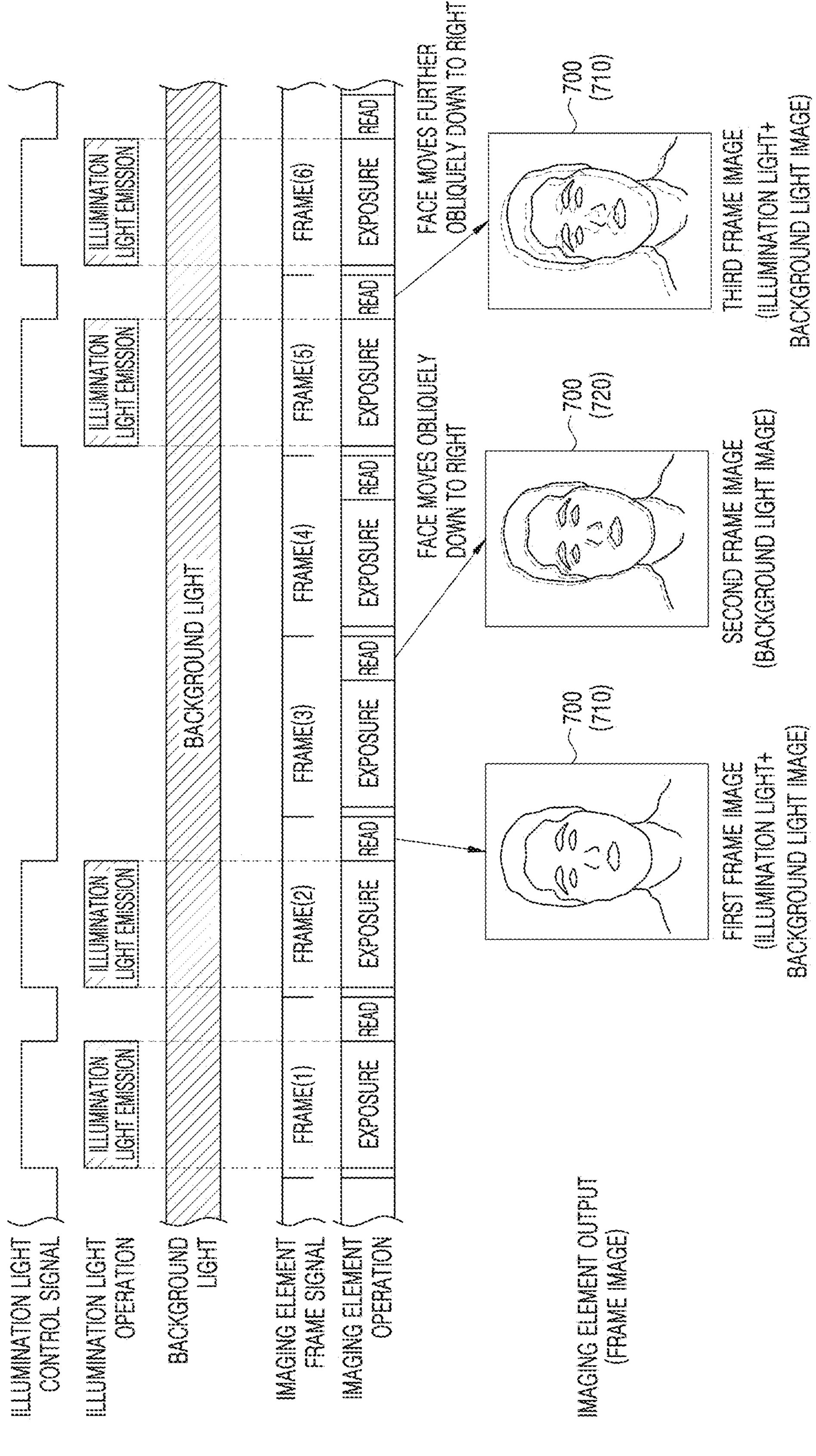
FIG. 31 is a diagram illustrating an example in which a first frame image to a third frame image are not continuous, according to an embodiment.

FIG. 31 is a diagram illustrating an example of a case where a first frame image to a third frame image are not continuous, according to an embodiment.

In an embodiment illustrated with respect to FIG. 31, when exposure during a plurality of turning-on operations that are continuous, and exposure during a plurality of turning-off operations that are continuous are alternately performed, non-continuous frame images are selected as the first frame image to the third frame image. Specifically, a frame (2) and a frame (3) that are continuous are referred to as the first frame image and the second frame image, respectively. A frame (5) is referred to as the third frame image. In this way, in the case where the first frame image to the third frame image are not continuous, a turning-off state exposure frame image 720, which is used for processing, may be referred to as the frame (3) close to the frame (2) that is a turning-on state exposure frame image 710 of a processing target.

The embodiment illustrated with respect to FIG. 31 may be applied to the embodiments illustrated with respect to FIGS. 1-12.

In the case where the embodiment illustrated with respect to FIG. 31 is applied to the embodiment illustrated with respect to FIGS. 13-14, a frame (4) close to the frame (5), which is a processing target, may be referred to as the second frame image that is a turning-off state exposure frame image 720 used for processing. The embodiment illustrated with respect to FIG. 31 may be equally applied to the embodiments illustrated with respect to FIGS. 15-18.

FIG. 32 is a diagram illustrating an example of a case where a first frame image to a third frame image are not continuous, according to an embodiment.

In an embodiment illustrated with respect to FIG. 32, when exposure during a turning-on operation and exposure during a turning-off operation are alternately performed, non-continuous frame images are selected as the first frame image to the third frame image. Specifically, frame (1) is set as the first frame image. A frame (3) and a frame (4) that are continuous are referred to as the second frame image and the third frame image, respectively. In this way, in the case where the first frame image to the third frame image are not continuous, a turning-off state exposure frame image 720, which is used for processing, may be referred to as the frame (2) or the frame (4) close to the frame (3) that is a turning-on state exposure frame image 710 of a processing target. In the case where the turning-off state exposure frame image 720 of the frame (2) may not be used due to any error, the frame (4) may be selected as the turning-off state exposure frame image 720, which is used for processing.

The embodiment illustrated with respect to FIG. 32 may be applied to the embodiment illustrated with respect to FIGS. 19-21. The embodiment illustrated with respect to FIG. 32 may also be equally applied to the embodiments illustrated with respect to FIGS. 22-27.

Figure 33:
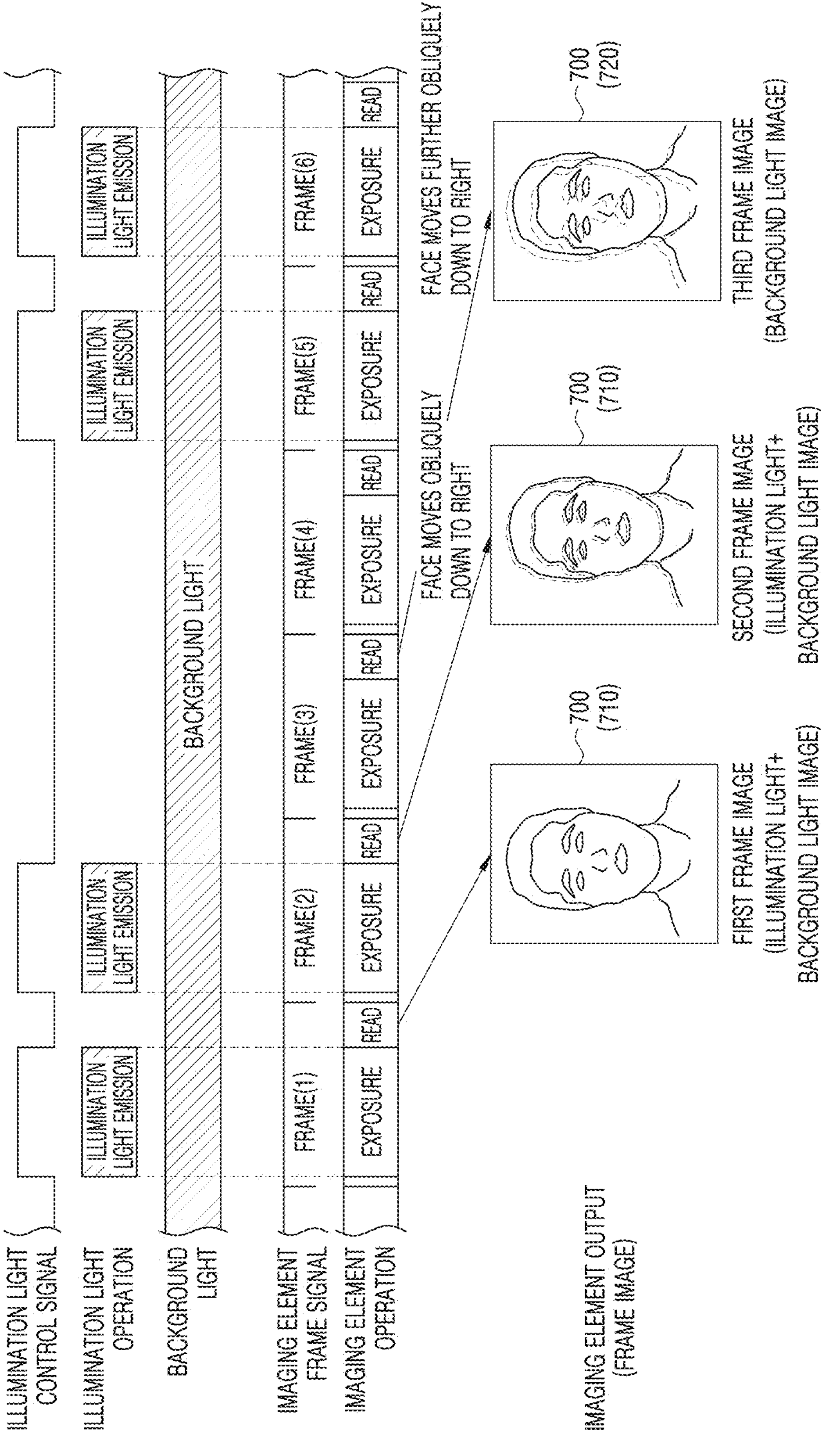
FIG. 33 is a diagram illustrating an example in which a first frame image to a third frame image are continuous, according to an embodiment.

FIG. 33 is a diagram illustrating an example of a case where a first frame image to a third frame image are continuous, according to an embodiment.

In the embodiment illustrated in FIG. 33, when exposure during a plurality of continuous turning-on operations and exposure during a plurality of continuous turning-off operations are alternately performed, continuous frame images are selected as the first frame image to the third frame image. Specifically, a frame (1) to a frame (3) that are continuous are referred to as the first frame image to the third frame image, respectively. In this way, even when exposure during a plurality of continuous turning-on operations and exposure during a plurality of continuous turning-off operations are alternately performed, external light correction processing may be performed in a short time by selecting continuous frame images 700 as the first frame image to the third frame image.

The embodiment illustrated with respect to FIG. 33 may be applied to the embodiments illustrated with respect to FIGS. 19-27.

A motion vector of each pixel is calculated from two turning-on state exposure frame images or two turning-off state exposure frame images, and the length of the motion vector is adjusted according to the time difference between the turning-on state exposure frame image of a processing target and the turning-off state exposure frame image used for processing. Then, the turning-off state exposure frame image used for the processing is corrected based on the motion vector after the adjustment to calculate a virtual turning-off state exposure frame image, and a process of subtracting the virtual turning-off state exposure frame image from the turning-on state exposure frame image of the processing target is performed. Thus, a high-resolution captured image without artifacts, in which the influence of background light is removed even when the subject moves in any direction, may be obtained.

In addition, when frame images captured in the order of a turning-on state exposure frame image, a turning-off state exposure frame image, and a turning-on state exposure frame image are respectively referred to as a first turning-on state exposure frame image, a first turning-off state exposure frame image, and a second turning-on state exposure frame image, the motion vector is calculated from the first turning-on state exposure frame image and the second turning-on state exposure frame image. The length of the motion vector of each pixel is adjusted according to the ratio of the time difference between the first turning-on state exposure frame image and the first turning-off state exposure frame image to the time difference between the first turning-on state exposure frame image and the second turning-on state exposure frame image. A virtual turning-off state exposure frame image is calculated by performing a correction to shift each pixel of the first turning-off state exposure frame image in the opposite direction to the motion vector by the length of the motion vector after the length adjustment. Then, the process of subtracting the calculated virtual turning-off state exposure frame image from the first turning-on state exposure frame image is performed. Thus, because the turning-off state exposure frame image subtracted from the turning-on state exposure frame image is shifted by pixel unit, an image without artifacts, in which the influence of background light is removed even when the subject moves in any direction and even when a camera moves, may be obtained.

In addition, when frame images captured in the order of a turning-on state exposure frame image, a turning-off state exposure frame image, and a turning-on state exposure frame image are respectively referred to as a first turning-on state exposure frame image, a first turning-off state exposure frame image, and a second turning-on state exposure frame image, the motion vector of each pixel is calculated from the first turning-on state exposure frame image and the second turning-on state exposure frame image. The length of the motion vector of each pixel is adjusted according to the ratio of the time difference between the first turning-off state exposure frame image and the second turning-on state exposure frame image to the time difference between the first turning-on state exposure frame image and the second turning-on state exposure frame image. A virtual turning-off state exposure frame image is calculated by performing a correction to shift each pixel of the first turning-off state exposure frame image by the length of the motion vector after the length adjustment in the same direction as the motion vector. Then, the process of subtracting the calculated virtual turning-off state exposure frame image from the second turning-on state exposure frame image is performed. Therefore, because the turning-off state exposure frame image subtracted from the turning-on state exposure frame image is shifted by pixel unit, an image without artifacts, in which the influence of background light is removed even when the subject moves in any direction and even when a camera moves, may be obtained.

In addition, when frame images captured in the order of a turning-off state exposure frame image, a turning-on state exposure frame image, and a turning-off state exposure frame image are respectively referred to as a first turning-off state exposure frame image, a first turning-on state exposure frame image, and a second turning-off state exposure frame image, a motion vector is calculated from the first turning-off state exposure frame image and the second turning-off state exposure frame image. The length of the motion vector of each pixel is adjusted according to the ratio of the time difference between the first turning-off state exposure frame image and the first turning-on state exposure frame image to the time difference between the first turning-off state exposure frame image and the second turning-off state exposure frame image. A virtual turning-off state exposure frame image is calculated by performing a correction to shift each pixel of the first turning-off state exposure frame image by the length of the motion vector after the length adjustment in the same direction as the motion vector. Then, a turning-on state exposure frame image processor performs the process of subtracting the calculated virtual turning-off state exposure frame image from the first turning-on state exposure frame image. Thus, even when the background light is strong and the turning-on state exposure frame image is close to the saturation level of the camera, making it difficult to obtain a contrast difference in the characteristic amount of the turning-on state exposure frame image, the precision of the motion vector may be improved by calculating the motion vector using two turning-off state exposure frame images. In addition, in a case where the turning-on state exposure frame image of a processing target is captured later than the turning-off state exposure frame image used for processing and the capturing times of the two images are relatively similar to each other, an image without artifacts, in which the influence of background light is removed more simply and effectively, may be obtained.

In addition, when frame images captured in the order of a turning-off state exposure frame image, a turning-on state exposure frame image, and a turning-off state exposure frame image are respectively referred to as a first turning-off state exposure frame image, a first turning-on state exposure frame image, and a second turning-off state exposure frame image, a motion vector is calculated from the first turning-off state exposure frame image and the second turning-off state exposure frame image. The length of the motion vector of each pixel is adjusted according to the ratio of the time difference between the first turning-on state exposure frame image and the second turning-off state exposure frame image to the time difference between the first turning-off state exposure frame image and the second turning-off state exposure frame image. A virtual turning-off state exposure frame image is calculated by performing a correction to shift each pixel of the second turning-off state exposure frame image in the opposite direction to the motion vector by the length of the motion vector after the length adjustment. Then, the process of subtracting the calculated virtual turning-off state exposure frame image from the first turning-on state exposure frame image is performed. Thus, in a case where the turning-on state exposure frame image of a processing target is captured earlier than the turning-off state exposure frame image used for processing and the capturing times of the two images are relatively similar to each other, an image without artifacts, in which the influence of background light is removed more simply and effectively, may be obtained.

In addition, a pixel of which the length of the motion vector is less than or equal to a certain threshold value is set as a certain pixel of which the length of the motion vector is not adjusted. An average of the motion vector of each pixel is calculated, and the length of the average of the motion vector is adjusted according to the time difference between the turning-on state exposure frame image of a processing target and the turning-off exposure frame image used for processing. Then, the motion vector of each pixel other than the certain pixel is adjusted by the average after the adjustment. Thus, by uniformly shifting all pixels other than the certain pixel based on the average of the length of the motion vector, the amount of calculation for processing may be effectively reduced.

In addition, a face region is detected from the turning-on state exposure frame image or two turning-off state exposure frame images, which are used to calculate the motion vector. The motion vector of each pixel within the detected face region is calculated. Thus, because a target pixel for which the motion vector is calculated, and a pixel that is a shift target in the calculation of the virtual turning-off state exposure frame image are limited to the face region, the amount of calculation may be suppressed.

In addition, the calculated virtual turning-off state exposure frame image is filtered using multiple types of low-pass filters, thereby calculating a plurality of virtual turning-off state exposure frame images after the filtering. The processing is performed to subtract, from the turning-on state exposure frame image of the processing target, the virtual turning-off state exposure frame image after the filtering, which has the smallest standard deviation of the difference between the calculated virtual turning-off state exposure frame image after the filtering and the virtual turning-off state exposure frame image before the filtering. Thus, by performing the processing using an optimally filtered virtual turning-off state exposure frame image, an edge noise due to the shift amount error of a pixel in the calculation of the virtual turning-off state exposure frame image may be further reduced.

In addition, when frame images captured in the order of a turning-on state exposure frame image, a turning-on state exposure frame image, and a turning-off state exposure frame image are respectively referred to as a first turning-on state exposure frame image, a second turning-on state exposure frame image, and a first turning-off state exposure frame image, a motion vector is calculated from the first turning-on state exposure frame image and the second turning-on state exposure frame image. The length of the motion vector of each pixel is adjusted according to the ratio of the time difference between the second turning-off state exposure frame image and the first turning-off state exposure frame image to the time difference between the first turning-on state exposure frame image and the second turning-on state exposure frame image. A virtual turning-off state exposure frame image is calculated by performing a correction to shift each pixel of the first turning-off state exposure frame image in the opposite direction to the motion vector by the length of the motion vector after the length adjustment. Then, the process of subtracting the calculated virtual turning-off state exposure frame image from the second turning-on state exposure frame image is performed. Thus, as two exposures in which the turning-on of a light emitter is continuous and two exposures in which the turning-off of the light emitter is continuous are alternately repeated, even when the turning-off state exposure frame image is not captured during the capturing of two turning-on state exposure frame images, the virtual turning-off state exposure frame image may be appropriately calculated.

In addition, when frame images captured in the order of a turning-off state exposure frame image, a turning-on state exposure frame image, and a turning-on state exposure frame image are respectively referred to as a first turning-off state exposure frame image, a first turning-on state exposure frame image, and a second turning-on state exposure frame image, a motion vector is calculated from the first turning-on state exposure frame image and the second turning-on state exposure frame image. The length of the motion vector of each pixel is adjusted according to the ratio of the time difference between the first turning-off state exposure frame image and the first turning-on state exposure frame image to the time difference between the first turning-on state exposure frame image and the second turning-on state exposure frame image. A virtual turning-off state exposure frame image is calculated by performing a correction to shift each pixel of the first turning-off state exposure frame image in the same direction as the motion vector by the length of the motion vector after the length adjustment. Then, the process of subtracting the calculated virtual turning-off state exposure frame image from the first turning-on state exposure frame image is performed. Thus, as two exposures in which the turning-on of a light emitter is continuous and two exposures in which the turning-off of the light emitter is continuous are alternately repeated, even when the turning-off state exposure frame image is not captured during the capturing of two turning-on state exposure frame images, the virtual turning-off state exposure frame image may be appropriately calculated.

In addition, when frame images captured in the order of a turning-off state exposure frame image, a turning-off state exposure frame image, and a turning-on state exposure frame image are respectively referred to as a first turning-off state exposure frame image, a second turning-off state exposure frame image, and a first turning-on state exposure frame image, a motion vector is calculated from the first turning-off state exposure frame image and the second turning-off state exposure frame image. The length of the motion vector of each pixel is adjusted according to the ratio of the time difference between the second turning-off state exposure frame image and the first turning-on state exposure frame image to the time difference between the first turning-off state exposure frame image and the second turning-off state exposure frame image. A virtual turning-off state exposure frame image is calculated by performing a correction to shift each pixel of the second turning-off state exposure frame image by the length of the motion vector after the length adjustment in the same direction as the motion vector. Then, the process of subtracting the calculated virtual turning-off state exposure frame image from the first turning-on state exposure frame image is performed. Thus, even when a plurality of exposures, in which the turning-on of a light emitter is continuous, and a plurality of exposures, in which the turning-off of the light-emitter is continuous, are alternately repeated, the background light is strong, and the turning-on state exposure frame image is close to the saturation level of a camera, making it difficult to obtain a contrast difference in the characteristic amount of the turning-on state exposure frame image, the precision of the motion vector may be improved by calculating the motion vector using two turning-off state exposure frame images.

In addition, when frame images captured in the order of a turning-on state exposure frame image, a turning-off state exposure frame image, and a turning-off state exposure frame image are respectively referred to as a first turning-on state exposure frame image, a first turning-off state exposure frame image, and a second turning-off state exposure frame image, a motion vector is calculated from the first turning-off state exposure frame image and the second turning-off state exposure frame image. The length of the motion vector of each pixel is adjusted according to the ratio of the time difference between the first turning-on state exposure frame image and the first turning-off state exposure frame image to the time difference between the first turning-off state exposure frame image and the second turning-off state exposure frame image. A virtual turning-off state exposure frame image is calculated by performing a correction to shift each pixel of the first turning-off state exposure frame image by the length of the motion vector after the length adjustment in the opposite direction to the motion vector. Then, the process of subtracting the calculated virtual turning-off state exposure frame image from the first turning-on state exposure frame image is performed. Thus, even when a plurality of exposures, in which the turning-on of a light emitter is continuous, and a plurality of exposures, in which the turning-off of the light-emitter is continuous, are alternately repeated, the background light is strong, and the turning-on state exposure frame image is close to the saturation level of a camera, making it difficult to obtain a contrast difference in the characteristic amount of the turning-on state exposure frame image, the precision of the motion vector may be improved by calculating the motion vector using two turning-off state exposure frame images.

In addition, a turning-on state exposure frame image is captured by adding digital signals of a plurality of frame images captured by continuously multiple times performing the turning-on of the light emitter and exposure synchronized with the turning-on of the light emitter. In addition, a turning-off state exposure frame image is captured by adding digital signals of a plurality of frame images captured by continuously multiple times performing the turning-off of the light emitter and exposure synchronized with the turning-off of the light emitter. Thus, even when the background light is relatively strong, a turning-on state exposure frame image and a turning-off state exposure frame image that are not pixel-saturated may be captured.

In addition, a turning-on state exposure frame image is captured by continuously multiple times performing the turning-on of the light emitter, the accumulation of a signal amount for each pixel by exposure synchronized with the turning-on of the light emitter, and the integration of an accumulated signal amount. In addition, a turning-off state exposure frame image is captured by continuously multiple times performing the turning-off of the light emitter, the accumulation of a signal amount for each pixel by exposure synchronized with the turning-off of the light emitter, and the integration of an accumulated signal amount. Thus, even when the background light is relatively strong, a turning-on state exposure frame image and a turning-off state exposure frame image that are not pixel-saturated may be captured.

While various embodiments have been particularly shown and described with reference to the drawings, it will be understood that various changes in form and details may be made therein without departing from the spirit and scope of the following claims.

What is claimed is:

1. An imaging device comprising:

an imaging unit configured to capture at least three frame images exposed in synchronization with a turning-on and a turning-off of a light emitter that irradiates light to a subject, the at least three frame images including a turning-on frame image exposed when the light emitter is turned on, a turning-off frame image exposed when the light emitter is turned off, and another one of the turning-on frame image or the turning-off frame image;

a motion vector calculator configured to calculate a motion vector of each pixel from the two of the turning-on frame images or the two of the turning-off frame images;

a motion vector length adjuster configured to adjust a length of the motion vector of each pixel according to a time difference between a time at which the turning-on frame image is captured and at time at which the turning-off frame image is captured;

a frame image corrector configured to generate a virtual frame image by correcting each pixel of the turning-off frame image based on the motion vector of each pixel after the motion vector is adjusted; and an image processor configured to subtract the virtual frame image from the turning-on frame image.

2. The imaging device of claim 1, wherein the at least three frame images comprise, in a captured order, a first turning-on frame image, a first turning-off frame image, and a second turning-on frame image, wherein the motion vector calculator is configured to calculate the motion vector from the first turning-on frame image to the second turning-on frame image, the motion vector length adjuster is configured to adjust the length of the motion vector of each pixel according to a ratio of a first time difference between a time at which the first turning-on frame image is captured and a time at which the first turning-off frame image is captured to a second time difference between the time at which the first turning-on frame image is captured and a time at which the second turning-on frame image is captured, the frame image corrector is configured to calculate the virtual frame image by shifting each pixel of the first turning-off frame image in an opposite direction to the motion vector by the length of the motion vector after the length of the motion vector is adjusted, and the image processor is further configured to subtract the virtual frame image from the first turning-on frame image.

3. The imaging device of claim 1, wherein the at least three frame images comprise, in a captured order, a first turning-on frame image, a first turning-off frame image, and a second turning-on frame image, wherein the motion vector calculator is configured to calculate the motion vector of each pixel from the first turning-on frame image to the second turning-on frame image, the motion vector length adjuster is further configured to adjust the length of the motion vector of each pixel according to a ratio of a first time difference between a time at which the first turning-off frame image is captured and a time at which the second turning-on frame image is captured to a second time difference between at which the first turning-on frame image is captured and the time at which the second turning-on frame image is captured, the frame image corrector is configured to calculate the virtual frame image by shifting each pixel of the first turning-off frame image by the length of the motion vector in a same direction as the motion vector after the length of the motion vector is adjusted, and the image processor is configured to subtract the virtual frame image from the second turning-on frame image.

4. The imaging device of claim 1, wherein at least three frame images comprise, in a captured order, a first turning-off frame image, a first turning-on frame image, and a second turning-off frame image, wherein the motion vector calculator is configured to calculate the motion vector from the first turning-off frame image to the second turning-off frame image, the motion vector length adjuster is configured to adjust the length of the motion vector of each pixel according to a ratio of a first time difference between a time at which the first turning-off frame image is captured and a time at which the first turning-on frame image is captured to a second time difference between the time at which the first turning-off frame image is captured and a time at which the second turning-off frame image is captured, the frame image corrector is configured to calculate the virtual frame image by shifting each pixel of the first turning-off frame image in a same direction as the motion vector by the length of the motion vector after the length of the motion vector is adjusted, and the image processor is further configured to subtract the virtual frame image from the first turning-on frame image.

5. The imaging device of claim 1, wherein the at least three frame images comprise, in a captured order, a first turning-off frame image, a first turning-on frame image, and a second turning-off frame image, wherein the motion vector calculator is configured to calculate the motion vector from the first turning-off frame image to the second turning-off frame image, the motion vector length adjuster is configured to adjust the length of the motion vector of each pixel according to a ratio of a first time difference between a time at which the first turning-on frame image is captured and a time at which the second turning-off frame image is captured to a second time difference between a time at which the first turning-off frame image is captured and the time at which the second turning-off frame image is captured, the frame image corrector is configured to calculate the virtual frame image by shifting each pixel of the second turning-off frame image in an opposite direction to the motion vector by the length of the motion vector after the length of the motion vector is adjusted, and the image processor is configured to subtract the virtual frame image from the first turning-on frame image.

6. The imaging device of claim 1, wherein the motion vector length adjuster is configured to:

set a pixel of which the length of the motion vector is less than or equal to a threshold value as a certain pixel of which the length of the motion vector is not adjusted, calculate an average length of the motion vector of each pixel, adjust the average length of the motion vector according to a first time difference between the turning-on frame image and the turning-off frame image, and correct each pixel other than the certain pixel of the turning-off frame image based on the average length after the average length is adjusted.

7. The imaging device of claim 1, wherein the motion vector calculator is configured to detect a face region from the two of the turning-on frame images or from the two of the turning-off frame images, which are used to calculate the motion vector, and calculate the motion vector of each pixel within the face region.

8. The imaging device of claim 1, further comprising a low-pass filter configured to filter the virtual frame image by using multiple types of low-pass filters to calculate a plurality of virtual frame images, wherein the image processor is configured to subtract, from the turning-on frame image, the virtual frame image after the filtering, which has a smallest standard deviation of a difference between the virtual frame image after the filtering and the virtual frame image before the filtering.

9. The imaging device of claim 1, wherein the at least three frame images comprise, in a captured order, a first turning-on frame image, a second turning-on frame image, and a first turning-off frame image, wherein the motion vector calculator is configured to calculate the motion vector from the first turning-on frame image to the second turning-on frame image, the motion vector length adjuster is configured to adjust the length of the motion vector of each pixel according to a ratio of a first time difference between a time at which the second turning-on frame image is captured and a time at which the first turning-off frame image to a second time difference between a time at which the first turning-on frame image is captured and the time at which the second turning-on frame image is captured, the frame image corrector is configured to calculate the virtual frame image by shifting each pixel of the first turning-off frame image in an opposite direction to the motion vector by the length of the motion vector after the length of the motion vector is adjusted, and the image processor is configured to subtract the virtual frame image from the second turning-on frame image.

10. The imaging device of claim 1, wherein the at least three frame images comprise, in a captured order, a first turning-off frame image, a first turning-on frame image, and a second turning-on frame image, wherein the motion vector calculator is configured to calculate the motion vector from the first turning-on frame image to the second turning-on frame image, the motion vector length adjuster is configured to adjust the length of the motion vector of each pixel according to a ratio of a first time difference between a time at which the first turning-off frame image is captured and a time at which the first turning-on frame image is captured to a second time difference between the time at which the first turning-on frame image is captured and a time at which the second turning-on frame image is captured, the frame image corrector is configured to calculate the virtual frame image by shifting each pixel of the first turning-off frame image in a same direction as the motion vector by the length of the motion vector after the length of the motion vector is adjusted, and the image processor is further configured to subtract the virtual frame image from the first turning-on frame image.

11. The imaging device of claim 1, wherein the at least three frame images comprise, in a captured order, a first turning-off frame image, a second turning-off frame image, and a first turning-on frame image, wherein the motion vector calculator is configured to calculate the motion vector from the first turning-off frame image to the second turning-off frame image, the motion vector length adjuster is configured to adjust the length of the motion vector of each pixel according to a ratio of a first time difference between a time at which the second turning-off frame image is captured and a time at which the first turning-on frame image is captured to a second time difference between a time at which the first turning-off frame image is captured and the time at which the second turning-off frame image is captured, the frame image corrector is configured to calculate the virtual frame image by shifting each pixel of the second turning-off frame image in a same direction as the motion vector by the length of the motion vector after the length of the motion vector is adjusted, and the image processor is further configured to subtract the virtual frame image from the first turning-on frame image.

12. The imaging device of claim 1, wherein the at least three frame images comprise, in a captured order, a first turning-on frame image, a first turning-off frame image, and a second turning-off frame image, wherein the motion vector calculator is configured to calculate the motion vector from the first turning-off frame image to the second turning-off frame image, the motion vector length adjuster is configured to adjust the length of the motion vector of each pixel according to a ratio of a first time difference between a time at which the first turning-on frame image is captured and a time at which the first turning-off frame image is captured to a second time difference between the time at which the first turning-off frame image is captured and a time at which the second turning-off frame image is captured, the frame image corrector is configured to calculate the virtual frame image by shifting each pixel of the first turning-off frame image in an opposite direction to the motion vector by the length of the motion vector after the length of the motion vector is adjusted, and the image processor is configured to subtract the virtual frame image from the first turning-on frame image.

13. The imaging device of claim 1, wherein the imaging unit is configured to:

capture the turning-on frame image by adding digital signals of a plurality of frame images captured by continuously performing the turning-on of the light emitter and exposure synchronized with the turning-on of the light emitter multiple times, and capture the turning-off frame image by adding digital signals of a plurality of frame images captured by continuously performing the turning-off of the light emitter and exposure synchronized with the turning-off of the light emitter multiple times.

14. The imaging device of claim 1, wherein the imaging unit is configured to:

capture the turning-on frame image by continuously performing multiple times the turning-on of the light emitter, accumulation of a signal amount for each pixel by exposure synchronized with the turning-on of the light emitter, and integration of an accumulated signal amount, and capture the turning-off frame image by continuously performing multiple times the turning-off of the light emitter, accumulation of a signal amount for each pixel by exposure synchronized with the turning-off of the light emitter, and integration of an accumulated signal amount.

15. An operating method of an imaging device, the operating method comprising:

capturing at least three frame images exposed in synchronization with a turning-on and a turning-off of a light emitter that irradiates light to a subject, the at least three frame images including a turning-on frame image exposed when the light emitter is turned on, a turning-off frame image exposed when the light emitter is turned off, and another one of the turning-on frame image or the turning-off frame image;

calculating a motion vector of each pixel from the two of the turning-on frame images or the two of the turning-off frame images;

adjusting a length of the motion vector of each pixel according to a time difference between a time at which the turning-on frame image is captured and a time at which the turning-off frame image is captured;

correcting each pixel of the turning-off frame image based on the motion vector of each pixel after the length of the motion vector is adjusted to generate a virtual frame image; and subtracting the virtual frame image from the turning-on frame image.

16. The operating method of claim 15, wherein the at least three frame images are captured in a captured order of a first turning-on frame image, a first turning-off frame image, and a second turning-on frame image, wherein the motion vector is calculated from the first turning-on frame image to the second turning-on frame image, the length of the motion vector of each pixel is adjusted according to a ratio of a first time difference between a time at which the first turning-on frame image is captured and a time at which the first turning-off frame image is captured to a second time difference between the time at which the first turning-on frame image is captured and a time at which the second turning-on frame image is captured, the virtual frame image is calculated by shifting each pixel of the first turning-off frame image in an opposite direction to the motion vector by the length of the motion vector after the length of the motion vector is adjusted, and the virtual frame image is subtracted from the first turning-on frame image.

17. The operating method of claim 15, wherein the at least three frame images are captured in a captured order of a first turning-on frame image, a first turning-off frame image, and a second turning-on frame image, wherein the motion vector of each pixel is calculated from the first turning-on frame image to the second turning-on frame image, the length of the motion vector of each pixel is adjusted according to a ratio of a first time difference between a time at which the first turning-off frame image is captured and a time at which the second turning-on frame image is captured to a second time difference between a time at which the first turning-on frame image is captured and the time at which the second turning-on frame image is captured, the virtual frame image is calculated by shifting each pixel of the first turning-off frame image in a same direction as the motion vector by the length of the motion vector after the length of the motion vector is adjusted, and the virtual frame image is subtracted from the second turning-on frame image.

18. The operating method of claim 15, wherein the at least three frame images are captured in a captured order of a first turning-off frame image, a first turning-on frame image, and a second turning-off frame image, wherein the motion vector is calculated from the first turning-off frame image to the second turning-off frame image, the length of the motion vector of each pixel is adjusted according to a ratio of a first time difference between a time at which the first turning-off frame image is captured and a time at which the first turning-on frame image is captured to a second time difference between the time at which the first turning-off frame image is captured and a time at which the second turning-off frame image is captured, the virtual frame image is calculated by shifting each pixel of the first turning-off frame image in a same direction as the motion vector by the length of the motion vector after the length of the motion vector is adjusted, and the virtual frame image is subtracted from the first turning-on frame image.

19. The operating method of claim 15, wherein the at least three frame images are captured in a captured order of a first turning-off frame image, a first turning-on frame image, and a second turning-off frame image, wherein the motion vector is calculated from the first turning-off frame image to the second turning-off frame image, the length of the motion vector of each pixel is adjusted according to a ratio of a first time difference between a time at which the first turning-on frame image is captured and a time at which the second turning-off frame image is captured to a second time difference between a time at which the first turning-off frame image is captured and the time at which the second turning- off frame image is captured, the virtual frame image is calculated by shifting each pixel of the second turning-off frame image in an opposite direction to the motion vector by the length of the motion vector after the length of the motion vector is adjusted, and the virtual frame image is subtracted from the first turning-on frame image.

20. An imaging device comprising:

a memory storing one or more instructions; and a processor configured to access the memory and execute the one or more instructions stored in the memory to cause the processor to:

capture at least three frame images by performing exposure in synchronization with a turning-on and a turning-off of a light emitter that irradiates light to a subject, the at least three frame images including a turning-on frame image exposed when the light emitter is turned on, a turning-off frame image exposed when the light emitter is turned off, and another one of the turning-on frame image or the turning-off frame image;

calculate a motion vector of each pixel from the two of the turning-on frame images or the two of the turning-off frame images;

adjust a length of the motion vector of each pixel according to a time difference between a time at which the turning-on frame image is captured and a time at which the turning-off frame image is captured;

correct each pixel of the turning-off frame image based on the motion vector of each pixel after the length of the motion vector is adjusted to generate a virtual frame image; and subtracting the virtual frame image from the turning-on frame image.

* * * * *